(12) United States Patent
Roberts

(10) Patent No.: US 12,358,662 B2
(45) Date of Patent: Jul. 15, 2025

(54) HYBRID DRONE, BASE STATION AND METHODS THEREFOR

(71) Applicant: Australian Aeronautics Pty Ltd., Eleebana (AU)

(72) Inventor: James Francis Roberts, Eleebana (AU)

(73) Assignee: James Francis Roberts, Pearces Creek (AU)

( * ) Notice: Subject to any disclaimer, the term of this patent is extended or adjusted under 35 U.S.C. 154(b) by 0 days.

(21) Appl. No.: 18/629,063

(22) Filed: Apr. 8, 2024

(65) Prior Publication Data
US 2024/0278946 A1    Aug. 22, 2024

Related U.S. Application Data

(63) Continuation of application No. PCT/AU2022/051196, filed on Oct. 6, 2022.

(30) Foreign Application Priority Data

Oct. 7, 2021    (AU) .............................. 2021903218

(51) Int. Cl.
*B64U 80/25*    (2023.01)
*B64U 10/16*    (2023.01)
(Continued)

(52) U.S. Cl.
CPC ............. *B64U 80/25* (2023.01); *B64U 10/16* (2023.01); *B64U 50/33* (2023.01); *B64U 50/38* (2023.01);
(Continued)

(58) Field of Classification Search
CPC ........ B64U 80/25; B64U 10/16; B64U 50/33; B64U 50/38; B64U 70/93; B64U 70/95;
(Continued)

(56) References Cited

U.S. PATENT DOCUMENTS 4,262,712 A * 4/1981 Young ..................... B67D 7/54
141/DIG. 1
8,511,606 B1 * 8/2013 Lutke ..................... B64U 80/40
320/109
(Continued)

FOREIGN PATENT DOCUMENTS

CN    104494503 A    4/2015
CN    106218911 A    12/2016
(Continued)

OTHER PUBLICATIONS

The Bee, The Sunflowers, The Hive; https://sunflower-labs.com/specs; Aug. 14, 2020.
(Continued)

*Primary Examiner* — Medhat Badawi
(74) *Attorney, Agent, or Firm* — Reinhart Boerner Van Deuren P.C.

(57) ABSTRACT

A drone system and method for deploying and autonomously refuelling. The drone system includes a base station and a drone. The base station and drone are configured for autonomous refuelling when the drone has landed in the base station. The base station also provides portability and security of the drone.

19 Claims, 54 Drawing Sheets

(51) Int. Cl.
  *B64U 50/33*  (2023.01)
  *B64U 50/38*  (2023.01)
  *B64U 70/93*  (2023.01)
  *B64U 70/95*  (2023.01)
  *B64U 70/97*  (2023.01)
  *B64U 70/99*  (2023.01)
  *B64U 80/30*  (2023.01)
  *B64U 80/86*  (2023.01)
  *B64U 20/87*  (2023.01)

(52) U.S. Cl.
  CPC ............. *B64U 70/93* (2023.01); *B64U 70/95* (2023.01); *B64U 70/97* (2023.01); *B64U 70/99* (2023.01); *B64U 80/30* (2023.01); *B64U 80/86* (2023.01); *B64U 20/87* (2023.01)

(58) Field of Classification Search
  CPC ........ B64U 70/97; B64U 70/99; B64U 80/30; B64U 80/86; B64U 20/87; B64U 2101/30; B64U 50/11; B64U 50/19; B64U 60/00; B64U 70/92; B64U 10/13; B64U 50/13; B64U 50/34; B64U 2101/31; B64U 2101/32; B64U 2201/10; B64U 2201/20; B64C 39/024; B64F 1/005
  See application file for complete search history.

(56) References Cited

U.S. PATENT DOCUMENTS

| | | | | |
|---|---|---|---|---|
| 9,056,676 | B1* | 6/2015 | Wang | B64F 1/22 |
| 9,387,940 | B2* | 7/2016 | Godzdanker | B64F 1/125 |
| 9,551,989 | B2* | 1/2017 | Scarlatti | G05D 1/00 |
| 9,783,075 | B2* | 10/2017 | Henry | G05D 1/654 |
| 10,099,561 | B1* | 10/2018 | Ananthanarayanan | B60L 53/126 |
| 10,310,501 | B2* | 6/2019 | Greenberger | H02J 7/342 |
| 10,370,122 | B2* | 8/2019 | Fisher | B60L 53/00 |
| 10,377,507 | B2* | 8/2019 | Tremblay | B64F 1/32 |
| 10,467,685 | B1* | 11/2019 | Brisson | B64F 1/222 |
| 10,526,094 | B2* | 1/2020 | Cheng | B64U 80/70 |
| 10,719,080 | B2* | 7/2020 | Zhang | B64F 5/60 |
| 10,850,866 | B2* | 12/2020 | Fisher | B64C 29/02 |
| 11,111,033 | B1* | 9/2021 | Burks | B64U 50/34 |
| 11,603,218 | B2* | 3/2023 | Fisher | B64F 1/04 |
| 11,603,219 | B2* | 3/2023 | Ratajczak | B64D 27/24 |
| 11,636,771 | B2* | 4/2023 | Barker | B64U 50/39, 701/16 |
| 11,641,966 | B2* | 5/2023 | Nakanishi | A47G 29/124, 232/44 |
| 11,673,690 | B2* | 6/2023 | Dayan | B64U 80/70, 244/114 R |
| 11,710,092 | B2* | 7/2023 | Dearing | G07C 9/00896, 705/330 |
| 11,738,867 | B2* | 8/2023 | Ehasoo | B60L 5/18, 244/17.11 |
| 11,741,422 | B2* | 8/2023 | Gil | B65G 1/0478, 705/338 |
| 11,767,129 | B2* | 9/2023 | Warwick | B64F 1/007, 244/137.1 |
| 11,780,606 | B2* | 10/2023 | Carthew | B64U 70/93, 244/114 R |
| 11,814,191 | B2* | 11/2023 | Cheng | B64U 60/50 |
| 11,814,241 | B2* | 11/2023 | Tian | B60P 3/11 |
| 11,851,209 | B2* | 12/2023 | Fisher | B64F 1/005 |
| 11,866,168 | B2* | 1/2024 | Cooper | B64U 70/97 |
| 11,939,057 | B2* | 3/2024 | Hamm | B64U 20/70 |
| 11,939,080 | B2* | 3/2024 | Cowden | B64U 80/30 |
| 12,065,273 | B2* | 8/2024 | Kiyokami | B64U 10/13 |
| 12,162,626 | B2* | 12/2024 | Wankewycz | B64D 37/14 |
| 12,168,533 | B1* | 12/2024 | Hinman | B64U 70/97 |
| 12,195,213 | B2* | 1/2025 | Qi | B64U 70/97 |
| 12,214,902 | B2* | 2/2025 | Infanti | B64C 25/62 |
| 2011/0174925 | A1* | 7/2011 | Ying | B64F 1/005, 701/16 |
| 2012/0080556 | A1* | 4/2012 | Root, Jr. | B64F 1/06, 73/170.28 |
| 2013/0233964 | A1* | 9/2013 | Woodworth | B64U 10/60, 244/175 |
| 2014/0124621 | A1* | 5/2014 | Godzdanker | B64F 1/28, 244/110 E |
| 2014/0319272 | A1* | 10/2014 | Casado Magana | B60L 3/12, 244/110 E |
| 2015/0069968 | A1* | 3/2015 | Pounds | B60L 53/35, 320/109 |
| 2015/0123462 | A1* | 5/2015 | Kamradt | B67D 7/02, 141/192 |
| 2015/0158599 | A1* | 6/2015 | Sisko | B64F 1/20, 244/114 R |
| 2015/0175276 | A1* | 6/2015 | Koster | A47G 29/14, 244/114 R |
| 2015/0183528 | A1* | 7/2015 | Walsh | B64C 39/024, 244/114 R |
| 2015/0363843 | A1* | 12/2015 | Loppatto | G06Q 30/0283, 705/330 |
| 2016/0001883 | A1* | 1/2016 | Sanz | B64U 10/13, 244/17.23 |
| 2016/0003637 | A1* | 1/2016 | Andersen | G01C 21/362, 701/519 |
| 2016/0011592 | A1* | 1/2016 | Zhang | G05D 1/10, 244/114 R |
| 2016/0039541 | A1* | 2/2016 | Beardsley | B60L 53/14, 701/2 |
| 2016/0068264 | A1* | 3/2016 | Ganesh | G08G 5/55, 701/4 |
| 2016/0068265 | A1* | 3/2016 | Hoareau | G06Q 10/08, 701/3 |
| 2016/0130000 | A1* | 5/2016 | Rimanelli | B64U 20/50, 244/2 |
| 2016/0131025 | A1* | 5/2016 | Pekrul | F02B 53/10, 123/205 |
| 2016/0185466 | A1* | 6/2016 | Dreano, Jr. | G06Q 10/083, 705/26.81 |
| 2016/0194959 | A1* | 7/2016 | Pekrul | F01C 19/06, 418/146 |
| 2016/0196756 | A1* | 7/2016 | Prakash | B64U 70/95, 701/3 |
| 2016/0200438 | A1* | 7/2016 | Bokeno | G05D 1/102, 244/2 |
| 2016/0207627 | A1* | 7/2016 | Hoareau | B64D 1/02 |
| 2016/0229299 | A1* | 8/2016 | Streett | B64F 1/222 |
| 2016/0244162 | A1* | 8/2016 | Weller | B64U 10/13 |
| 2016/0244776 | A1* | 8/2016 | Byers | G06Q 10/0832 |
| 2016/0257423 | A1* | 9/2016 | Martin | B64U 50/34 |
| 2016/0257426 | A1* | 9/2016 | Mozer | B64F 1/362 |
| 2016/0280371 | A1* | 9/2016 | Canavor | H04W 4/029 |
| 2016/0286128 | A1* | 9/2016 | Zhou | H04N 23/68 |
| 2016/0304198 | A1* | 10/2016 | Jourdan | G08G 5/57 |
| 2016/0311329 | A1* | 10/2016 | Rodriguez | B60L 58/18 |
| 2016/0340006 | A1* | 11/2016 | Tang | B63C 9/01 |
| 2016/0364989 | A1* | 12/2016 | Speasl | G08G 5/57 |
| 2017/0015415 | A1* | 1/2017 | Chan | G06Q 30/04 |
| 2017/0021941 | A1* | 1/2017 | Fisher | B64U 10/20 |
| 2017/0021942 | A1* | 1/2017 | Fisher | B64U 70/80 |
| 2017/0023949 | A1* | 1/2017 | Fisher | G08G 5/55 |
| 2017/0050749 | A1* | 2/2017 | Pilskalns | B60L 53/14 |
| 2017/0096222 | A1* | 4/2017 | Spinelli | B64U 80/25 |
| 2017/0129464 | A1* | 5/2017 | Wang | H02J 7/0045 |
| 2017/0129603 | A1* | 5/2017 | Raptopoulos | B64F 1/22 |
| 2017/0132558 | A1* | 5/2017 | Perez | G06Q 10/083 |
| 2017/0137118 | A1* | 5/2017 | Gentry | B64D 1/02 |
| 2017/0144776 | A1* | 5/2017 | Fisher | B64U 10/25 |
| 2017/0158353 | A1* | 6/2017 | Schmick | B60L 53/12 |
| 2017/0190443 | A1* | 7/2017 | Fisher | B64F 1/005 |
| 2017/0203632 | A1* | 7/2017 | Westendarp | B60H 1/00378 |
| 2017/0225782 | A1* | 8/2017 | Kohstall | B64U 30/26 |
| 2017/0225799 | A1* | 8/2017 | Selwyn | B64F 1/005 |
| 2017/0225802 | A1* | 8/2017 | Lussier | B64U 10/14 |
| 2017/0240291 | A1* | 8/2017 | Kim | H01M 16/006 |

(56) References Cited

U.S. PATENT DOCUMENTS

| | | | |
|---|---|---|---|
| 2017/0253349 A1* | 9/2017 | Wang | B64U 70/97 |
| 2017/0275025 A1* | 9/2017 | Johnson | B64F 1/362 |
| 2017/0305575 A1* | 10/2017 | Bash | B64F 1/32 |
| 2017/0308850 A1* | 10/2017 | Roush | G01C 21/343 |
| 2017/0316701 A1* | 11/2017 | Gil | B60P 3/11 |
| 2017/0323129 A1* | 11/2017 | Davidson | G05D 1/0234 |
| 2017/0327091 A1* | 11/2017 | Capizzo | H01M 10/30 |
| 2017/0341769 A1* | 11/2017 | Haberbusch | F17C 5/007 |
| 2018/0039286 A1* | 2/2018 | Tirpak | B64U 80/25 |
| 2018/0053139 A1* | 2/2018 | Stoman | B64U 10/13 |
| 2018/0056794 A1* | 3/2018 | Kim | B60L 53/126 |
| 2018/0092345 A1* | 4/2018 | Okumura | F41G 7/2253 |
| 2018/0092484 A1* | 4/2018 | Lewis | G08G 5/54 |
| 2018/0105020 A1* | 4/2018 | Smith | B60H 1/262 |
| 2018/0118340 A1* | 5/2018 | Russo | B64U 50/37 |
| 2018/0194484 A1* | 7/2018 | Livieratos | F02B 41/04 |
| 2018/0196418 A1* | 7/2018 | Meier | G05D 1/0206 |
| 2018/0237161 A1* | 8/2018 | Minnick | B64U 50/37 |
| 2018/0245365 A1* | 8/2018 | Wankewycz | B64U 10/13 |
| 2018/0312276 A1* | 11/2018 | Miller | B64U 10/14 |
| 2018/0319496 A1* | 11/2018 | Zhang | B64U 20/50 |
| 2018/0370618 A1* | 12/2018 | Harris | B64C 25/24 |
| 2019/0009926 A1* | 1/2019 | Hu | B64U 70/99 |
| 2019/0047462 A1* | 2/2019 | Vijayaraghavan | B60W 30/00 |
| 2019/0100108 A1* | 4/2019 | Davis | B64U 80/84 |
| 2019/0106224 A1* | 4/2019 | Nishikawa | B64F 1/228 |
| 2019/0152326 A1* | 5/2019 | Nishikawa | B64U 50/19 |
| 2019/0161190 A1* | 5/2019 | Gil | E05F 15/77 |
| 2019/0193952 A1* | 6/2019 | Zevenbergen | B64U 80/25 |
| 2019/0256202 A1* | 8/2019 | Resnick | B64U 10/13 |
| 2019/0263519 A1* | 8/2019 | Argus | B64U 50/11 |
| 2019/0291961 A1* | 9/2019 | Urban | G06Q 50/40 |
| 2019/0308724 A1* | 10/2019 | Cooper | B64U 80/25 |
| 2019/0315235 A1* | 10/2019 | Kung | B64U 50/39 |
| 2019/0348862 A1* | 11/2019 | Obayashi | H02J 50/90 |
| 2020/0017237 A1* | 1/2020 | Walker | B64F 1/362 |
| 2020/0055613 A1* | 2/2020 | Miller | G05D 1/0676 |
| 2020/0148322 A1* | 5/2020 | Pekrul | B63H 5/02 |
| 2020/0165008 A1* | 5/2020 | Krauss | B64U 80/25 |
| 2020/0180940 A1* | 6/2020 | Rainville | B64F 1/28 |
| 2020/0207484 A1* | 7/2020 | Foggia | B64U 70/92 |
| 2020/0218287 A1* | 7/2020 | Wang | B64U 50/34 |
| 2020/0218288 A1* | 7/2020 | Johnson | B64U 30/26 |
| 2020/0239160 A1* | 7/2020 | Cheng | B64F 1/22 |
| 2020/0247540 A1* | 8/2020 | Jones | B64D 7/08 |
| 2020/0301445 A1* | 9/2020 | Jourdan | G06K 19/06037 |
| 2020/0349852 A1* | 11/2020 | DiCosola | G08G 5/55 |
| 2021/0047055 A1* | 2/2021 | Lee | B64F 1/36 |
| 2021/0053677 A1* | 2/2021 | Passley | B64U 70/95 |
| 2021/0122495 A1* | 4/2021 | Rezvani | B64F 1/007 |
| 2021/0125503 A1* | 4/2021 | Henry | G06F 3/04817 |
| 2021/0148131 A1* | 5/2021 | Wankewycz | B64U 70/92 |
| 2021/0237694 A1* | 8/2021 | Hirschvogel | B60J 7/16 |
| 2021/0237899 A1* | 8/2021 | Warwick | B64C 39/024 |
| 2021/0284356 A1* | 9/2021 | Jourdan | G08G 5/55 |
| 2021/0300591 A1* | 9/2021 | Tian | B64F 1/007 |
| 2021/0394930 A1* | 12/2021 | O'Toole | A47G 29/30 |
| 2022/0041279 A1* | 2/2022 | Rowse | G05D 1/104 |
| 2022/0041299 A1* | 2/2022 | Wankewycz | B64D 37/14 |
| 2022/0055770 A1* | 2/2022 | O'Toole | B60L 53/80 |
| 2022/0242589 A1* | 8/2022 | Pham | G09F 27/005 |
| 2022/0380063 A1* | 12/2022 | Shah | B64F 1/362 |
| 2023/0023246 A1* | 1/2023 | McLaughlin | G05D 1/0088 |
| 2023/0031028 A1* | 2/2023 | Ehasoo | B64U 80/10 |
| 2023/0088830 A1* | 3/2023 | Kim | B64U 50/32 244/221 |
| 2023/0100169 A1* | 3/2023 | Laczak | A47G 29/141 232/1 R |
| 2023/0202682 A1* | 6/2023 | Kiyokami | B64U 70/90 244/114 R |
| 2023/0202691 A1* | 6/2023 | Kiyokami | B64U 80/86 244/114 R |
| 2024/0278946 A1* | 8/2024 | Roberts | B64U 10/16 |
| 2025/0074632 A1* | 3/2025 | DiCosola | G06Q 10/20 |

FOREIGN PATENT DOCUMENTS

| | | |
|---|---|---|
| CN | 112027102 A | 12/2020 |
| EP | 3789304 A1 | 3/2021 |
| EP | 3845453 A1 | 7/2021 |
| GB | 2583344 A | 10/2020 |
| KR | 20200122962 A | 10/2020 |
| KR | 20210008405 A | 1/2021 |
| WO | WO 2016/130797 A1 | 8/2016 |
| WO | WO 2017/029611 A1 | 2/2017 |
| WO | WO 2018/227153 A1 | 12/2018 |
| WO | WO 2020/030919 A1 | 2/2020 |
| WO | WO 2020/033177 A1 | 2/2020 |

OTHER PUBLICATIONS

Easy Drone; https://www.easyaerial.com/; Jan. 2, 2015.
Airobotics Solution; https://www.airoboticsdrones.com/; Feb. 8, 2018.
Tarot X4 Hydrogen Fuel cell Powered Drone Setup Instruction; https://www.youtube.com/watch?v=U_FRA63uihw; Sep. 18, 2020.
Smart Agriculture Solutions; https://www.xagaustralia.com.au/; Feb. 29, 2020.
Skydio 2; https://www.skydio.com/; Jun. 10, 2020.
Airscort | Autonomous Drone Docking Stations; https://www.airscort.me/; Apr. 2, 2018.
Edronic—Drone Charging Station for Automated drone operations; http://www.edronic.com/; Jan. 19, 2018.

* cited by examiner

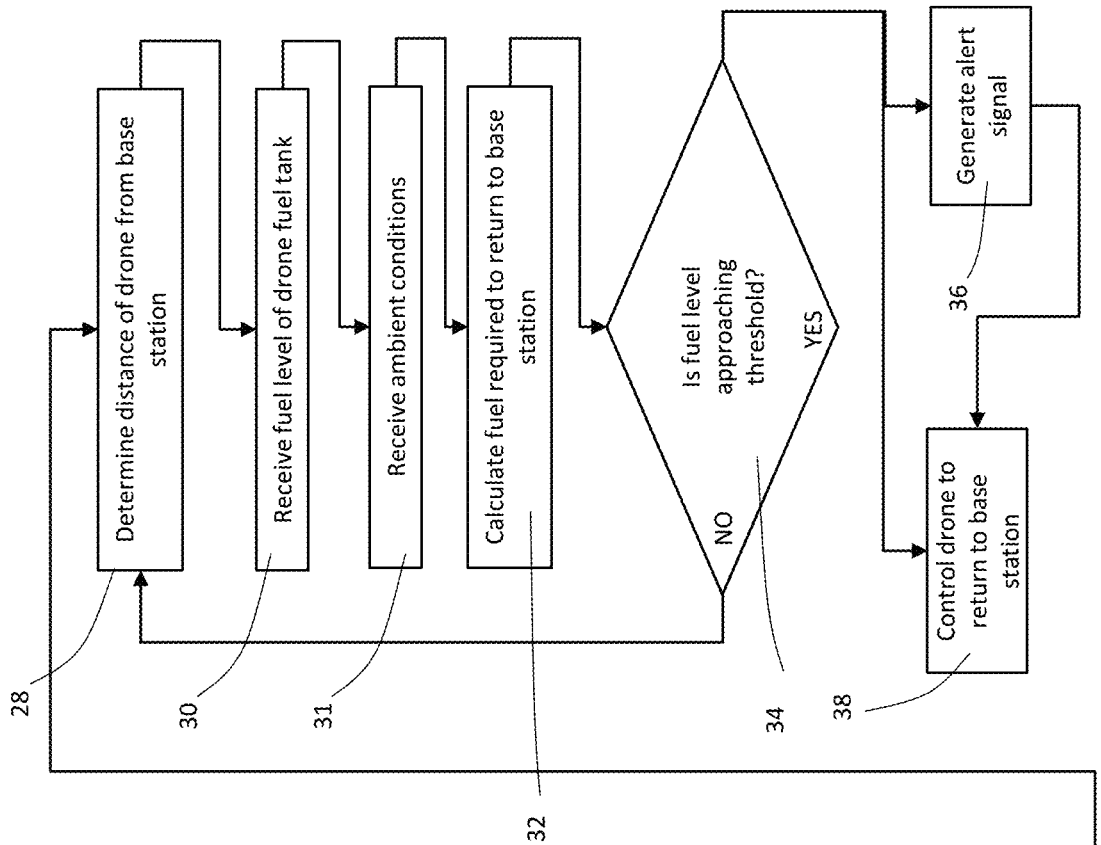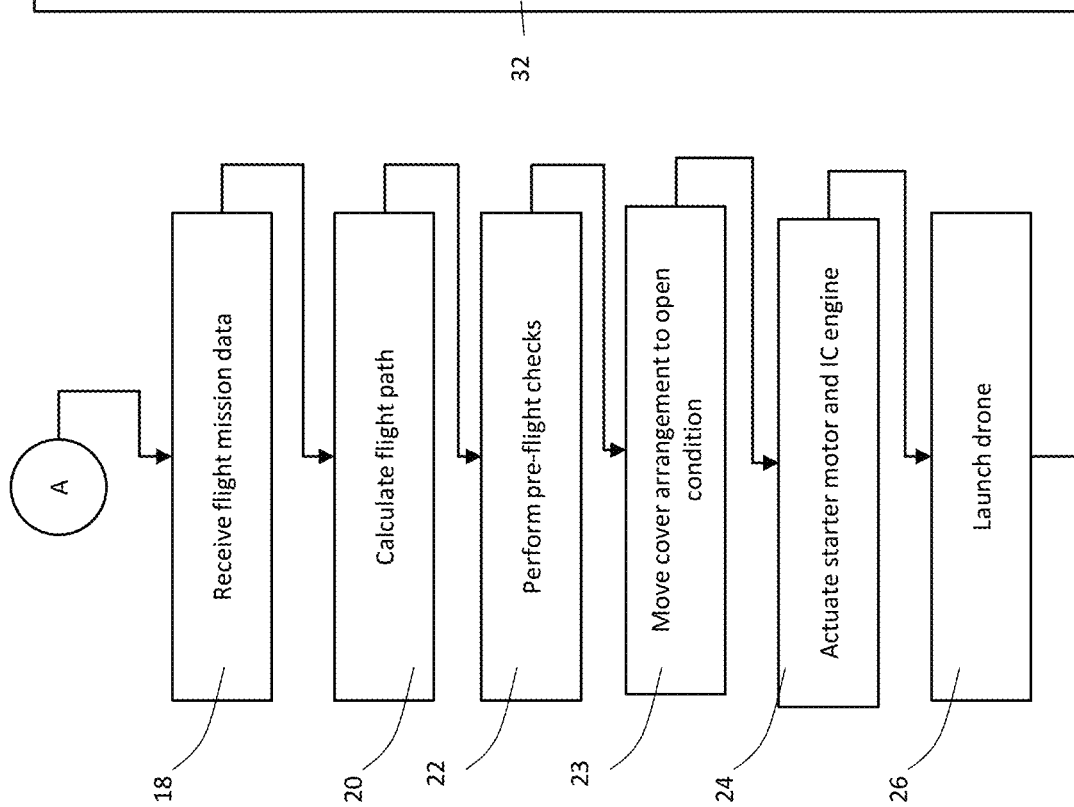
FIG. 40

HYBRID DRONE, BASE STATION AND METHODS THEREFOR

CROSS-REFERENCE TO RELATED PATENT APPLICATIONS

This patent application is a continuation of co-pending PCT Application No. PCT/AU2022/051196, filed Oct. 6, 2022, which is now pending, and which claims the benefit of Australian Application No. 2021903218, filed Oct. 7, 2021, the entire teachings and disclosure each of which are incorporated herein by reference thereto.

FIELD OF THE INVENTION

The present invention relates to a drone system and method therefor and in particular to a remotely operable drone system.

The invention has been developed primarily for use in/with operation in remote areas for surveying or inspection, and will be described hereinafter with reference to this application. However, it will be appreciated that the invention is not limited to this particular field of use.

BACKGROUND OF THE INVENTION

At present, drones are being increasingly used. Drones are used in many different industries such as in mining, defense and in monitoring agricultural fields or monitoring a structure's integrity such as a wind turbine. A drone may be fully electric, meaning an onboard battery is used to power one or more electric motors. Alternatively, a drone may be power by an internal combustion engine. An internal combustion engine powered drone is typically favored when more range is required.

Any discussion of the background art throughout the specification should in no way be considered as an admission that such background art is prior art, nor that such background art is widely known or forms part of the common general knowledge in the field in Australia or any other country.

SUMMARY OF THE INVENTION

The invention seeks to provide a portable base station and hybrid drone which will overcome or substantially ameliorate at least some of the deficiencies of the prior art, or to at least provide an alternative.

Base Station

Disclosed herein is a portable base station for use with a hybrid drone, the base station comprising:
  a. a cover arrangement to at least partially shield the hybrid drone when the hybrid drone is in a received position;
  b. an alignment formation configured for guiding the hybrid drone to the received position; and
  c. an autonomous refueling mechanism adapted to align with a refuelling port on the drone for autonomously refuelling the hybrid drone in use.

In one embodiment, the autonomous refuelling mechanism includes an autonomous refuelling connection mechanism.

In one embodiment, the base station includes a communications interface for communicating with the hybrid drone.

In one embodiment, the communications interface is configured for communicating with the hybrid drone in one or more selected from:
  a. a local area network; and
  b. a wide area network.

In one embodiment, the communication interface is configured for communication via a wide area network.

In one embodiment, the communication interface is configured for communication via one or more selected form:
  a. a cellular network;
  b. a satellite network; and
  c. any other suitable wide area network.

In one embodiment, the base station includes a docking arrangement adapted for docking with the hybrid drone.

In one embodiment, the docking arrangement includes an alignment formation adapted for guiding the hybrid drone to engage with the autonomous refuelling mechanism.

In one embodiment, the alignment formation is configured for engaging with an engaging formation on the hybrid drone on docking.

In one embodiment, the alignment formation is a recess.

In one embodiment, the recess defines at least one or more sides.

In one embodiment, the sides of the recess extend downwardly at an acute angle to the horizontal in use.

In one embodiment, the alignment formation are symmetrical.

In one embodiment, the alignment formation is configured for nesting with an engaging formation on the hybrid drone on docking.

In one embodiment, the alignment formation is inverted frustoconical in shape.

In one embodiment, the alignment formation is pyramidal in shape.

In one embodiment, the docking arrangement is at least partly surrounded by a platform.

In one embodiment, the platform includes apertures adapted to reduce wash from propeller blades of the autonomous drone.

In one embodiment, the base station includes a cover arrangement adapted to cover the docking arrangement.

In one embodiment, the cover arrangement is slidably openable.

In one embodiment, the cover arrangement is pivotably openable.

In one embodiment, the cover arrangement is movable between an:
  a. open condition in which the autonomous refuelling mechanism is accessible by the drone on docking, and
  b. a closed condition.

In one embodiment, when the cover arrangement is in its closed condition the drone may be covered from the elements.

In one embodiment, when the cover arrangement is in its open condition the drone can launch.

In one embodiment, when the cover arrangement is in its closed condition, it is configured for at least partly covering one or more selected from
  a. the docking arrangement, and
  b. the refuelling mechanism.

In one embodiment, the cover arrangement is configured to cover a docked drone when the cover arrangement is in its closed condition.

In one embodiment, the cover arrangement prevents access by the hybrid drone to the docking arrangement when the cover arrangement is in its closed condition.

In one embodiment, the cover arrangement includes at least one or more moveable panels.

In one embodiment, the moveable panels are moveable between an open position and a closed position.

In one embodiment, when the closed position of the moveable panels corresponds to the closed condition of the cover arrangement.

In one embodiment, when the open position of the moveable panels corresponds to the open condition of the cover arrangement.

In one embodiment, the panels are slidingly moveable.

In one embodiment, the panels are pivotably moveable.

In one embodiment, the panels are angled to the horizontal.

In one embodiment, the cover arrangement comprises a pair of opposed sliding panels.

In one embodiment, the cover arrangement comprises a pair of opposed pivoting panels.

In one embodiment, the cover arrangement is configured to secure a hybrid drone in position for travelling when the cover arrangement is in its closed condition.

In one embodiment, the sliding panels move downwardly and outwardly from their closed condition to their open condition.

In one embodiment, the pivoting panels pivot outwardly from their closed condition to their open condition.

In one embodiment, the base station includes solar panels.

In one embodiment, the solar panels are mounted to the movable panels.

In one embodiment, the base station includes a power storage device.

In one embodiment, the docking arrangement includes one or more selected from an electromagnetic frequency transmitter and an electromagnetic frequency sensor for transmitting or sensing an electromagnetic frequency signal to or from the hybrid drone to assist with landing.

In one embodiment, the base station includes at least one exhaust arrangement adapted to extract fuel fumes from the vicinity of the autonomous refuelling mechanism.

In one embodiment, the exhaust arrangement includes an exhaust fan.

In one embodiment, the communications interface is a wireless communications interface adapted to communicate with the hybrid drone in use.

In one embodiment, the base station includes an inductive charging device adapted to charge a power storage device of the hybrid drone by a complementary drone inductive charging device when the hybrid drone is docked.

In one embodiment, the autonomous refuelling mechanism includes a fuel tank.

In one embodiment, the fuel capacity of the fuel tank is proportional to the fuel consumed in the average serviceable life of an internal combustion engine of the hybrid drone.

In one embodiment, the autonomous refuelling mechanism includes a first magnetic connector configured for autonomous connection with a complementary magnetic connector on the hybrid drone.

In one embodiment, the first magnetic connector is associated with a fuel passage from the fuel tank of the base station.

In one embodiment, the base station includes a weather station configured for retrieving and/or detecting the ambient weather conditions.

In one embodiment, the weather station is configured for retrieving the weather conditions from an online resource.

In one embodiment, the base station includes a housing configured for housing one or more selected from the refuelling mechanism and the docking arrangement.

In one embodiment, the housing includes an insulative lining for insulating the interior of the housing from radiative heat from the sun.

In one embodiment, the base station includes a fire extinguishing system.

In one embodiment, the fire extinguishing system is automated.

In one embodiment, the base station includes a drone locking system configured for securing the drone during transport.

In one embodiment, the drone locking system is automated.

In one embodiment, the base station includes a fireproof frame.

In one embodiment, the base station includes an outer fireproof cladding.

In one embodiment, the base station includes at least one or more wheels.

In one embodiment, the base station includes including a tow coupler.

In one embodiment, the base station includes an electrical power storage device.

In one embodiment, the base station includes a generator.

In one embodiment, the generator is configured for maintaining the charge of the electrical power storage device.

In one embodiment, the electrical power storage device is configured for feeding electrical power to the inductive charging device.

Controller

In one embodiment, the base station includes a controller.

The base station of any one of the preceding claims, including one or more sensors.

In one embodiment, the sensors include one or more selected from:
a. a proximity sensor;
b. a temperature sensor;
c. fuel level sensor;
d. pressure sensor;
e. moisture sensor;
f. humidity sensor;
g. geopositoning sensor;
h. distance sensor;
i. light sensor; and
j. any other suitable sensor.

In one embodiment, the controller is configured for:
a. receiving signals from the sensors.

In one embodiment, the controller is configured for:
a. detecting the docking of the hybrid drone.

In one embodiment, the controller is configured for:
a. detecting the connection of the fuel passage from the fuel tank to the fuel passage of the hybrid drone.

In one embodiment, the controller is configured for:
a. detecting the fuel level of the fuel tank.

In one embodiment, the controller is configured for:
a. actuating a fuel pump to transfer fuel from the fuel tank to the hybrid drone.

In one embodiment, the controller is configured for:
a. receiving a weather signal from the weather station In one embodiment, the controller is configured for:
a. determining whether conditions are safe for the flying of the hybrid drone.

In one embodiment, the controller is configured for:
a. generating an alert signal in the event that conditions are not safe for the flying of the hybrid drone.

In one embodiment, the controller is configured for:
a. actuating movement of the cover arrangement.

In one embodiment, the controller is configured for:
a. transmitting the alert signal to a remote operator of the hybrid drone.

In one embodiment, the controller is configured for:
a. receiving a control signal from a remote operator for the control of the drone.

In one embodiment, the controller is configured for:
a. transmitting the control signal to the hybrid drone.

In one embodiment, the controller is configured for:
a. receiving a flight path signal indicative of the flight path to be flown by the hybrid drone.

In one embodiment, the controller is configured for:
a. controlling operation of the hybrid drone via the communications interface to fly the hybrid drone along the flight path.

In one embodiment, the controller is configured for:
a. actuating movement of the covering arrangement between its open condition and its closed condition.

In one embodiment, the controller is configured for:
a. determining the amount of fuel remaining in the fuel tank of the hybrid drone.

In one embodiment, the controller is configured for:
a. generating an alert signal if the remaining fuel in the fuel tank is approaching the amount of fuel required to return the hybrid drone to the base station.

In one embodiment, the controller is configured for:
a. actuating the hybrid drone to return to the base station.

In one embodiment, the controller is configured for:
a. controlling the flight of the hybrid drone to return to the base station.

In one embodiment, the controller is configured for:
a. receiving flight mission data indicative of the flight path to be flown by the hybrid drone.

In one embodiment, the controller is configured for:
a. transmitting the flight mission data to the hybrid drone.

In one embodiment, the controller is configured for:
a. controlling the flight of the drone to follow the flight path indicated by the flight mission data.

In one embodiment, the controller is configured for:
a. receiving area details of an area to be surveyed by the hybrid drone.

In one embodiment, the controller is configured for:
a. calculating a flight path for the drone from the area details.

In one embodiment, the autonomous refuelling mechanism is aligned with the refueling port on the hybrid drone, when the cover arrangement is in the closed position.

In one embodiment, the fuel line on the base station is attached to the cover arrangement and first magnetic connector extends toward the hybrid drone from the cover arrangement, when the cover is in the closed position.

In one embodiment, in the closed position, the first magnetic connector and the complementary magnetic connector connect, thereby allowing fuel to flow from fuel tank of the base station through the fuel line and into the fuel tank of the drone, during refuelling.

A docking arrangement for receiving and guiding a drone into a docking position, the docking arrangement comprising:
a. a recessed alignment formation configured for receiving and guiding a locating formation on a hybrid drone to accurately guide the hybrid drone to land on a recessed base.

In one embodiment, the recessed alignment formation is includes tapered sidewalls extending downwardly to the recess base.

In one embodiment, the recessed alignment formation is surrounded by a platform.

In one embodiment, the recessed alignment formation is configured as one or more selected from:
i. an inverted pyramid shape; and
ii. an inverted frusto-conical shape.

In one embodiment, the inverted pyramid shape is a hexagonal pyramid shape.

In one embodiment, the docking arrangement further comprises an inductive charging mechanism configured for inductively charging a complementary inductive charging mechanism on the drone.

According to a further aspect of the present invention, a method is provided for docking a drone, the method comprising the steps of:
a. locating a drone above a base station alignment formation, the alignment formation being configured as a concave recess, the drone including a shaped aligning formation extending underneath a body;
b. lowering the drone to engage at least a part of the aligning formation with an inner surface of the alignment formation, thereby causing the alignment formation to guide the drone to land on a base.

In one embodiment, alignment formation includes tapered sidewalls extending downwardly to the base.

In one embodiment, the tapered sidewalls extended an acute angle to the horizontal.

In one embodiment, the base is a flat plane.

In one embodiment, the shaped aligning formation is one or more selected from:
a. circular;
b. rectangular;
c. pentagonal;
d. hexagonal
e. septagonal;
f. and octagonal.

In one embodiment, the shaped aligning formation extends in a horizontal orientation in use.

In one embodiment, the shaped aligning formation extends downwardly from the body in use.

In one embodiment, the method includes the step of autonomously coupling a fuel line connector associated with the drone with a fuel line connector associated with the portable base station.

In one embodiment, the method includes the step of magnetically coupling the fuel line connector associated with the drone with the fuel connector associated with portable base station.

According to a further aspect of the present invention, a method is provided for docking a drone, the method comprising the steps of:
a. locating a drone above a base station alignment formation, the alignment formation being configured as a frusto-conical recess, the drone including a shaped aligning formation located underneath a body;
b. lowering the drone to engage at least a part of the circular aligning formation with an inner surface of the alignment formation, thereby causing the alignment formation to guide the drone to land on a base.

In one embodiment, the base is a flat plane.

In one embodiment, the shaped aligning formation is circular.

In one embodiment, the shaped aligning formation extends in a horizontal orientation.

In one embodiment, the shaped aligning formation extends downwardly from the body.

In one embodiment, the method includes the step of autonomously coupling a fuel line connector associated with the drone with a fuel line connector associated with the portable base station.

In one embodiment, the method includes the step of magnetically coupling the fuel line connector associated with the drone with the fuel connector associated with portable base station.

Also disclosed herein is a method of landing an autonomous drone, the method comprising the steps of:
a. generating a beam of electromagnetic radiation of a particular frequency range from one selected from a drone and a base station;
b. sensing, using a sensor, the generated beam on the other selected from the drone and the base station;
c. controlling movement of the drone to align the generated beam and the sensor; and
d. landing the drone on the base station.

In one embodiment, the step of sensing the beam includes the step of sensing one or more characteristics of the generated beam.

In one embodiment, the step of sensing the beam includes the step of sensing one or more characteristics of the reflected beam.

In one embodiment, the step of controlling movement of the drone to align the beam and the sensor comprises the step of controlling movement of the drone to increase the sensed intensity of the generated beam.

Also disclosed herein is a cover arrangement for a drone landing area, the cover arrangement comprising:
a. at least one moveable panel movable to a side of the drone landing area, the sliding panel being aligned at a downwardly slanted angle away from the landing area.

In one embodiment, the cover arrangement comprises a pair of opposed moveable panels movable to either side of the landing area.

In one embodiment the opposed panes are slidably moveable.

In one embodiment the opposed panels are pivotably moveable.

Also disclosed herein is a method of autonomously refuelling a drone on a base station, the method comprising the steps of:
a. guiding a landing drone to a landing area;
b. autonomously connecting the fuel line of the drone to a fuel line on the base station; and
c. actuating a fuel pump to refuel the drone.

In one embodiment, the method includes the step of:
a. actuating an inductive charging device on the base station to charge an electrical power storage device on the drone via a complementary inductive charging device on the drone.

In one embodiment, the method includes the step of:
a. receiving a signal indicative of the fuel level in a fuel tank on the drone.

Process for Launching Drone

Also disclosed herein is a method for launching an autonomous hybrid drone, the method comprising the steps of:
a. checking fuel levels in fuel tank;
b. uploading flight data for at least one flight mission;
c. performing preflight checks for preparation for flight;
d. actuating starter motor; and
e. launching the drone for flight.

In one embodiment, the method further includes the step of determining a flight path for the flight mission.

In one embodiment, the step of determining a flight path for the flight mission is carried out automatically, using an initial set of parameters.

In one embodiment, the initial set of parameters includes one or more selected from:
a. details of an area to be surveyed;
b. details of the starting location of the drone; and
c. terrain data.

Also disclosed herein is a method for monitoring an autonomous drone, the method comprising the steps of:
a. determine fuel level in drone;
b. determine distance of drone from base station;
c. calculate time required to return to drone based on one or more selected from:
  i. the fuel level in the drone; and
  ii. the distance of the drone from the base station; and
  iii. ambient conditions.

Also disclosed herein is a system for remotely controlling a drone, the system comprising:
a. a base station as described;
b. a hybrid drone as described;
c. a communication system configured for receiving video feed from the hybrid drone via the base station, and for transmitting control signals to the hybrid drone via the base station.

Hybrid Drone

Also disclosed herein is a hybrid drone comprising:
a. a plurality of propellers oriented to allow vertical take-off and landing (VTOL);
b. one or more electric motors configured to rotate the plurality of propellers;
c. an energy storage device for powering the one or more electric motors;
d. an electrical power generation device for charging the energy storage device;
e. a combustion engine for driving the electrical power generation device; and
f. a fuel tank to store fuel for the combustion engine,
wherein the fuel tank is configured for receiving fuel from a base station autonomously.

In one embodiment, the electrical power generation device includes one or more selected from:
a. a prime mover operatively coupled to a generator to generate electrical power; and
b. a fuel cell.

In one embodiment, the hybrid drone further includes an electrical power storage device.

In one embodiment, the hybrid drone further includes a fuselage housing at least a hybrid engine and a fuel tank.

In one embodiment, the hybrid drone further includes at least one or more sensors for sensing one or more terrain and/or building characteristics.

In one embodiment, the at least one or more sensors includes one or more selected from
a. a camera for capturing images;
b. a radar sensor;
c. a lidar sensor;
d. an acoustic sensor; and
e. any other suitable sensor.

In one embodiment, the hybrid drone further includes a locating arrangement adapted to locate with an alignment arrangement of a portable base station for positioning the hybrid drone for refuelling.

In one embodiment, the hybrid drone further includes a communications interface for communicating with the portable base station; and In one embodiment, the the fuel tank includes a refuelling member, the refuelling member includes a complementary magnetic connector, the complementary magnetic connector being adapter to connect with a first magnetic connector of the base station, such that during refuelling, fuel can be supplied to the fuel tank via the first magnetic connector, the complementary magnetic connector and the refuelling member.

In one embodiment, the hybrid drone further includes a hybrid starter motor and alternator.

In one embodiment, the drone includes an inductive charging mechanism configured for charging the electrical power storage device on being inductively stimulated by a complementary inductive charging device associated with the portable base station.

In one embodiment, the hybrid engine is adapted for detachable release with the fuselage.

In one embodiment, the drone includes a real time fuel monitoring system adapted to determine when the drone needs to return to the base station for refuelling.

In one embodiment, the drone fuel tank is a bladder arrangement.

In one embodiment, the at least one camera is an oblique camera.

In one embodiment, the drone includes an exhaust system having an outlet directed away from the at least one or more sensors.

In one embodiment, one or more selected from the fuel cell, the prime mover and the generator are adapted for convenient release from the drone to enable convenient swapping in with a replacement fuel cell, prime mover and/or generator.

In one embodiment, the generator is configured for powering the electric motors directly.

In one embodiment, the generator is configured for charging the battery with excess electrical power generated.

In one embodiment, the battery is configured for supplementing and/or smoothing electrical power being supplied to the electrical motors by the generator.

Disclosed herein is a hybrid drone comprising:
 a. a plurality of propellers oriented to allow vertical take-off and landing (VTOL);
 b. one or more electric motors configured to rotate the plurality of propellers;
 c. an energy storage device for powering the one or more electric motors;
 d. an electrical power generation device for charging the energy storage device;
 e. a fuel tank to store fuel for the electrical power generation device, wherein the fuel tank is configured for receiving fuel from a base station autonomously.

In one embodiment, the electrical power generation device includes one or more selected from:
 a. a combustion engine operatively coupled to a generator to generate electrical power; and
 b. a fuel cell to generate electrical power.

Also disclosed herein is a hybrid drone including:
 a. at least one or more electric motors configured for being driven by electrical power, the electric motors being configured for driving at least one or more propellers;
 b. at least one or more cameras configured for taking one or more selected from photos and videos from the drone in-flight;
 c. an electrical generator;
 d. an prime mover configured for driving the electrical generator to thereby directly or indirectly power the electric motors;
 e. wherein the internal combustion engine includes an exhaust outlet that is directed away from the line of sight of the at least one or more cameras.

In one embodiment, the primary is an internal combustion engine.

In one embodiment, the hybrid drone includes an electric power storage device.

In one embodiment, the electrical motors are supplied with electrical power from the electric power storage device.

In one embodiment, the electrical motors are supplied with electrical power from the generator.

In one embodiment, the electric power storage device is configured for providing supplemental electrical power to the electrical motors if the generator is not able to fully power the electrical motors.

Also disclosed herein is a hybrid drone including:
 a. at least one or more electric motors configured for being driven by electrical power, the electric motors being configured for driving at least one or more propellers;
 b. one or more selected from a fuel cell and a prime mover coupled to a generator; and
 c. a quick release mechanism whereby the said one or more selected from a fuel cell and a prime mover coupled to a generator can be conveniently swapped with a replacement fuel cell and/or prime mover coupled to a generator.

In one embodiment, the hybrid drone includes an electric power storage device.

In one embodiment, the one or more selected from the fuel cell and prime mover are configured for supplying electrical power to the electric motors.

In one embodiment, the electric power storage device is configured for absorbing excess electrical power generated by the one or more selected from the fuel cell and prime mover.

In one embodiment, the electric power storage device is configured for providing supplemental power to the electric motors.

In one embodiment, the hybrid drone further includes an alignment formation for docking with a complementary docking formation Also disclosed herein is an undercarriage for a drone, the undercarriage comprising:
 a. a downwardly extending aligning formation, the aligning formation being configured for being received within a tapered recess of a base station to guide the drone to land on a support base of the base station at a particular landing position.

In one embodiment, the aligning formation includes a base configured for abutment with the support base.

In one embodiment, the base of the aligning formation has an endless configuration.

In one embodiment, the endless configuration is one or more selected from:
 a. circular shaped;
 b. multisided symmetrically shaped;
 c. pentagonally shaped;
 d. hexagonal shaped; and
 e. septagonally shaped.

In one embodiment, the endless configuration includes an inductive charging mechanism.

In one embodiment, the inductive charging mechanism is configured for charging a battery on the drone.

Also disclosed herein is a drone for landing in a base station, the base station including a recess for receiving the drone, the drone comprising:
  a. a plurality of propellers configured for being driven by electrical motors;
  b. an outwardly extending protrusion extending outwardly of at least two or more propellers;
  c. the outwardly extending protrusions being configured for being supported on an outer edge of the recess to support the drone.

In one embodiment, the outwardly extending protrusions include a protective layer.

In one embodiment, at least one or more of the outwardly extending protrusions are configured for being captured by a locking mechanism on the base station.

Also disclosed herein is a hybrid drone including an inductive charging arrangement configured for being charged by a complementary inductive charging arrangement on a base station.

In one embodiment, the inductive charging arrangement is located within an undercarriage.

In one embodiment, the undercarriage includes a downwardly extending aligning formation configured for being received within a tapered recess of the base station to guide the drone to land on a support base of the base station.

In one embodiment, the aligning formation includes a base in an endless configuration.

Also disclosed herein is a hybrid drone comprising:
  a. an electric power storage device;
  b. at least one or more electric motors configured for being driven by electrical power, the electric motors being configured for driving at least one or more propellers;
  c. at least one or more cameras configured for taking one or more selected from photos and videos from the drone in-flight;
  d. an electrical generator; and
  e. an internal combustion engine configured for driving the electrical generator to thereby charge the electric power storage device;
  f. wherein the electrical generator is configured for one or more selected from supplying electrical power to the electrical motors and charging the electric power storage device, and the electrical generator is also configured to be used as a starter motor for the internal combustion engine.

In one embodiment, the electrical generator is a brushless motor.

Refuelling Adaptor

Also disclosed herein is a refuelling adapter for connecting two fuel lines, the refuelling adapter comprising:
  a. a first magnetic connector associated with a first fuel line;
  b. a second magnetic connector associated with a second fuel line; and
  c. a valve arrangement adapted to prevent ingress of foreign bodies into the first fuel line;
  d. wherein the first magnetic connector and second magnetic connector are configured to be attracted to each other when the first magnetic connector and second magnetic connector are within a predetermined distance of each other, and
  e. wherein the first magnetic connector and second magnetic connector are configured to magnetically attach to each other to create a sealed fluid connection between the first fuel line and the second fuel line.

In one embodiment, the refuelling adapter includes a valve arrangement adapted to allow the flow of fuel between the first fuel line and the second fuel line when the first magnetic connector is attached to the second magnetic connector, and prevent the flow of fuel between the first fuel line and the second fuel line when the first magnetic connector is not attached to the second magnetic connector in a sealed fluid connection.

In one embodiment, the first magnetic connector and second magnetic connector are configured to engage magnetically with each other at a sealing interface.

In one embodiment, the refuelling adapter includes at least one or more seal formations for sealing the first magnetic connector and the second magnetic connector to each other at the sealing interface when the first magnetic connector and the second magnetic connector are magnetically engaged with each other.

In one embodiment, the refuelling adapter includes at least one filter.

In one embodiment, the refuelling adapter includes a valve associated with one or both of the first fuel line and the second fuel line.

In one embodiment, the first connector and the second connector includes a sensing device for sensing when the first fuel line and second fuel line are in fluid connection with each other.

In one embodiment, the sensing device includes one or more selected from a fuel flow meters, Hall effect sensors, and electrical connectors.

Also disclosed herein is a method of autonomously refuelling a drone, the method comprising the steps of:
  a. providing a portable base station as claimed in any one of the preceding claims for:
  b. guiding a drone into position on landing on the portable base station;
  c. autonomously coupling a fuel line connector associated with the drone with a fuel line connector associated with the portable base station in a sealing fashion; and
  d. pumping fuel from the portable base station to the drone.

In one embodiment, the method may include the step of pumping fuel from the drone to the portable base station.

In one embodiment, the portable base station includes an inductive charging mechanism, and the method further comprises the step of inductively charging a battery on the drone.

In one embodiment, the fuel line connector associated with the drone is magnetically coupled the fuel line connector associated with the portable base station.

In one embodiment, the method further comprises the step of decoupling the fuel line connector associated with the drone from the fuel line connector associated with the portable base station.

In one embodiment, the method further comprises the step of causing the drone to take off from the portable base station using electrical power only.

In one embodiment, a valve is located on one or more selected from the fuel line associated with the drone and the fuel line associated with the portable base station and, on coupling, the method comprises the step of autonomously opening the valve.

Other aspects of the invention are also disclosed.

BRIEF DESCRIPTION OF THE DRAWINGS

Notwithstanding any other forms which may fall within the scope of the present invention, a preferred embodiment of the invention will now be described, by way of example only, with reference to the accompanying drawings in which:

FIGS. 39-40 show flowcharts of a method of generally operating a hybrid drone;

DESCRIPTION OF EMBODIMENTS

Figure 1:
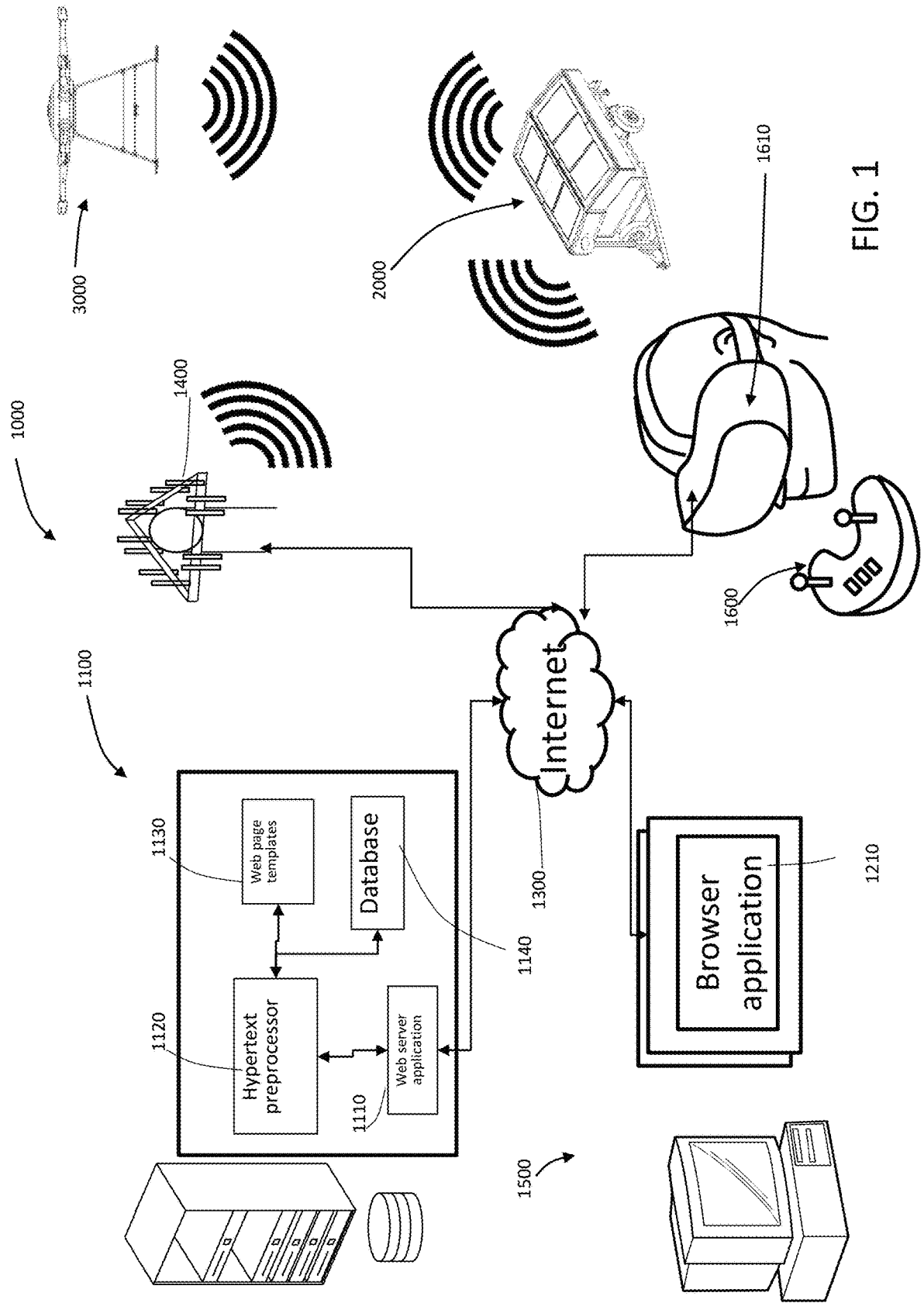
FIG. 1 shows a schematic view of a system for remotely controlling a drone; the FIG. 2 shows a schematic view of a computing device that may be used as a controller by a remote user, the base station controller and/or a hybrid drone controller.

It should be noted in the following description that like or the same reference numerals in different embodiments denote the same or similar features.

System for Remotely Controlling a Drone

FIG. 1 shows a system 1000 of computing devices adapted for use as a system for remotely controlling a drone, and on which the methods described below may be carried out.

As such, the system 1000 comprises a server 1100 for serving web pages and other files, such as video files or streaming video, to one or more client computing devices 1500 over the Internet 1300.

In a preferred embodiment, the server 1100 is a web server having a web server application 1110 for receiving requests, such as Hypertext Transfer Protocol (HTTP) and File Transfer Protocol (FTP) requests, and serving hypertext web pages or files in response. The web server application 1110 may be, for example the Apache™ or the Microsoft™ IIS HTTP server.

The server 1100 is also provided with a hypertext preprocessor 1120 for processing one or more web page templates 1130 and data from one or more databases 1140 to generate hypertext web pages. The hypertext preprocessor may, for example, be the PHP: Hypertext Preprocessor (PHP) or Microsoft Asp™ hypertext preprocessor. The web server 1100 is also provided with web page templates 1130, such as one or more PHP or ASP files.

Upon receiving a request from the web server application 1110, the hypertext preprocessor 1120 is operable to retrieve a web page template from the web page templates 1130, execute any dynamic content therein, including updating or loading information from the one or more databases 1140, to compose a hypertext web page. The composed hypertext web page may comprise client side code, such as Javascript, for Document Object Model (DOM) manipulating, asynchronous HTTP requests and the like.

The database 1140 is adapted for storing user account data representing one or more user accounts for users. Such user account data is created by the server 1100 during a user registration process. In this manner, the server 1100 is adapted to update the user account data in relation to the appropriate user account.

Client computing devices 1500 are preferably provided with a browser application 1210, such as the Mozilla Firefox™ or Microsoft Internet Explorer™ browser applications. The browser application 1210 requests hypertext web pages from the web server 1100 and renders the hypertext web pages on a display device for a user to view. Client side code could also be downloaded as applications on the client device 1500, in order to facilitate the operation of video streaming. Such applications could, for example, be downloaded from the Apple App Store, Google play, or the like.

Client computing devices 1500 may communicate over local networks or the Internet, 1300 via fixed line or wireless communication, for example using known networks of wireless local area networks, or networks of cellular communication towers 1400.

The computing device may be implemented in a controller 1600 for a drone that is linked to a virtual reality (VR) display 1610. Video from a camera on a drone can be routed via the computing device 500 of a portable base station, through communication towers 1400 and other private, local or publicly available digital communications networks to the drone controller 1600.

Computing Device

Figure 2:
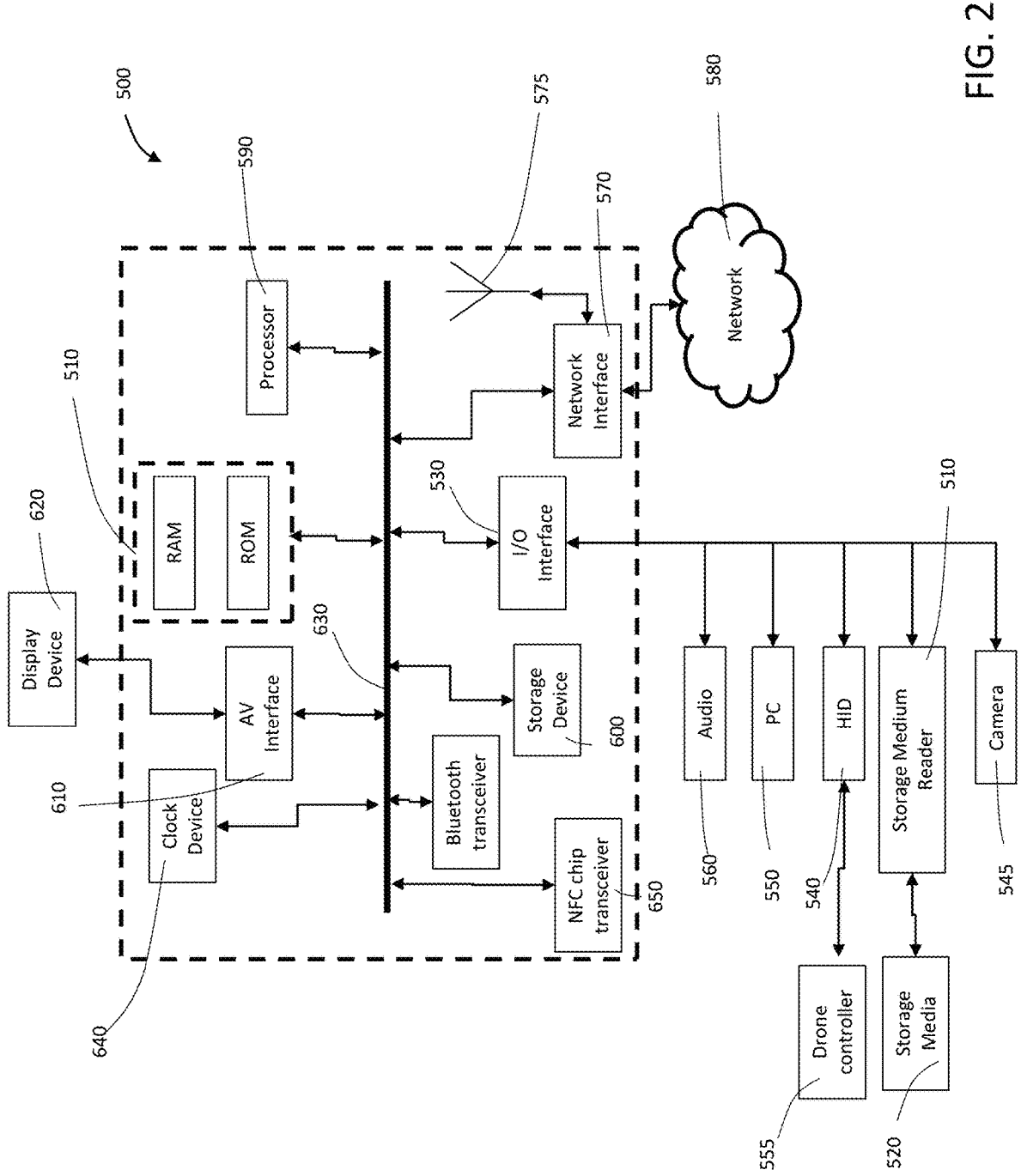

FIG. 2 shows a computing device 500. In a preferred embodiment, the computing device 500 takes the form of a server 1100 as described above. In this manner, the computing device 500 is preferably adapted to comprise functionality for communication with the Internet 1300, and storage capability (such as the database 1140) for storing data and the like.

However, it should be noted that the computing device 500 may be adapted for use as the client computing devices 1500 as is also shown in FIG. 1. In this manner, the computing device 500 may comprise differing technical integers in order to achieve the functionality as set below. A computing device 500 may further be incorporated into the drone controller 1600, as well as within VR display 1610. A computing device 500 can also be incorporated into base station 2000 and/or hybrid drone 3000.

In other words, the technical integers of the computing device 500 is shown in FIG. 2 are exemplary only and variations, adaptations and the like may be made thereto within the purposive scope of the embodiments described herein and having regard for the particular application of the computing device 500.

In particular the steps of the method of providing a video streaming interface for use in controlling a hybrid drone, as described in further detail below, can be implemented as computer program code instructions executable by the computing device 500.

The computer program code instructions may be divided into one or more computer program code instruction libraries, such as dynamic link libraries (DLL), wherein each of the libraries performs a one or more steps of the method. Additionally, a subset of the one or more of the libraries may perform graphical user interface tasks relating to the steps of the method.

The computing device 500 preferably comprises semiconductor memory 510 comprising volatile memory such as random access memory (RAM) or read only memory (ROM). The memory 510 may comprise either RAM or ROM or a combination of RAM and ROM.

The computing device 500 comprises a computer program code storage medium reader 510 for reading the computer program code instructions from computer program code storage media 520. The storage media 520 may be optical media such as CD-ROM disks, magnetic media such as floppy disks and tape cassettes or flash media such as USB memory sticks.

The device further comprises I/O interface 530 for communicating with one or more peripheral devices. The I/O interface 530 may offer both serial and parallel interface connectivity. For example, the I/O interface 530 may comprise a Small Computer System Interface (SCSI), Universal Serial Bus (USB) or similar I/O interface for interfacing with the storage medium reader 510. The I/O interface 530 may also communicate with one or more human input devices (HID) 540 such as keyboards, drone control device 555, joysticks and the like. The I/O interface 530 further also is configured for communication with a video camera 545. Video camera 545 may be plugged in via communication ports such as USB ports, or alternately be built into the computing device 500, for example as an integral laptop camera.

The I/O interface 530 may also comprise a computer to computer interface, such as a Recommended Standard 232 (RS-232) interface, for interfacing the device 500 with one or more personal computer (PC) devices 550. The I/O interface 530 may also comprise an audio interface 560 for communicate audio signals to one or more audio devices (not shown), such as a speaker or a buzzer.

The device 500 also comprises one or more network interface 570, which acts as a communications interface for communicating with one or more computer networks 580, such as the Internet. The network 580 may be a wired network, such as a wired Ethernet™ network or a wireless network, such as a Bluetooth™ network or IEEE 802.11 network. The network 580 may be a local area network (LAN), such as a home or office computer network, or a wide area network (WAN), such as the Internet or private WAN.

The device 500 comprises an arithmetic logic unit or processor 590 for performing the computer program code instructions. The processor 590 may be a reduced instruction set computer (RISC) or complex instruction set computer (CISC) processor or the like. The computing device 500 further comprises a storage devices 600, such as a magnetic disk hard drive or a solid state disk drive.

Computer program code instructions may be loaded into the storage device 600 from the storage media 520 using the storage medium reader 510 or from the network 580 using network interface 570.

During the bootstrap phase, an operating system and one or more software applications are loaded from the storage device 600 into the memory 510. During the fetch-decode-execute cycle, the processor 590 fetches computer program code instructions from memory 510, decodes the instructions into machine code, executes the instructions and stores one or more intermediate results in memory 510.

In this manner, the instructions stored in the memory 510, when retrieved and executed by the processor 590, configures the computing device 500 as a special-purpose machine that may perform the functions described herein.

The computing device 500 also comprises an audio/video interface 610 for conveying video signals to a display device 620, such as a liquid crystal display (LCD), cathode-ray tube (CRT) or similar display device.

The device 500 also comprises a communication bus subsystem 630 for interconnecting the various devices described above. The bus subsystem 630 may offer parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like. The computing device 500 can also include a clock device 640 configured for providing accurate time stamps for use by the processor 590.

Hybrid Drone

The hybrid drone 3000 preferably includes six propellers 3100, each mounted on a shaft 3110 and oriented in a horizontal direction in use, with each propeller 3100 preferably driven by an electrical motor 3200. Each of the propellers are individually controllable by a controller 3150 through a control system to enable the hybrid drone 3000 to fly and hover is required. Alternative numbers of propellers are envisaged.

Each of the propellers 3100 are located on preferably radially extending shafts 3110. The shafts 3110 preferably extend further outwardly than the propeller blades as protrusions 3114. The protrusions 3114 are preferably covered in a protective cushioning formation or layer 3112, such as silicon, rubber or the like. The protrusions are configured for being supported on a supporting formation in the form of a platform 2310 on the base station 2000 as will be described in more detail below. Preferably the protrusions 3114 are configured for being captured when the cover arrangement 2400 of the base station 2000 moves to its closed position, to prevent movement of the hybrid drone 3000 during transport.

Figure 54:
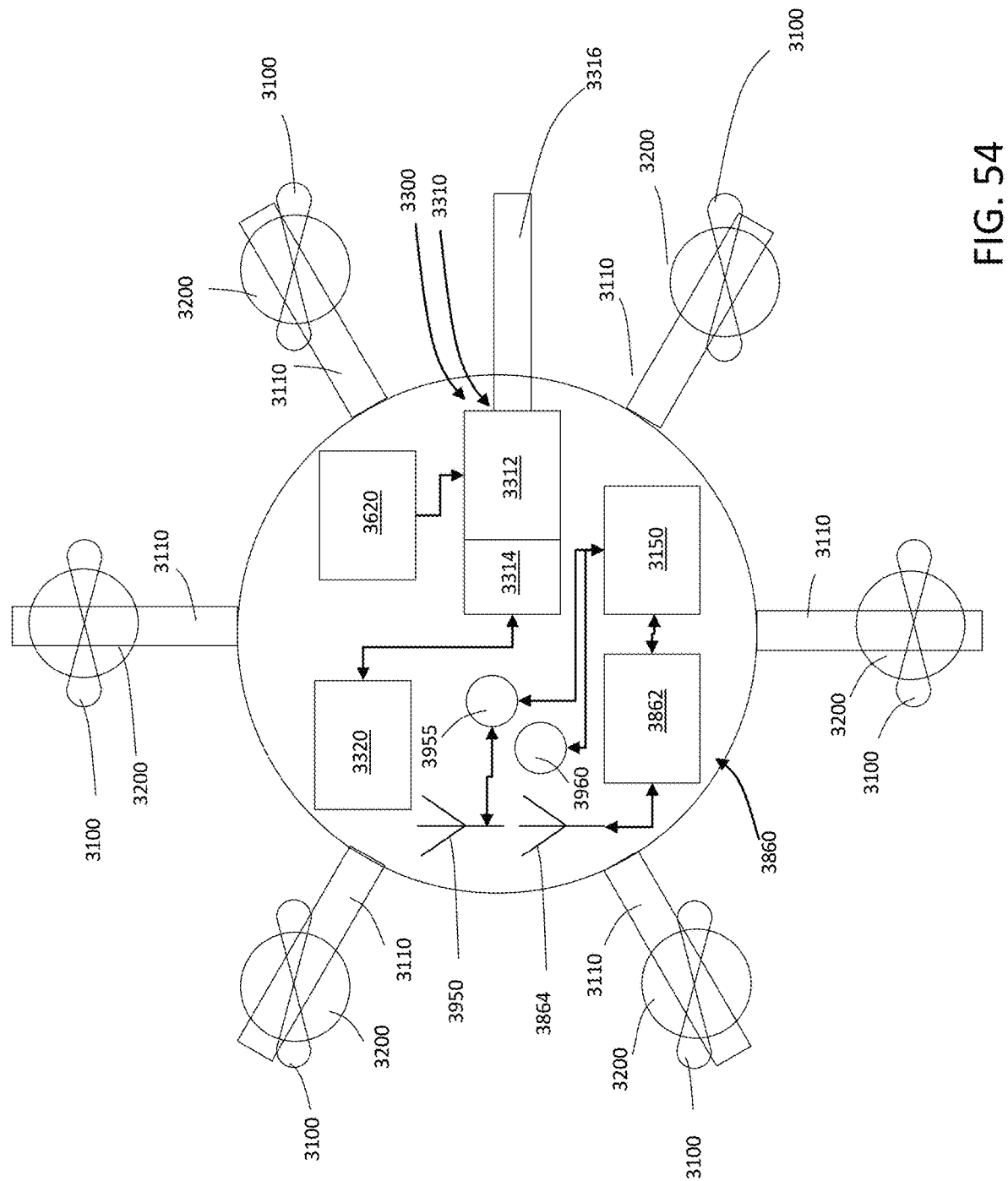
FIG. 54 shows a schematic view of a hybrid drone.

The controller 3150 of the hybrid drone 3000 is preferably also in the form of a computing device 500 as described above, at least including a processor and digital storage media for storing software instructions and preferably data. Propeller or flight control systems for drones are well known, and a description of the functionality of the flight control system is considered beyond the scope of this specification. The hybrid drone 3000 may be provided with a plurality of sensors (shown collectively in FIG. 54 as sensor array 3960) for allowing the controller to receive signals indicative of a wide variety of factors. Examples of sensors that may be provided on the hybrid drone 3000 include one or more:

a. proximity sensors;
   b. temperature sensors;
   c. fuel level sensors;
   d. pressure sensors;
   e. moisture sensors;
   f. humidity sensors;
   g. geopositoning sensors;
   h. distance sensors;
   i. light sensors;
   j. a gyroscopes;
   k. an accelerometers;
   l. a magnetic sensors; and
   m. any other suitable sensor.

The hybrid drone 3000 includes an electric motor 3200 as well as an on-board electrical power generation device 3300. The electrical power generation device 3300 may be in the form of a prime mover, for example in the form of an internal combustion engine 3312, driving an electrical generator/alternator 3314. The internal combustion engine 3312 may be a two-stroke engine, four-stroke engine, Wankel engine or an alternative. Alternatively, the electrical power generation device 3300 may be in the form of a fuel cell (not shown). The electrical power generated by the electrical power generation device 3300 is used to directly drive electrical motors 3200 for powering the propellers 3100. Excess power from the electrical power generation device 3300 is used to charge a power storage device in the form of a battery 3320. Electrical power stored in the battery 3320 is used to supplement any shortfalls in electrical power being supplied to the electrical motors by the electrical power generation device 3300.

The hybrid drone 3000 includes an undercarriage 3450 in the form of a trapezoidal frame 3452 located on top of an annular base 3454. It is envisaged that a wide variety of different shape bases may be used, and one alternative embodiment is described below. The annular base 3454 preferably extends in a horizontal plane when the hybrid drone 3000 is docked. The undercarriage 3450 serves as a mounting point for a payload in the form of a camera module 3700. The undercarriage 3450 also act as a locating formation 3800 for engaging with and location within an alignment formation 2320 on a base station 2000 as will be described in more detail below. It is envisaged that the frame of the alignment formation could come in a wide variety of shapes, including being cone-shaped, pyramidally shaped, or any other suitable shape, while the base 3454 could also be of a wide variety of shapes, including any endless configuration, such as pentagonally shaped, square shaped, hexagonally shaped, septagonally shaped, et cetera. The locating formation 3800 is configured for being guided by the alignment formation 2320 on the base station 2000 on landing by the hybrid drone 3000, to thereby preferably locate the hybrid drone and a suitable position for the functionality that is described below to be carried out, and more particularly for positioning the hybrid drone for refuelling by an autonomous refuelling mechanism 2100 as will be described in more detail below.

The camera module 3700 preferably includes a series of six cameras 3710 that are configured to point directly downwardly, as well as obliquely, and preferably between 0° and up to 45° to the vertical, but most preferably up to 30° to the vertical. The drone controller is connected to and configured for controlling operation of the cameras 3710. It is envisaged that the cameras could point in any direction, depending on the job requirement. The cameras 3710 are preferably all housed within a housing 3705 that is mounted to the undercarriage 3450 by a mounting mechanism 3715. The mounting mechanism is preferably damped to reduce vibration from the internal combustion engine and propellers affecting the image quality from the camera 3710. A laser range finder 1717 is also provided for determining the altitude of the hybrid drone 3000. A precision landing sensor in the form of an infrared camera 3719 is also provided for sensing the infrared beam to guide the hybrid drone in to land on the base station 2000.

The undercarriage 3450 also defines a locating formation 3800 configured for engagement with a docking arrangement 2300 on the base station 2000 as will be described below.

The hybrid drone 3000 further includes a fuselage housing 3500, into which much of the componentry described is housed. Preferably, the electrical power generation device 3300 as well as fuel tank 3620 housed within the fuselage housing 3500. In one embodiment (not shown) the fuel tank is preferably configured as a resilient bladder that is expandable to receive fuel, in order to save weight. Once the fuel tank has been filled, the resilient qualities of the bladder will provide pressure within the fuel tank to facilitate the movement of fuel to the internal combustion engine 3312 by an electrical fuel pump (not shown) that allows all of the fuel to be evacuated or used during different aircraft orientations.

In a preferred embodiment as shown in the figures, the electrical generator 3314 doubles as a starter motor for the combustion engine. This enables an autonomous remote start of the internal combustion engine. In this regard, the electrical generator is preferably brushless. On start-up, electrical power from the battery is used to operate the electrical generator 3314 as an electrical motor, which in turn causes combustion engine 3312 to turn over. Once combustion engine 3312 is running, the controller will detect this fact, and control the electrical generator 3314 to operate as an electrical power generation device driven by the combustion engine 3312, to supply electrical power to the electrical motors to drive the propellers, and to charge the battery. In this way, weight savings are achieved that will allow the hybrid drone 3000 to fly for longer and/or carry larger payloads.

Figure 51:
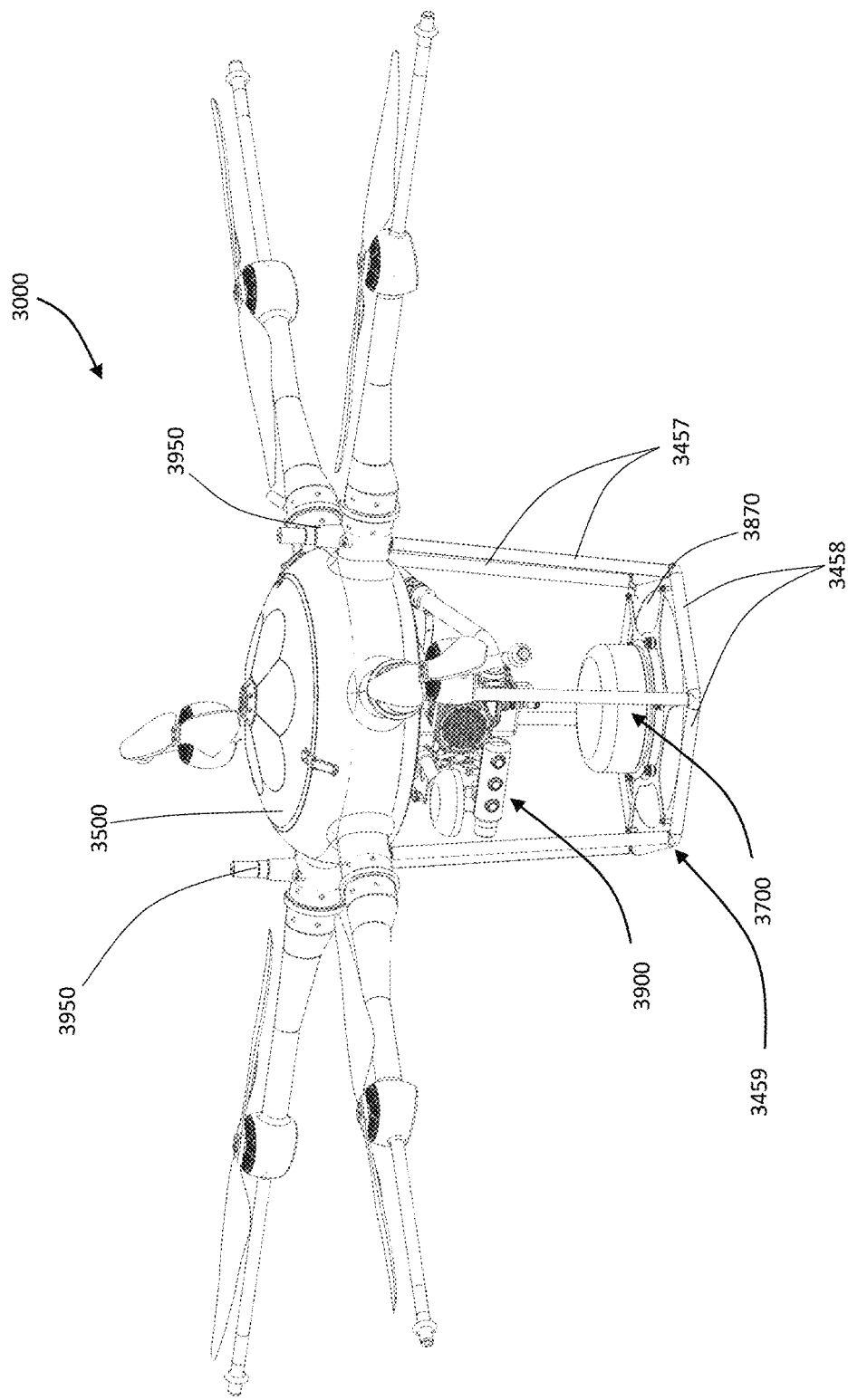
FIG. 51 shows a top perspective view of the hybrid drone of FIG. 49.
Figure 52:
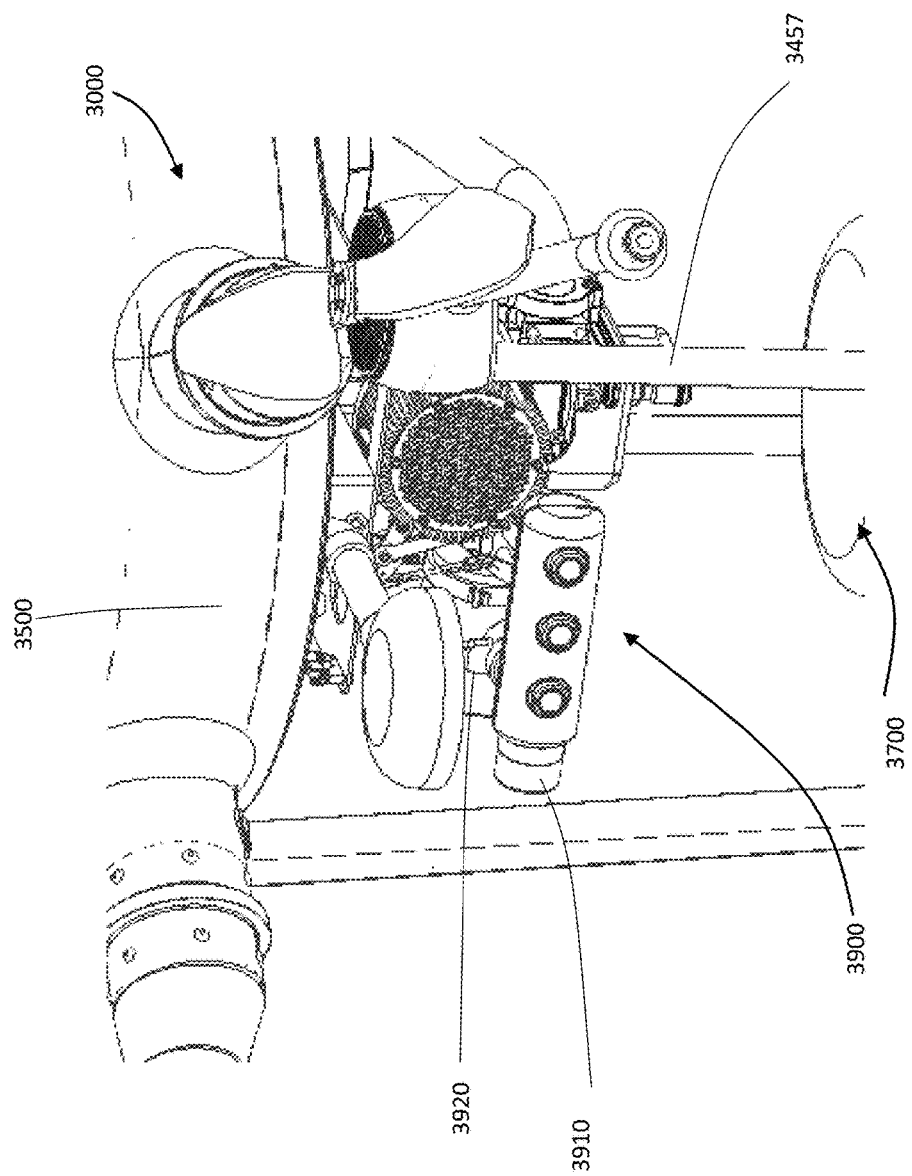
FIG. 52 shows a close-up view of FIG. 51.
Figure 53:
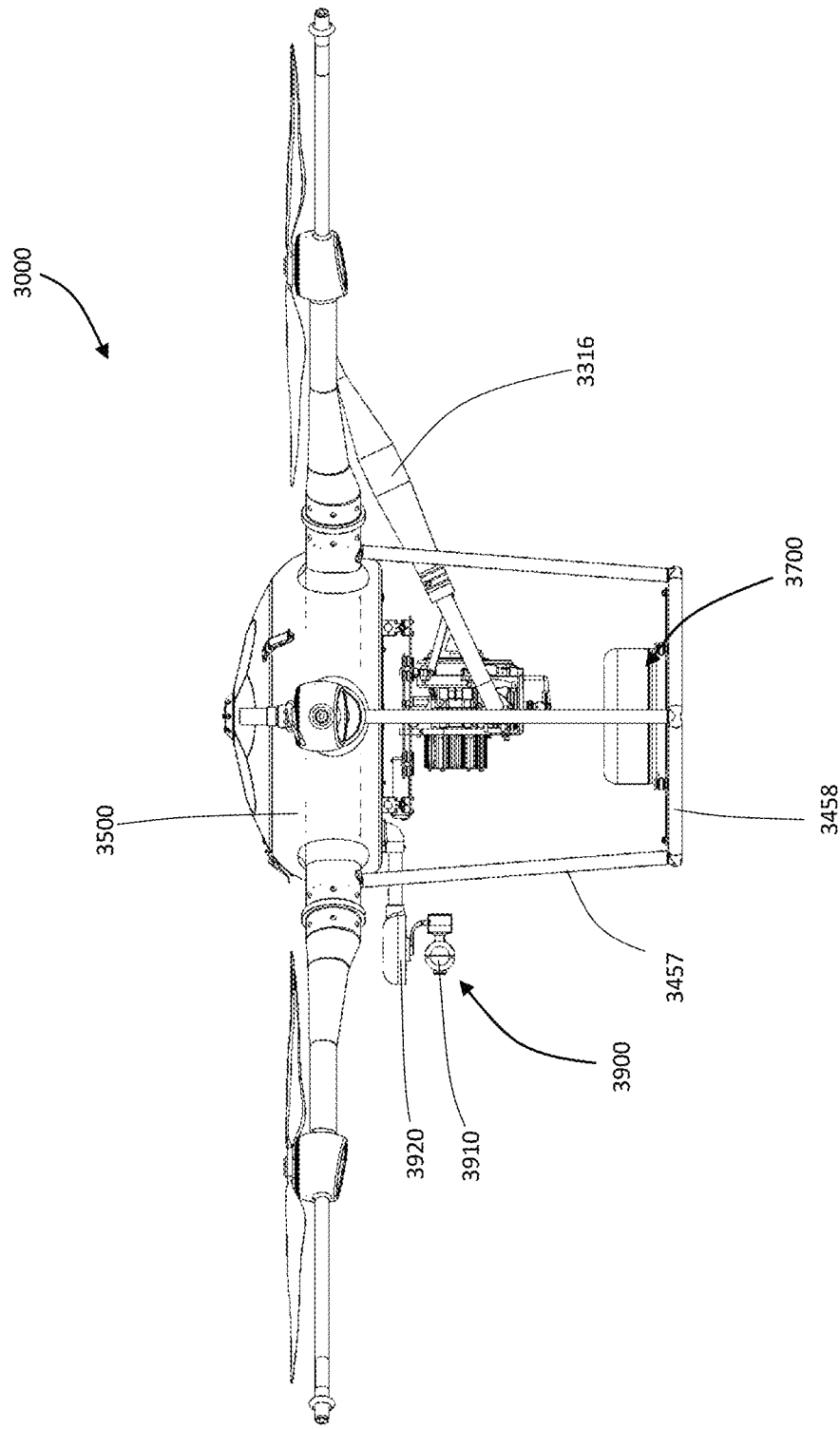
FIG. 53 shows a side elevation view of the hybrid drone of FIG. 49.

The hybrid drone 3000 further includes an inductive charging device 3870 (shown in FIG. 51), preferably embedded within the undercarriage 3450. The inductive charging device 3870 is configured for being charged by a complementary inductive charging device 2650 embedded in or under the alignment formation 2320, and in turn for charging battery from the electrical power received inductively. After the hybrid drone 3000 has landed on the base station 2000, preferably guided to a precise location by alignment formation 2320, the inductive charging device will be in the requisite alignment with the complementary inductive charging device 2650 of the base station for electrical power to be induced or inductively stimulated in the inductive charging device.

Preferably, the internal combustion engine 3312 and generator 3314 (or fuel cell) are adapted for convenient detachable release from the fuselage housing 3500 by a quick release mechanism in the form of four mounting brackets 3311 that connect the generator mounting plates 3317 to the undercarriage frame 3452. Preferably, a quick release mechanism including connecting formations in the form of mounting brackets 3311 are provided to enable for such convenient detachment. In this way, the internal combustion engine and generator can be conveniently removed for servicing and/or swapping with replacements.

The internal combustion engine 3312 further includes an exhaust system 3316 that extends to an outlet 3315. The outlet 3315 of the exhaust system 3316 is preferably adapted to direct exhaust fumes away from the camera module 3700, in order to prevent the buildup of soot from the combustion process on the camera lenses, and/or in order to prevent exhaust fumes from obscuring the line of sight of one or more of the cameras.

Another embodiment of a drone 3000 is shown in FIGS. 49-52. In this embodiment, the undercarriage 3450 is shown in a hexagonal configuration. In alternative embodiments, it is envisaged that square, pentagonal, septagonal or any other shape configurations may be provided. The undercarriage 3450 includes six down members 3457 extending downwardly from the fuselage housing 3500. The down members 3457 are connected by crossmembers 3458 towards their lower ends to form a hexagonal base 3459. The hexagonal base 3459 is preferably configured to fit within the base 2322 of the docking arrangement 2300. Camera module 3700 is located on hexagonal base 2459.

As may be seen from FIGS. 49-53, the exhaust outlet 3315 is directed away from the camera module 3700. Further, a gimbal camera system 3900 is provided that includes a camera 3910 mounted on a gimbal stabilizer 3920 that allows for the camera 3910 to be moved around preferably three axes of rotation, and then to be stabilized to continue viewing in that direction. The gimbal camera system 3900 is for use by a pilot of the hybrid drone 3000 to be able to see around the drone when the pilot is operating the hybrid drone 3000 from a remote location. Accordingly, the controller on the hybrid drone will cause images from the camera 2910 to be fed via the transceiver on the hybrid drone 3000 to the base station 2000, from where they can be sent to a drone controller 1600 at a remote location for use by the pilot of the hybrid drone. It is envisaged that the pilot of the drone will be able to control directional movement of the camera 2910 along the axes provided by the gimbal stabiliser 3920, while movement of the camera is stabilised.

It is envisaged that in alternative embodiments (not shown) the gimbal stabiliser may operate in only one axis or two axes. It is further envisaged that a camera can be used without a gimbal stabiliser 3920, although this is not preferred. The gimbal stabiliser may include a gyroscope and inertial and/or position encoder sensors for stabilising movement of the camera 3910. Gimbal stabilisers and cameras are well known, and a discussion on the workings of the gimbal camera system 3900 is considered beyond the scope of the present specification.

In addition, a pair of GPS antenna 3950 are provided that extend from the top of the fuselage housing 3500 on opposed sides, which are for detecting accurate geolocation signals that can be used by a geopositioning module (not shown) associated with the controller on the hybrid drone to determine the location of the hybrid drone 3000. Such geolocation signals can also be transmitted to the base station 2000, and further onto the drone controller 1600, so that a pilot operating the drone can use the location of the drone on a map to better orientate themselves in real time.

The hybrid drone is also preferably equipped with a drone communications interface 3860 (shown in FIG. 54) configured for communicating with the base station 2000. The drone communications interface 3860 could, for example, be in the form of a suitable wireless communication protocol chip 3862 (such as a Wifi or similar chip) and antenna 3864, and preferably allows for flights of up to a range of about 50 km from the base station.

Base Station

Now described with reference to FIGS. 3-15, a portable base station 2000 is provided. The portable base station 2000 includes a preferably fireproof frame 2005 on which a wheel arrangement including a pair of wheels 2010 is mounted on opposed sides of the frame. A tow coupler 2015 is attached to the frame 2005 to allow the portable base station 2000 to be hitched to a vehicle for transportation. An open topped housing 2020 is mounted to the frame 2005. Preferably the housing 2020 includes an insulative lining or outer layer (not shown) for insulating the interior of the housing from radiative heat from the sun. The insulative lining may also act as a fireproof cladding.

The base station 2000 also includes a controller 2200 for controlling the various functionality of the base station 2000 that will be described below. It is envisaged that the controller 2200 will preferably take the form of a computing device 500 as described above, will preferably include a processor and digital storage media for storing software instructions, the software instructions enabling the controller to control the base station 2000 to operate as will be described in more detail below.

The controller 2200 is preferably connected to and configured for receiving signals from several sensors. Possible sensors could include any or all of a. a proximity sensor;
  b. a temperature sensor;
  c. fuel level sensor;
  d. pressure sensor;
  e. moisture sensor;
  f. humidity sensor;
  g. geopositoning sensor;
  h. distance sensor;
  i. light sensor; and
  j. any other suitable sensor.

The controller 2200 may utilise any of the signals received from the sensors in carrying out the functionality described in more detail below.

Docking Arrangement

The base station 2000 further includes a docking arrangement 2300 housed within the housing, that is adapted for facilitating the docking of the hybrid drone 3000 with the base station 2000.

Figure 3:
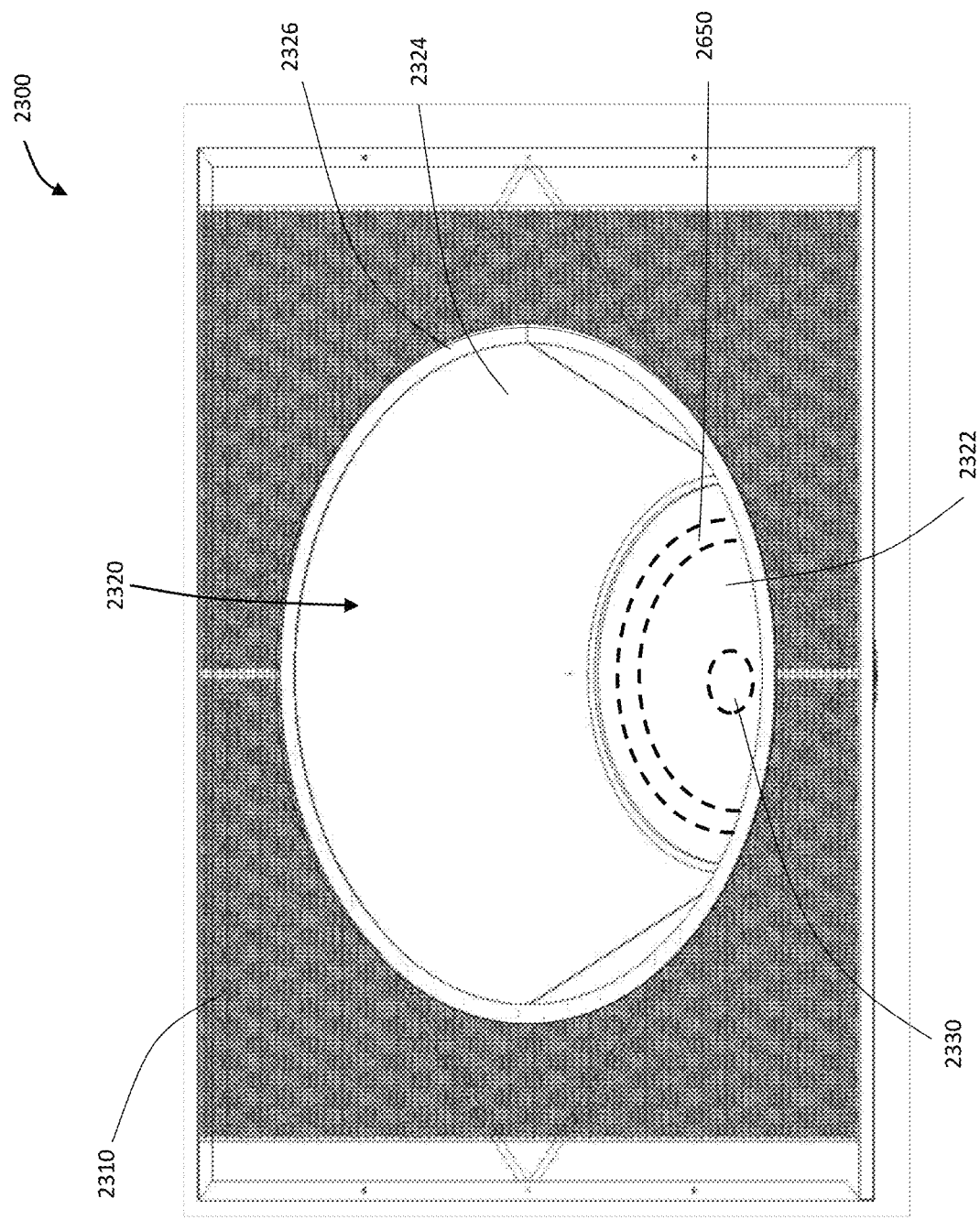
FIG. 3 shows a top perspective view of a docking arrangement.
Figure 4:
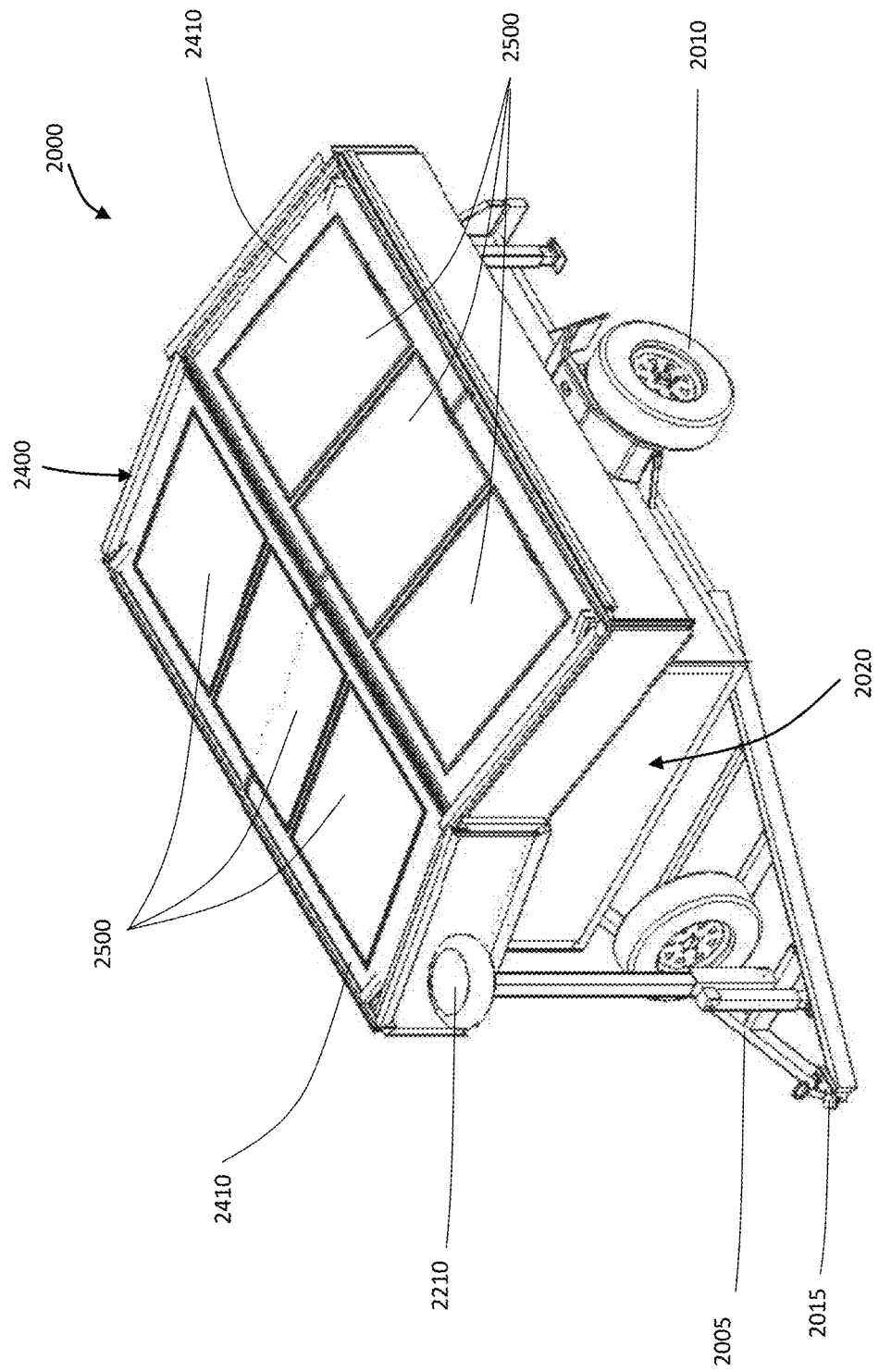
FIG. 4 shows a top right front perspective view of a base station with the cover arrangement in a closed condition.
Figure 5:
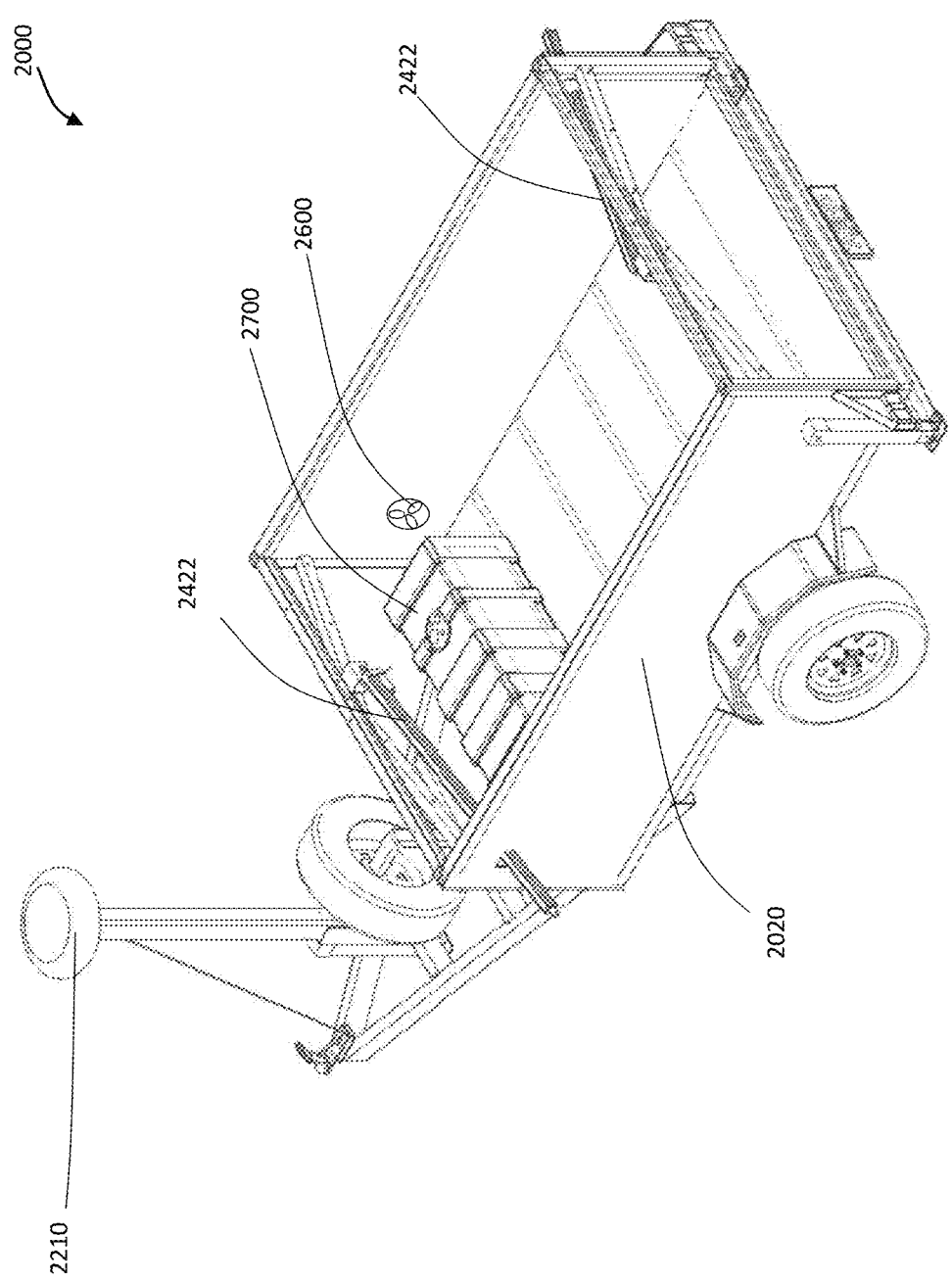
FIG. 5 shows a top right rear perspective view of the base station of FIG. 4 with the cover arrangement and the docking arrangement removed.
Figure 6:
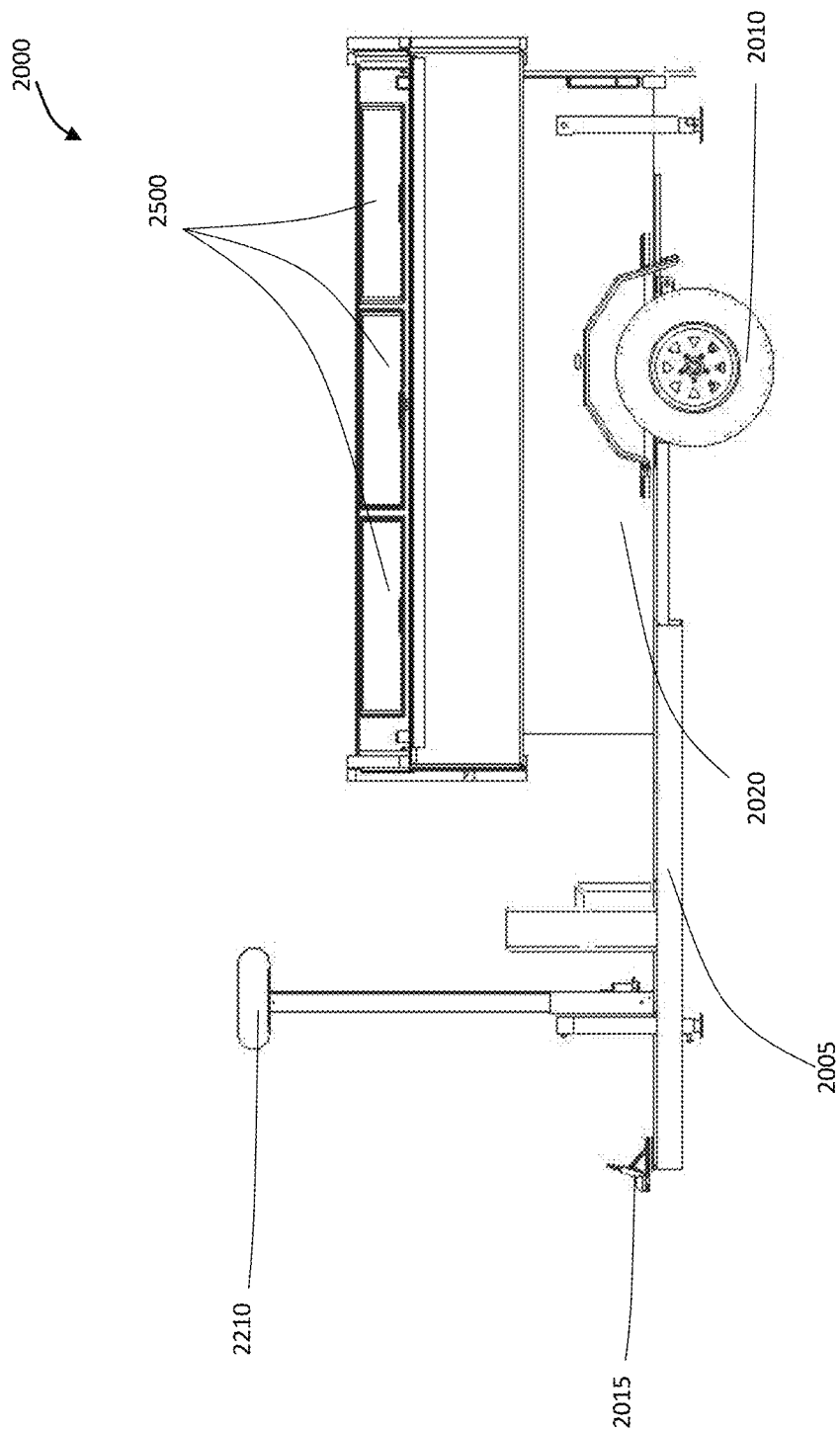
FIG. 6 shows a right side elevation view of the base station of FIG. 4.
Figure 7:
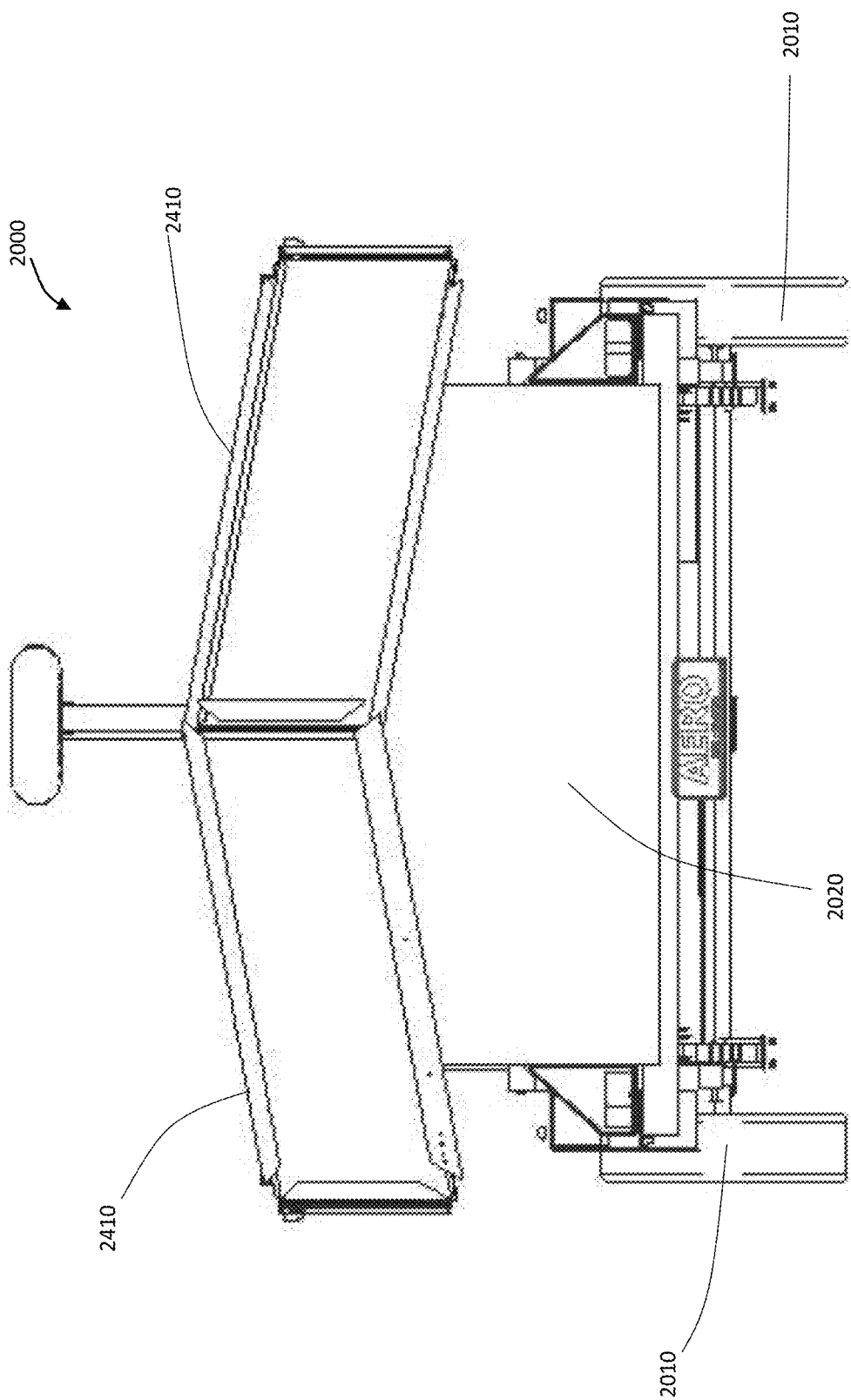
FIG. 7 shows a rear elevation view of the base station of FIG. 4.
Figure 8:
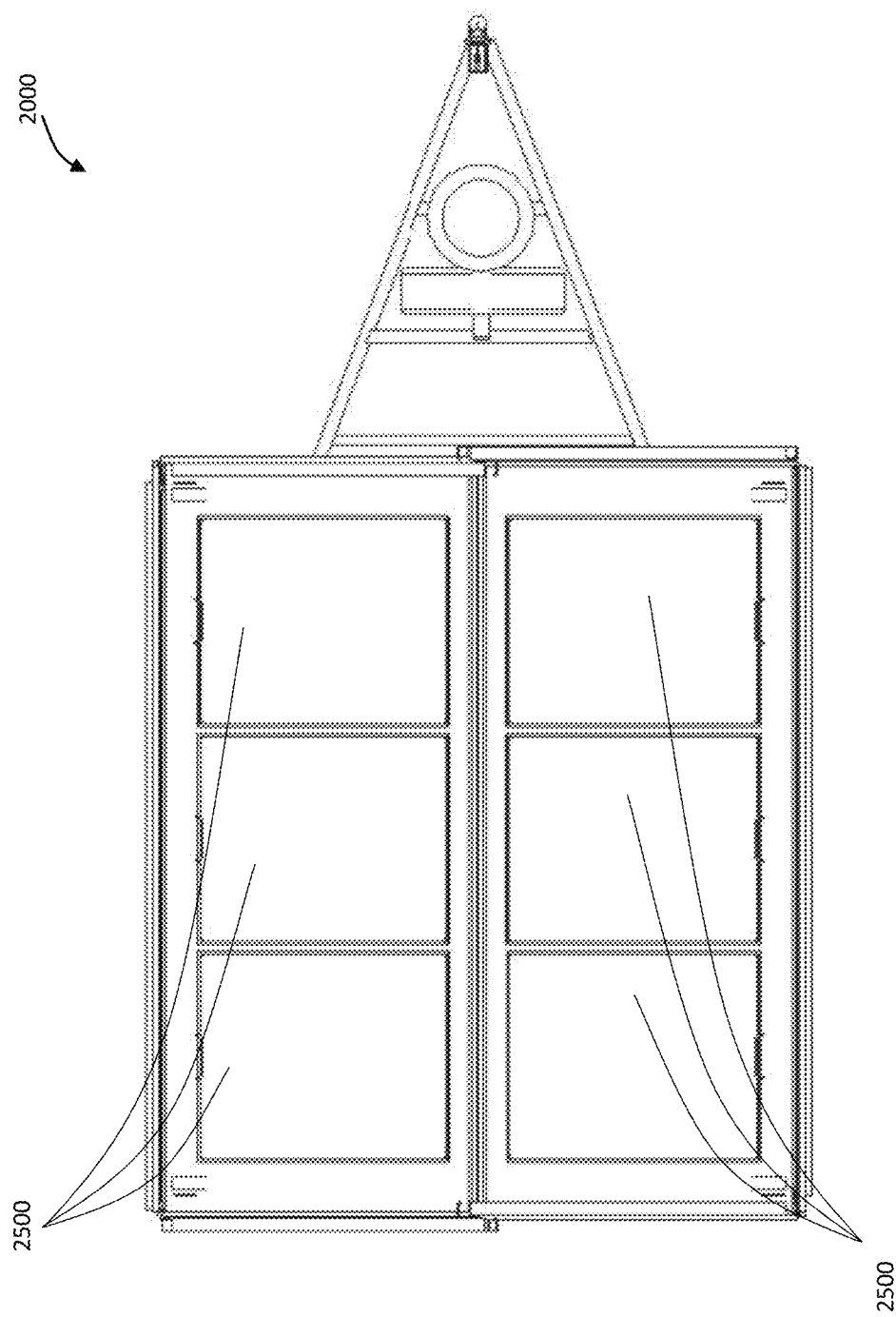
FIG. 8 shows a top plan view of the base station of FIG. 4.
Figure 9:
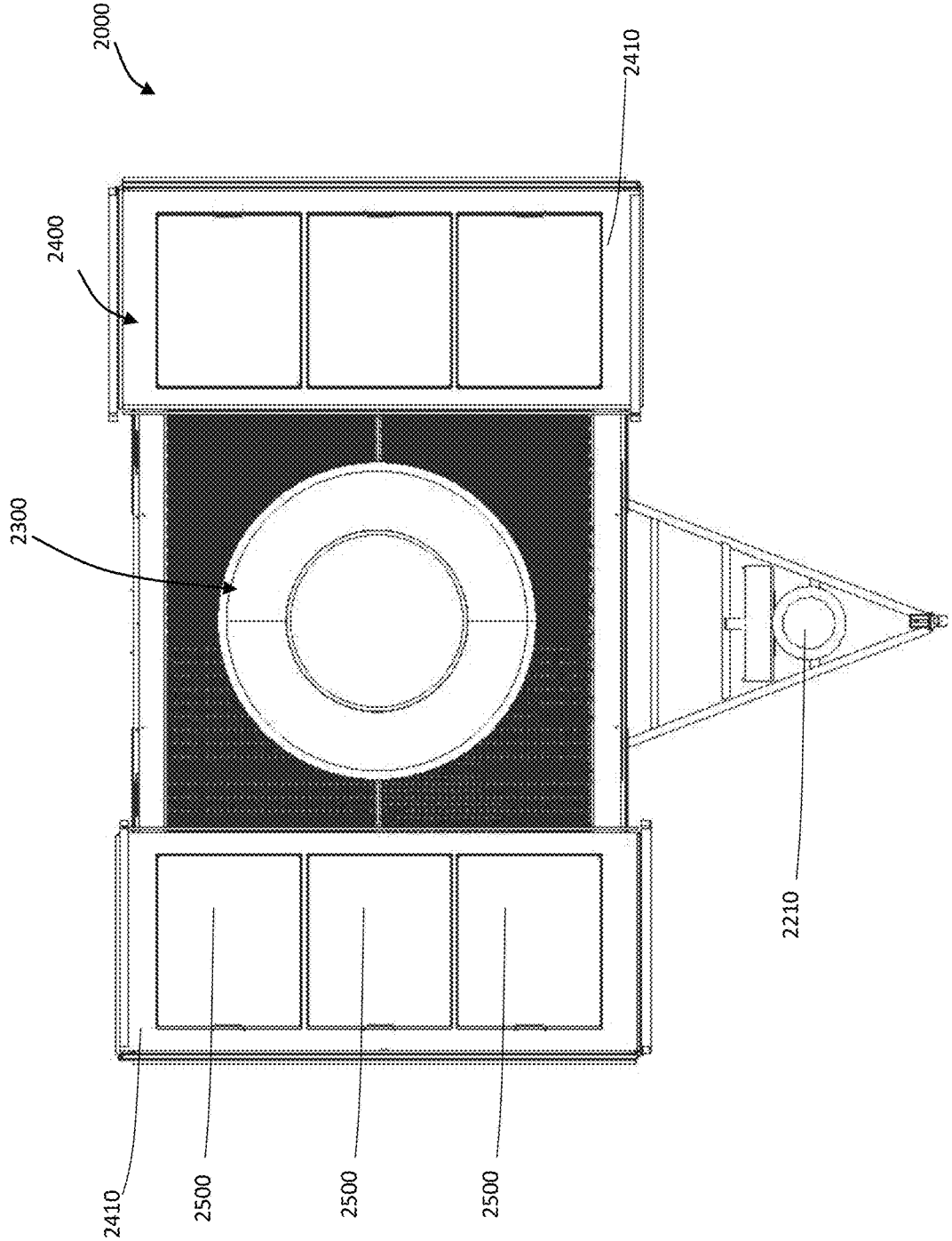
FIG. 9 shows a top plan view of the base station of FIG. 4 with the cover arrangement in an open condition.

The docking arrangement 2300 preferably includes a recessed inverted frusto-conical alignment formation 2310 (shown in FIG. 3). The alignment formation 2310 includes a centrally located preferably planar base 2322, from which tapered walls 2324 extend upwardly and outwardly. The alignment formation 2310 is configured for abutting engagement with the annular base 3454 of the locating formation 3800 of the hybrid drone 3000 extending downwardly from the hybrid drone 3000 in a manner that will be described in more detail below.

The alignment formation 2310 is adapted for guiding the hybrid drone 3000 to engage with the autonomous refuelling connection mechanism 2100. The inverted frusto-conical shape of the alignment formation 2310 serves to guide the locating formation 3800 of the hybrid drone into an appropriate location for the connector formation 2110 of the autonomous refuelling connection mechanism 2100 to engage with the complementary connector formation 3610 of the hybrid drone 3000 as will be described in more detail below. In an alternative embodiment, it is envisaged that the alignment formation 2310 could be pyramidal in shape, or of a wide variety of tapered shapes, such as being a tapered hexagonal shaped, a tapered pentagonal shape, or the like.

The docking arrangement 2300 is preferably surrounded by a planar platform 2310 around the upper periphery of the alignment formation 2310. The planar platform 2310 is preferably perforated and/or composed of a mesh in order to reduce wash from the hybrid drone 3000 as it lands and/or takes off.

Figure 10:
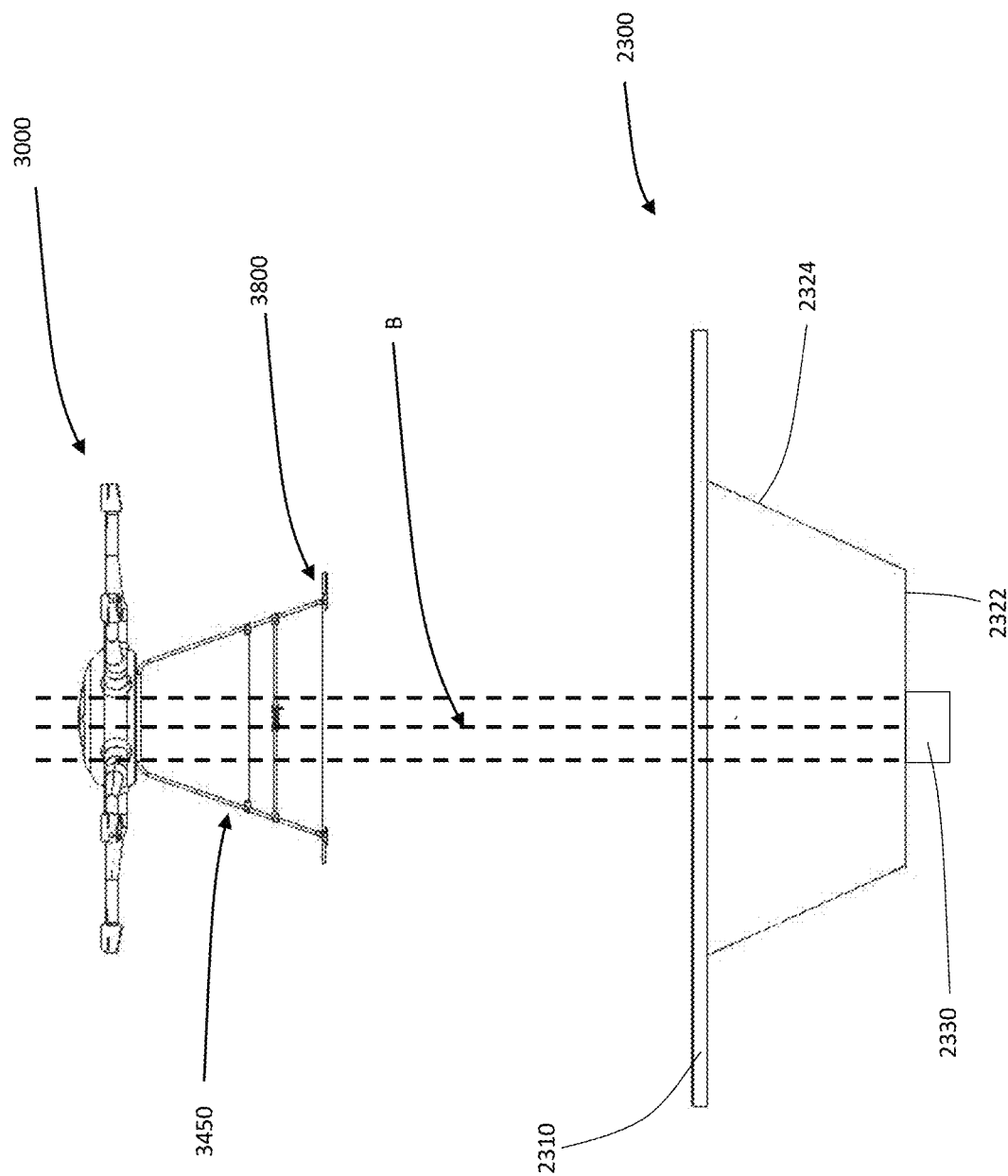
FIG. 10 shows a side elevation view of a hybrid drone hovering over a docking arrangement.
Figure 11:
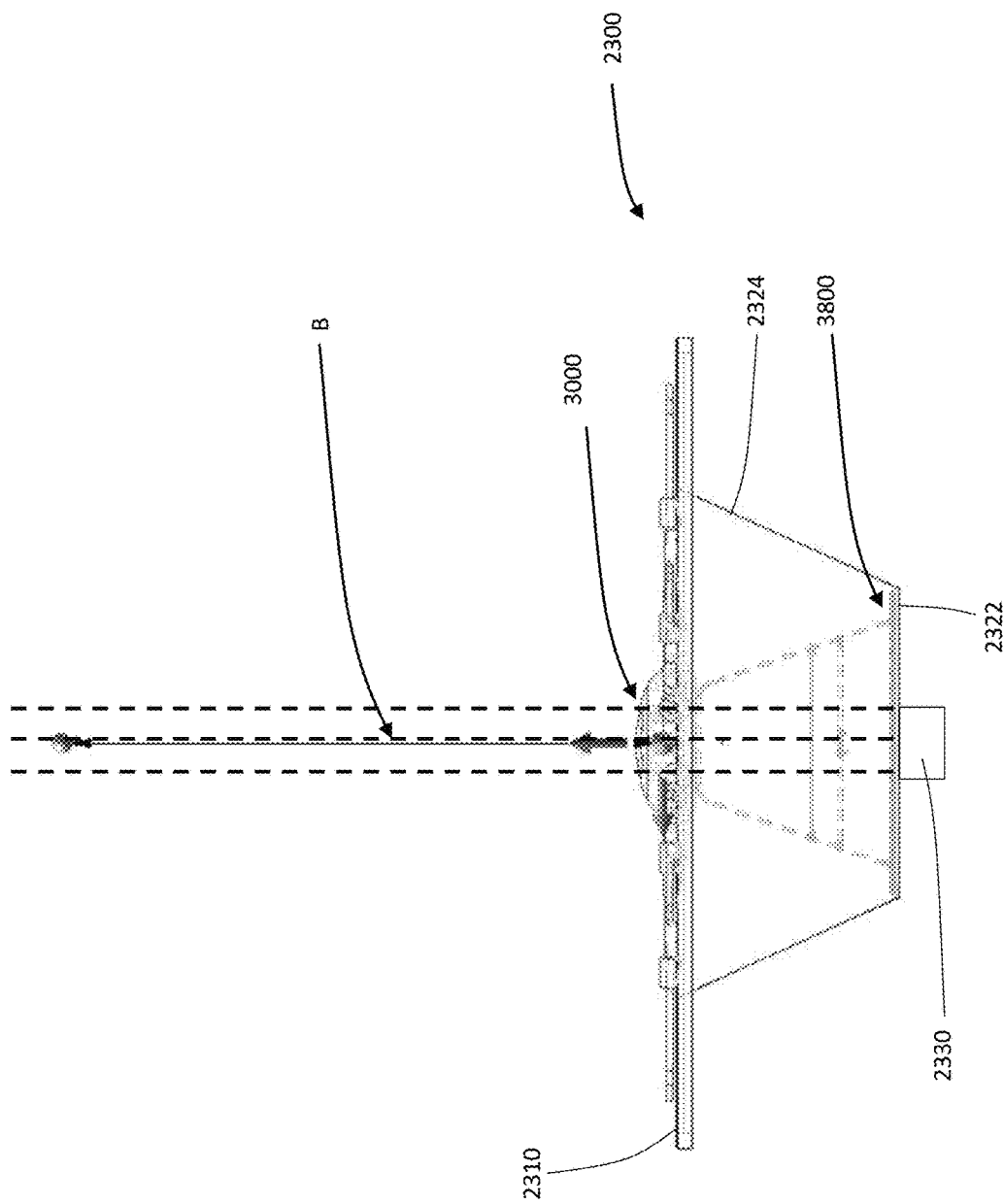
FIG. 11 shows a side elevation view of a hybrid drone docked within a docking arrangement.
Figure 12:
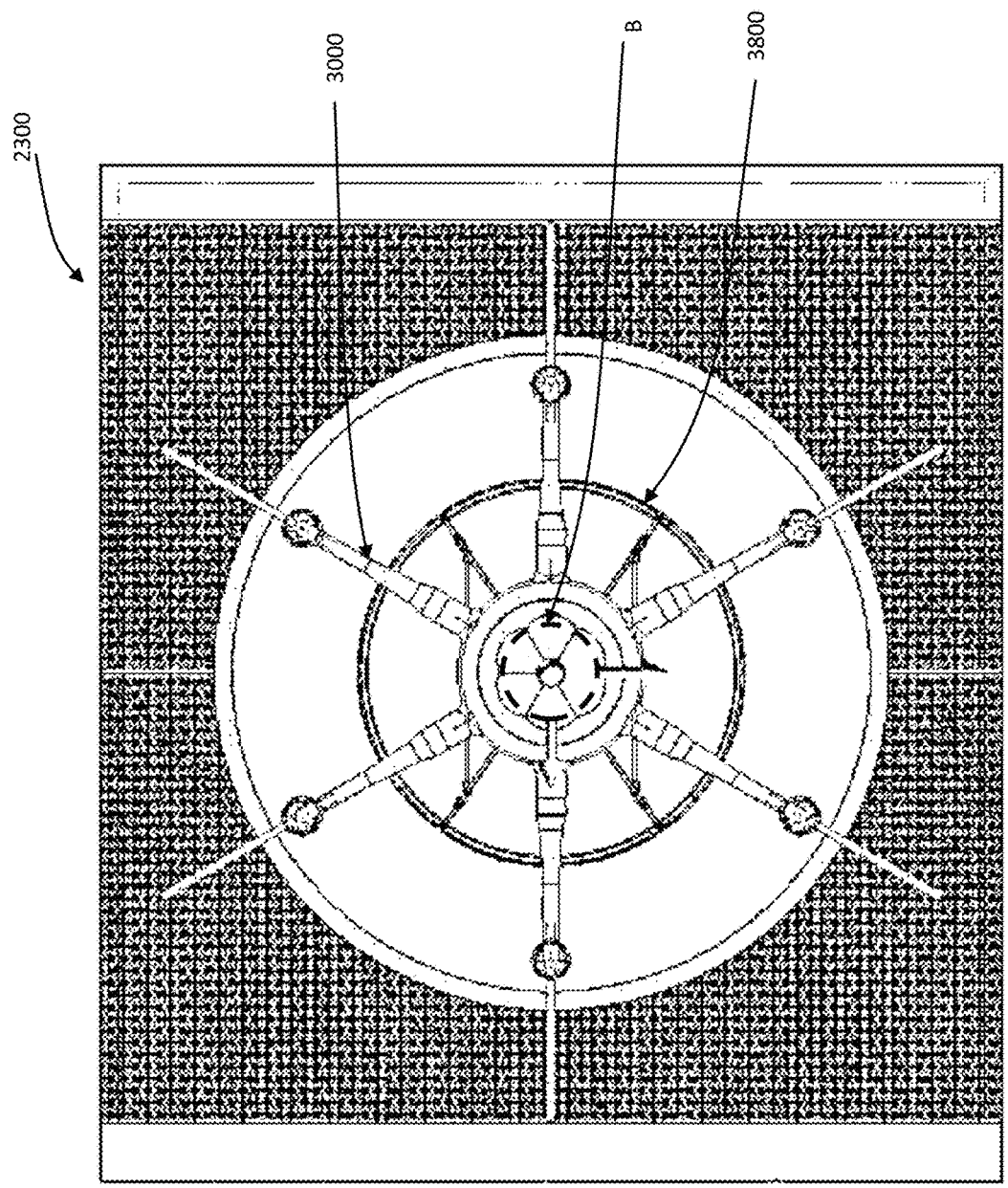
FIG. 12 shows a top plan view of a hybrid drone docked within a docking arrangement.
Figure 13:
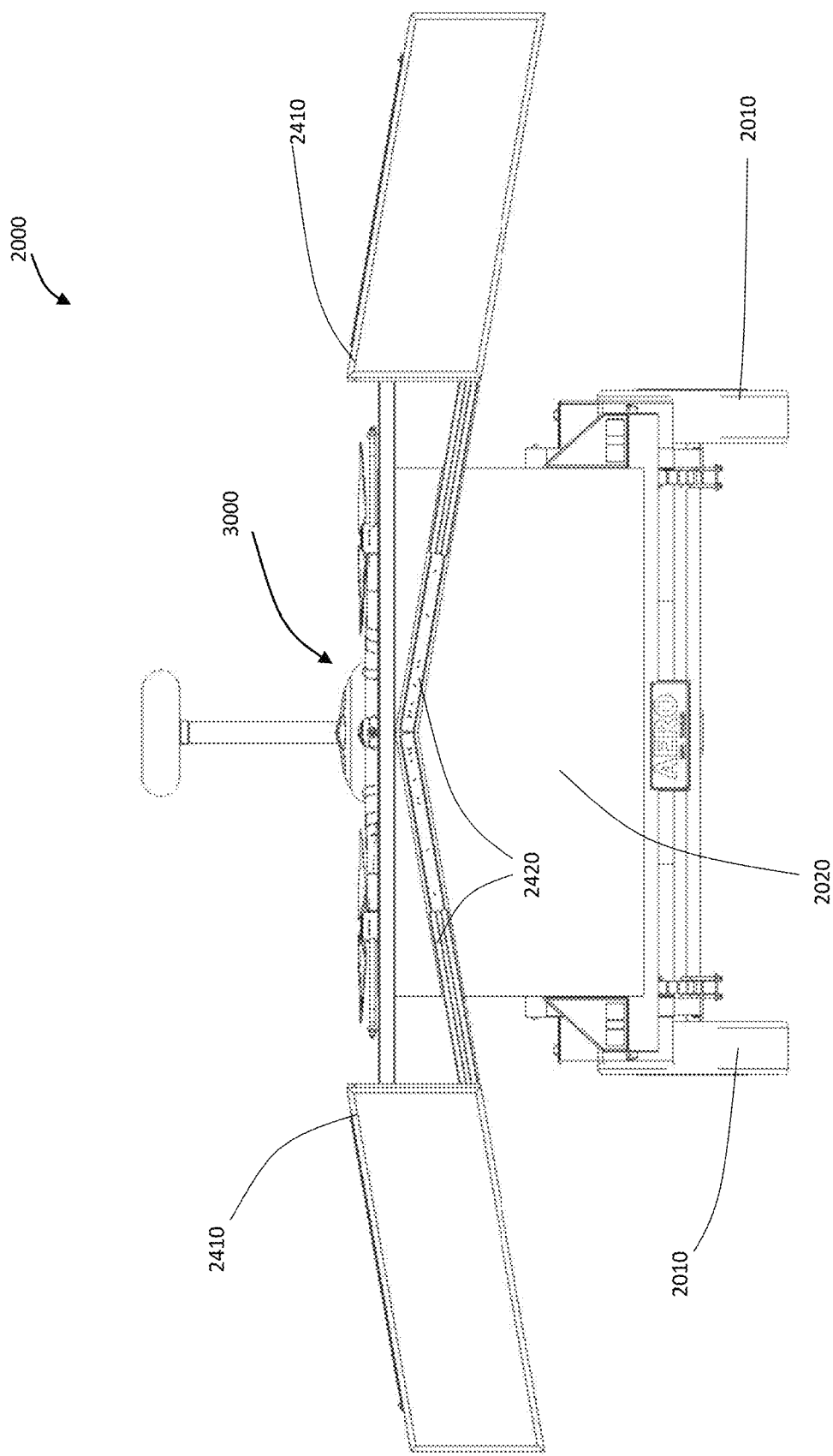
FIG. 13 shows a rear elevation view of a base station with the cover arrangement in an open condition and a drone docked within the docking arrangement.
Figure 14:
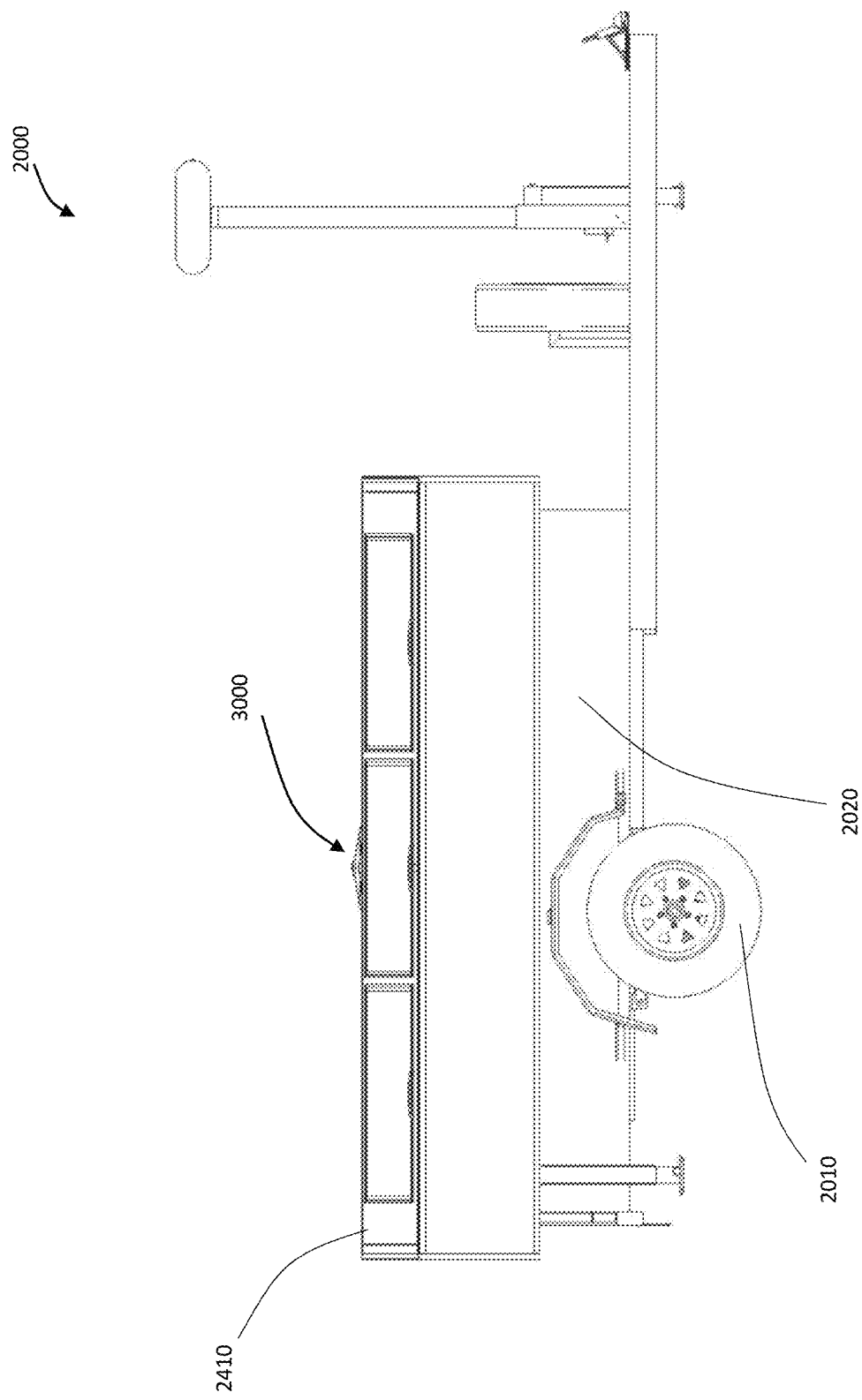
FIG. 14 shows a left side elevation view of FIG. 13.
Figure 15:
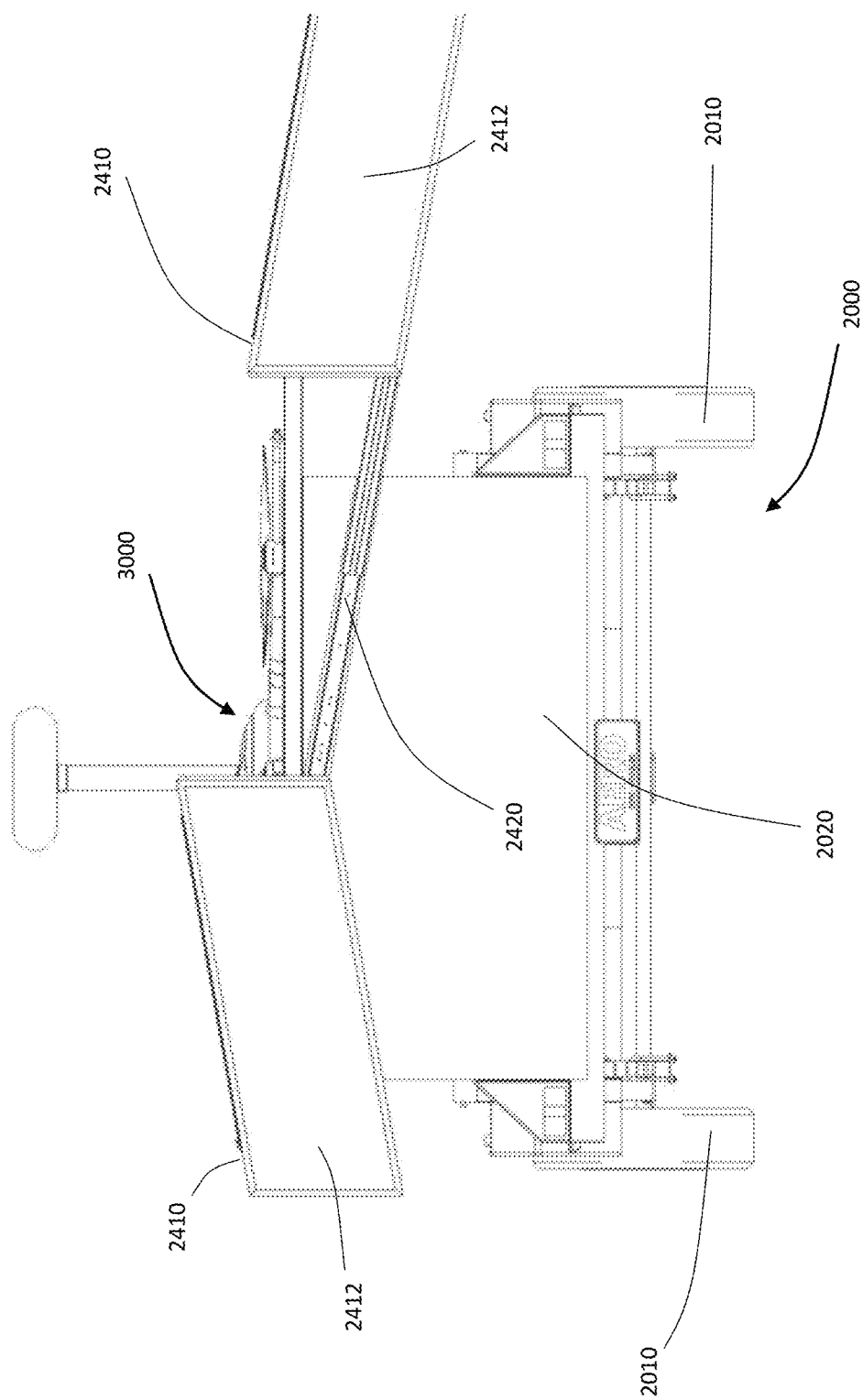
FIG. 15 shows a rear elevation view of a drone docked within the docking arrangement of a base station, with one of the cover panels of the cover arrangement in an open position.
Figure 16:
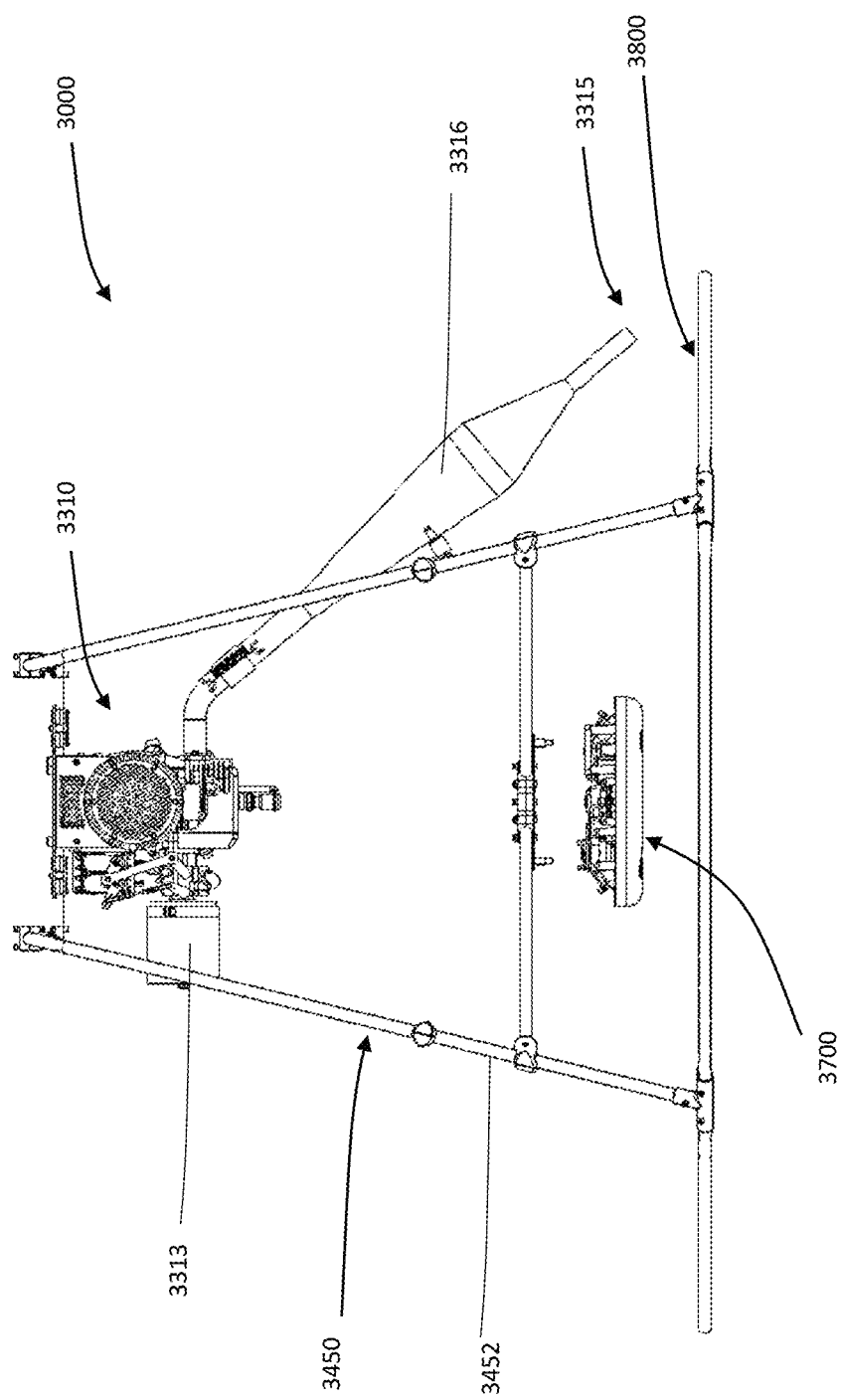
FIG. 16 shows a cutaway side elevation view of an undercarriage and camera module of a hybrid drone.
Figure 17:
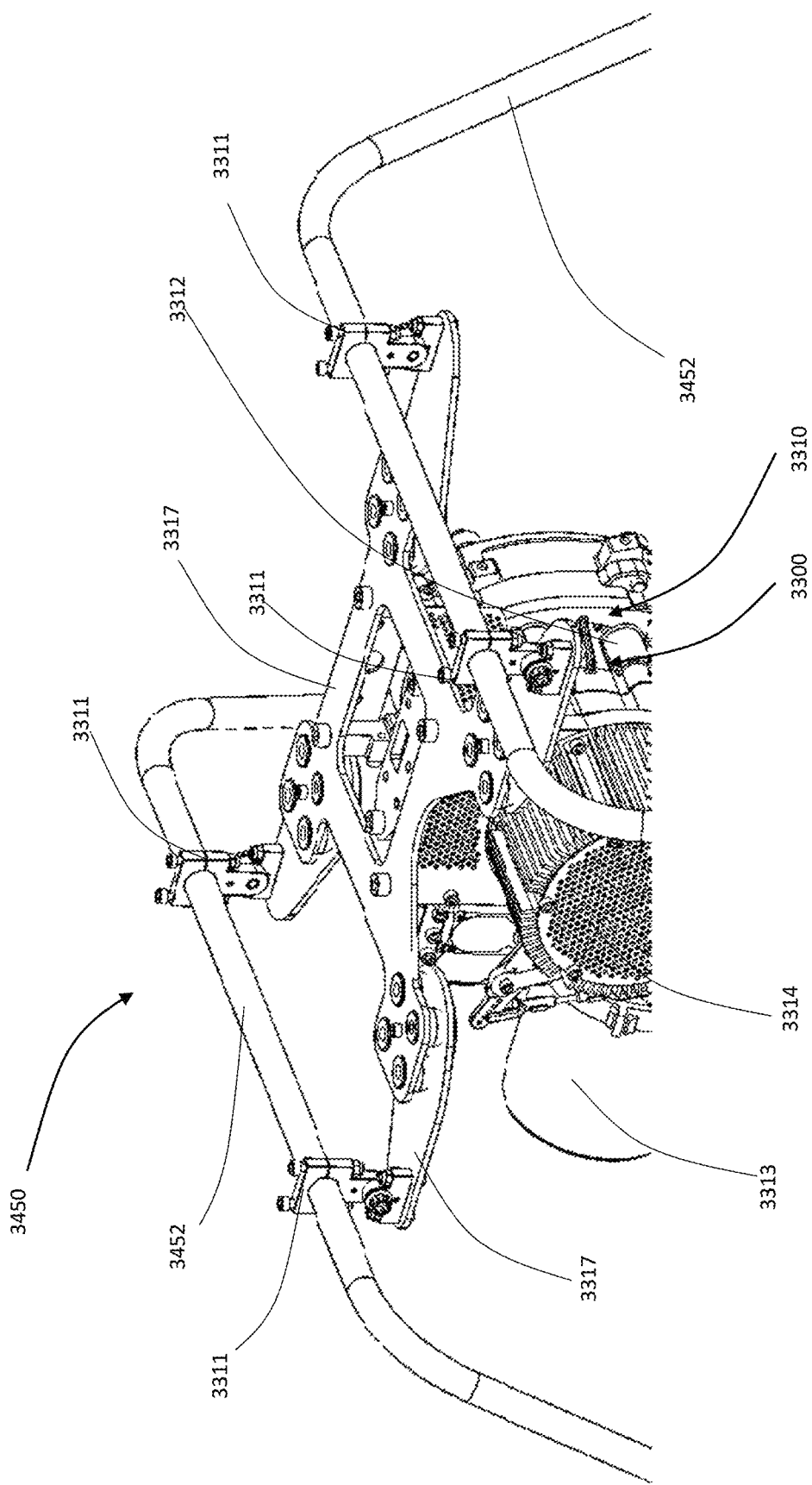
FIG. 17 shows a cutaway close-up top perspective view of an undercarriage and internal combustion engine of a hybrid drone.
Figure 18:
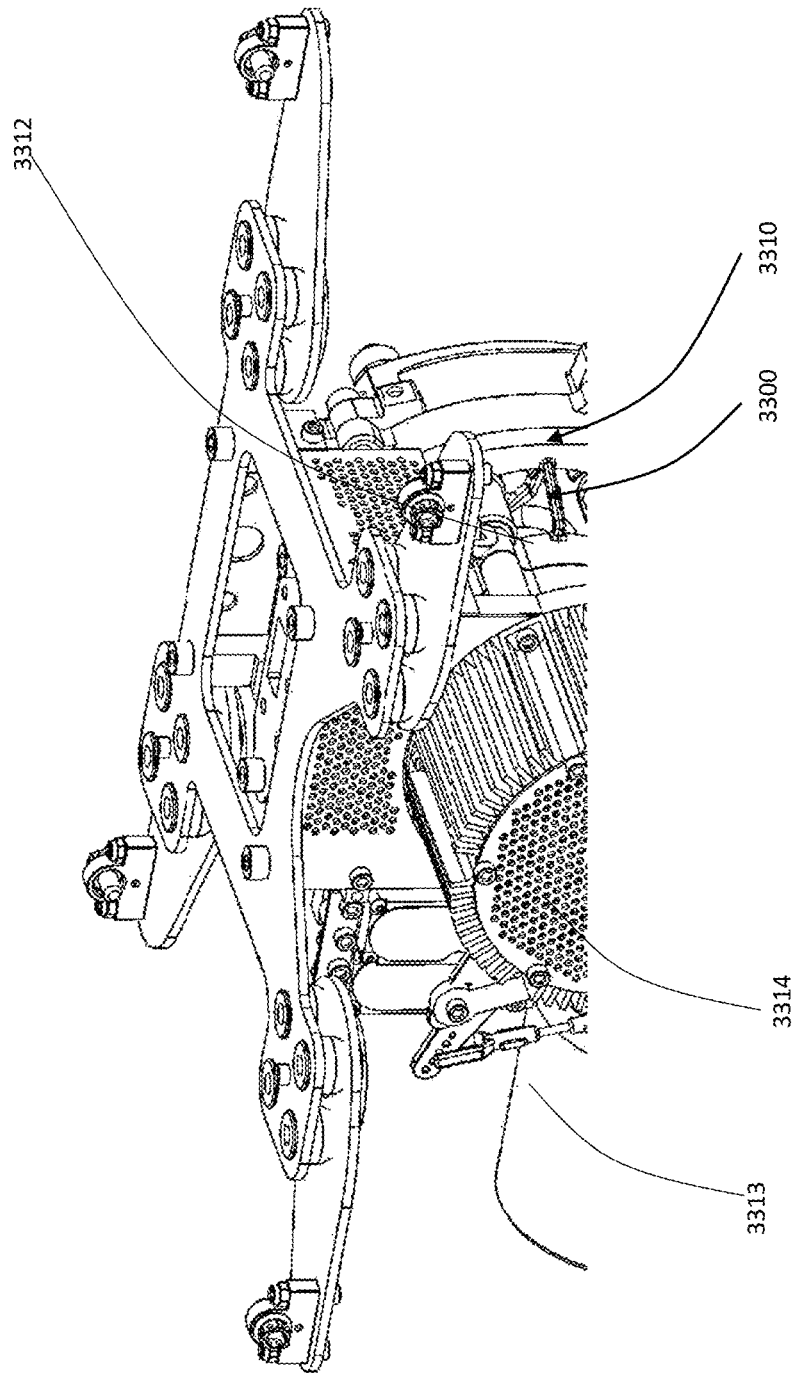
FIG. 18 shows a cutaway close-up top perspective view of the internal combustion engine of FIG. 17.
Figure 19:
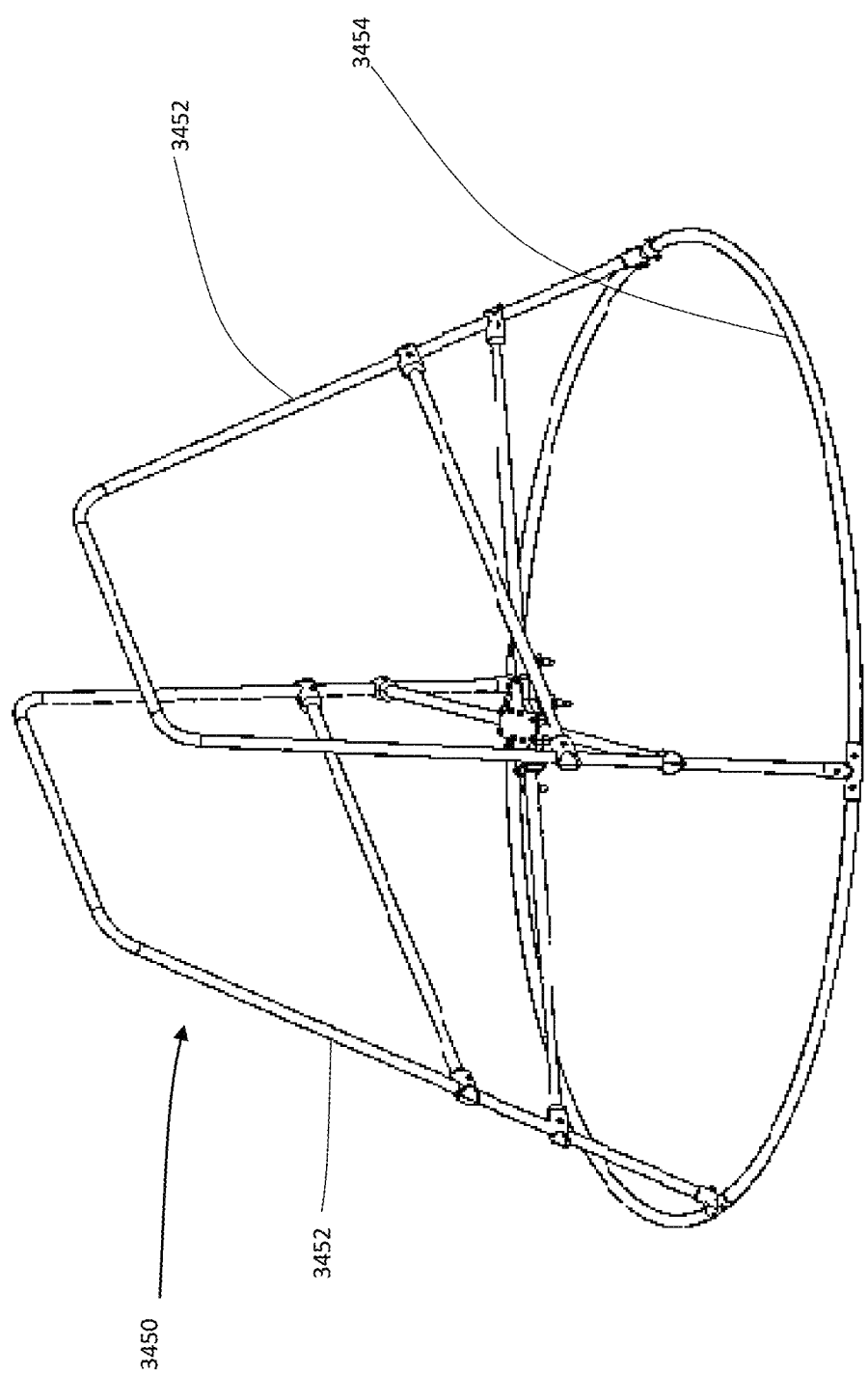
FIG. 19 shows a top perspective view of an undercarriage of a hybrid drone.
Figure 20:
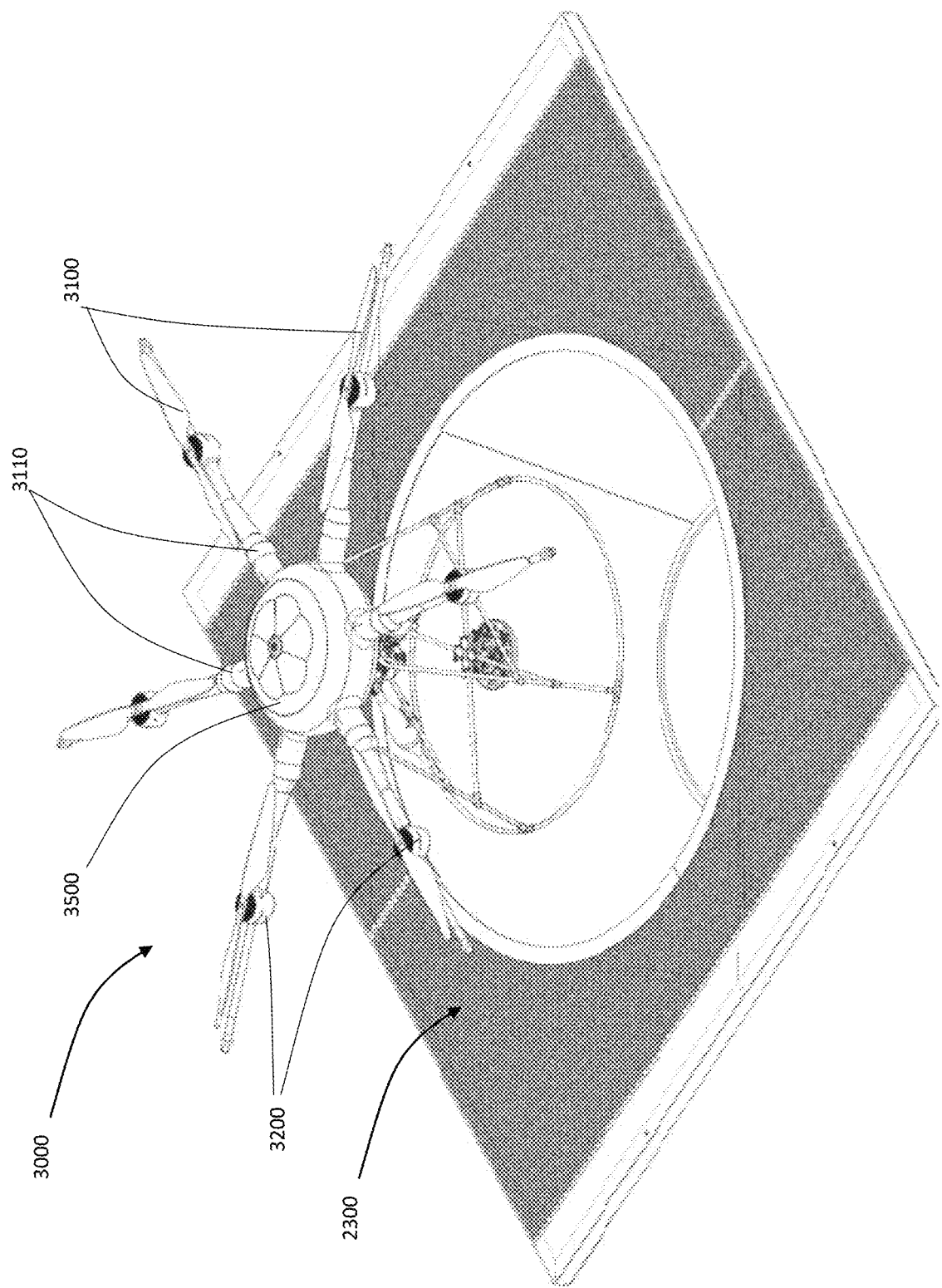
FIG. 20 shows a top perspective view of a hybrid drone about to land in a docking arrangement.
Figure 21:
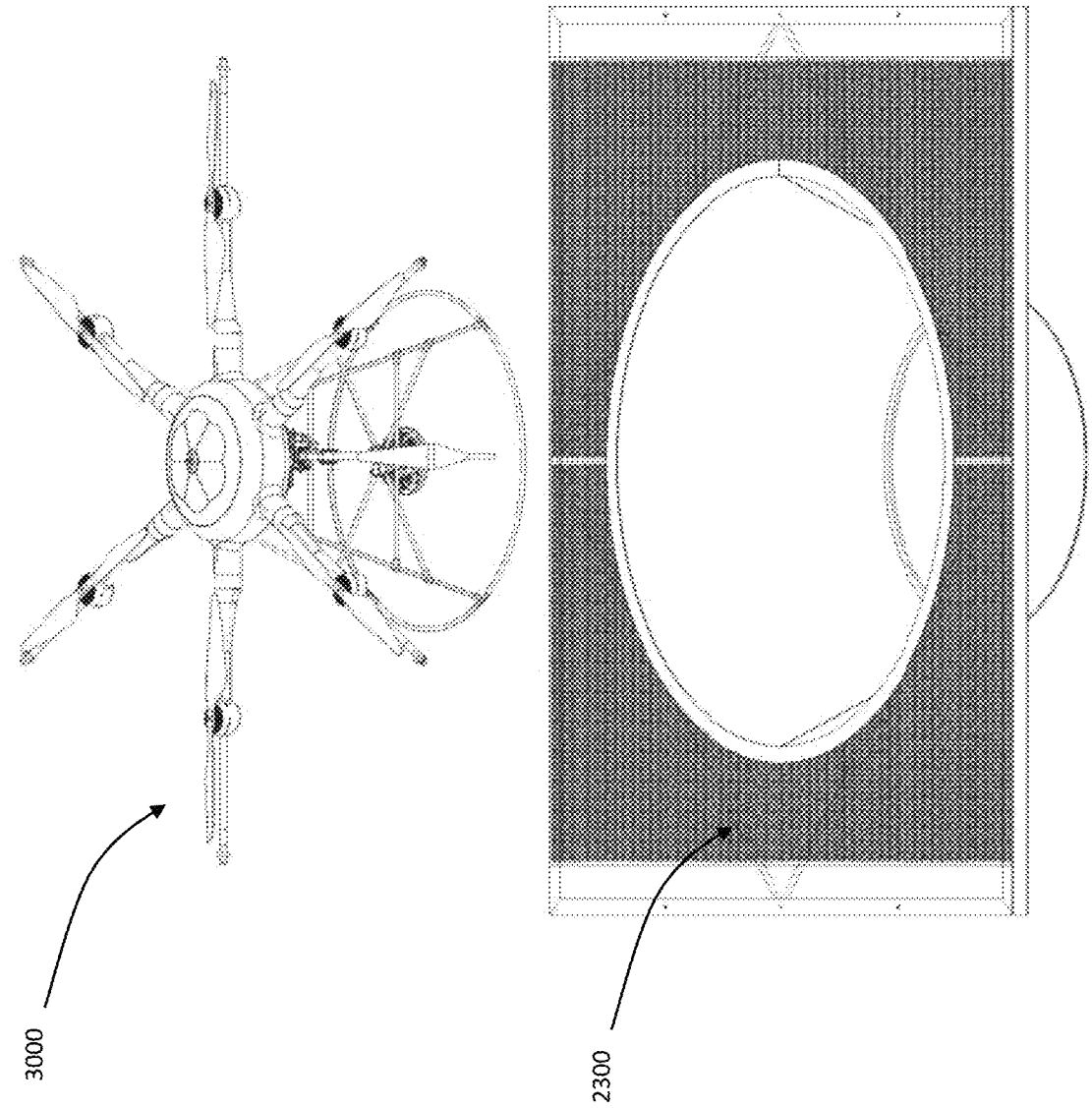
FIG. 21 shows a top perspective view of a hybrid drone hovering above a docking arrangement.

As shown in FIGS. 10 and 11, the docking arrangement includes an electromagnetic frequency transmitter 2330 located within the alignment formation 2310, and preferably located centrally. The electromagnetic frequency is preferably generated as an infrared beam beaming upwardly from the centre of the base 2322. A corresponding electromagnetic frequency sensor, preferably in the form of infrared sensing camera 3319 on the hybrid drone will be configured for directing the drone to align itself with the beam.

The controller that is controlling flight of the hybrid drone 3000 will control movement of the drone to move closer to the infrared beam, thereby aligning the electromagnetic frequency transmitter 2330 with the sensor in the form of infrared camera 3319, to ensure that the hybrid drone is guided downwardly from directly above the docking arrangement. It is envisaged that the controller may additionally and/or alternatively also use a signal received from a high accuracy (1 cm RTK GPS) geolocation sensor on the drone in order to supplement control of the hybrid drone 3000.

As shown in FIG. 10, the centrally located electromagnetic frequency sensor on the hybrid drone 3000 is capable of detecting whether the electromagnetic frequency sensor is in alignment with the infrared beam (shown as arrow B), or whether it is moving further away or closer to the infrared beam. A computing device 500 located on the hybrid drone 3000 may be programmed with software instructions for ensuring the alignment of the electromagnetic frequency sensor 3850 with the infrared beam, to thereby facilitate the landing of the hybrid drone 3000 centrally of the docking arrangement 2300.

Preferably, the docking arrangement 2300 further includes an inductive charging mechanism (not shown) in electrical connection with the battery 2550. The inductive charging mechanism is preferably located in alignment with the base 2322 of the alignment formation 2320. The inductive charging mechanism will be configured for charging a complementary inductive charging mechanism 3870 located on the locating formation 3800 of the hybrid drone. In this way, the solar panels 2500 can be used to charge the battery 2550, which in turn can be used to ensure that the battery of the hybrid drone 3000 is charged while the hybrid drone 3000 is docked with the base station 2000.

Cover Arrangement

The base station 2000 further includes a cover arrangement 2400 that is composed of a pair of opposed sliding panels 2410 that are movable on tracks 2420 by linear actuators 2422. The sliding panels 2410 each include skirts 2412 extending downwardly from their outer edges. The base station 2000 including the cover arrangement 2400 form an enclosure, as will be described below.

The cover arrangement is movable between an open condition and a closed condition. The opposed sliding panels are movable between an open position and a closed position corresponding to the open condition and the closed condition of the cover arrangement 2400. In the closed condition, the cover arrangement closes the open topped housing 2020. The opposed sliding panels are movable preferably by operation of linear actuators 2422 that include electric motors driving worm drive gear boxes, or chain or similar to drive the movement of the sliding panels along the track.

In the open condition, the hybrid drone 3000 is capable of being landed on the base station 2000, and preferably within the docking arrangement 2300, and for being launched from the base station 2000. Preferably, the sliding panels 2410 are movable to their closed position when the hybrid drone 3000 is received within the docking arrangement 2300. Preferably, when the sliding panels 2410 are moved to their closed condition with the hybrid drone 3000 received within the docking arrangement, then the sliding panels 2410 will serve to secure the hybrid drone 3000 snugly in place, for example for transport.

Further, when the sliding panels 2410 are moved to their closed position, they will cover the docking arrangement and protect the docking arrangement and/or hybrid drone 3000 from the elements. In this respect, preferably the sliding panels are sealingly engageable with each other in their closed position in order to prevent the ingress of rain, dust or snow.

It is further envisaged that the cover arrangement 2400 can be moved to its closed condition even when the hybrid drone 3000 is not received within the docking arrangement 2300 (for example when it is in flight) in order to cover the refuelling mechanism to prevent ingress of dust. As may be seen from FIGS. 4 and 7, the sliding panels 2410 are angled upwardly to the horizontal to meet each other at their upper edge in their closed condition. In other words, the sliding panels move downwardly and outwardly from their closed condition to their open condition. This allows for water and dust to run-off. Further, when the sliding panels 2410 are in their open condition and the hybrid drone 3000 is landing, the angled surfaces of the sliding panels 2410 serve to deflect the wash from the hybrid drone 3000. The angled surfaces of the sliding panels 2410 also serve to increase the efficiency of the solar panels.

The base station 2000 further includes solar panels 2500 located on an mounted to an upper surface of the sliding panels 2410. The base station 2000 further includes a power storage device 2550 in the form of a battery. The solar panels 2500 are electrically connected to the power storage device 2550, and configured for charging the power storage device 2550 with electrical power derived from the sun.

The base station 2000 further includes an exhaust arrangement in the form of an exhaust fan 2600 located at an outlet of the housing 2020. The exhaust fan 2600 is powered by power storage device 2550 and is configured for extracting fuel and exhaust fumes to outside of the housing 2020.

The base station 2000 preferably further includes a generator 2850. The generator may be coupled electrically to the power storage device 2550 to keep it charged. The generator 2850 is preferably controllable by the controller 2200.

The base station 2000 preferably also includes an inductive charging device 2650 that is adapted to charge the battery on the hybrid drone 3000 via complementary inductive charging device 3870 on the hybrid drone 3000 when it is docked with the base station 2000. Inductive charging devices are known in art, and discussion of the workings of the inductive charging device is considered beyond the scope of the present specification. Preferably, the inductive charging device 2650 is located centrally of and on or under base 2322 of the alignment formation 2320.

Another embodiment of a base station 2000 is shown in FIGS. 42-48. In this embodiment, the cover arrangement 2400 of the base station 2000 includes a pair of opposed pivoting cover panels 2430. The pivoting cover panels 2430 pivot around a pair of pivot axes 2432 between an open condition (shown in FIG. 47) and a closed condition (shown in FIG. 48). The pivoting cover panels 2430 connected by a hinge 2434 to a support frame 2440 that is mounted to housing 2020. The pivoting cover panels 2430 includes an opening mechanism 2450. In this embodiment, the opening mechanism 2450 is in the form of a plurality of linear actuators 2450 that include an electric motor driving a built in worm gear drive. The linear actuators 2450 are actuatable by the controller 2200 to extend and retract to move the pivoting cover panels 2430 between their open condition and their closed condition. When the pivoting cover panels 2430, also known as movable panels, are in their open condition, the movable panels provide a windshield to aid the hybrid drone during take-off and landing. The panels 2430 serve to reduce the wind affecting the drone during take-off and landing sequences.

In alternative embodiments alternative opening mechanisms could be used such as pneumatic piston and cylinder arrangements.

When the pivoting cover panels 2430 are in their closed condition, they enclose the platform 2310 of the docking arrangement 2300.

Pivoting panels 2430 also preferably include solar panels 2500 mounted on an outer surface of the pivoting cover panels 2430. The pivoting cover panels 2430 preferably slope to either side of the housing 2020 to ensure that rain and dust may be more easily removed from the solar panels 2500 and upper surfaces of the pivoting cover panels 2430. The sloped pivoting cover panels also allows for increased amounts of clearance below in which to receive the docking arrangement and drone 3000.

Autonomous Refuelling Mechanism

The portable base station 2000 includes an autonomous refuelling connection mechanism 2100 that is adapted for refuelling a hybrid drone 3000 in use. The base station 2000 further includes a fuel tank 2700 for storing fuel for refuelling the hybrid drone 3000. The fuel tank 2700 has a cap (not numbered) so that in the embodiment where a two-stroke drone engine is used, oil can be added directly to the fuel tank 2700 via the cap. The fuel tank 2700 may be housed within the housing, but preferably is housed in a tank outside of the housing for safety purposes. The fuel tank 2700 may be configured to feed fuel to the generator as well.

The capacity of the fuel tank 2700 is preferably proportional to the fuel consumed over an average serviceable life of an internal combustion engine of the hybrid drone 3000. The fuel tank 2700 of the base station 2000 may be initially filled and the hybrid drone may be used on a series of missions. When the fuel tank 2700 of the base station has been emptied a predetermined multiple of times, then it will preferably correspond with the approximate timing for the servicing of the internal combustion engine of the hybrid drone 3000.

The fuel tank 2700 is connected by a fuel line 2120 to the autonomous refuelling connection mechanism 2100. The refuelling mechanism 2100 is housed within the housing 2020. The refuelling mechanism 2100 and hybrid drone 3000 will be described in more detail below.

As shown in FIGS. 25-30, the autonomous refuelling connection mechanism 2100 includes a connecting arrangement 2105 that includes a first connector formation 2110 associated with the fuel line of the base station 2000 and a second complementary connector formation 3610 associated with the fuel line of the hybrid drone 3000. The first connector formation 2110 is provided in the form of a first magnetic connector 2110 that is configured for autonomously connecting to a complementary magnetic connector 3610 on the hybrid drone 3000. The magnetic connector 2110 is connected to the fuel line 2120 from the fuel tank 2700. The magnetic connector 2110 is preferably configured to hang down from the cover arrangement 2400 above a point centrally of the docking arrangement, and directly above the centre of the hybrid drone 3000 when it is docked. The magnetic connector 2110 will be attracted to a complementary magnetic connector 3612 located on a top face and in the centre of the hybrid drone 3000 when the magnetic connector 2110 and complementary magnetic connector 3612 are within a predetermined distance of each other. The complementary magnetic connector 3612 is associated with a fuel line 3630 to a fuel tank 3620 on the hybrid drone 3000.

On being attracted to each other, the magnetic connector 2112 and complementary magnetic connector 3612 will engage with each other in a manner as to align the fuel lines 3630, 2120 to thereby allow fuel to be pumped through the fuel lines between the fuel tank 2700 of the base station 2000 and the fuel tank 3620 of the hybrid drone 3000. A resilient seal formation 3642 such as an O-ring extends between the magnetic connector 2110 and complementary magnetic connector 3612 to ensure that fuel does not leak out from between them, and a sealed fluid connection is provided. The fuel line 3630 of the hybrid drone 3000 may be provided with a two-way valve (not shown) and a filter (not shown) to prevent fuel that has been pumped into the fuel line from being spilled out of the fuel line 3630. It is envisaged that once the hybrid drone 3000 is returned to the base station, fuel in the hybrid drone will be removed from the hybrid drone and returned to the base station 2000. Fuel flow sensors may be provided on the fuel lines 3630, 2120 on either side of the connecting arrangement 2105 to be able to check whether fuel is being lost.

The fuel lines 2120 of the base station 2000 may also be provided with a shutoff valve (not shown) for shutting off the fuel line 2120 after sufficient fuel has been pumped to the hybrid drone 3000. Fuel remaining in the fuel line 2120 will be prevented from falling out of the bottom of the fuel line. Preferably the shutoff valve is controlled electronically by the controller 500.

Figure 37:
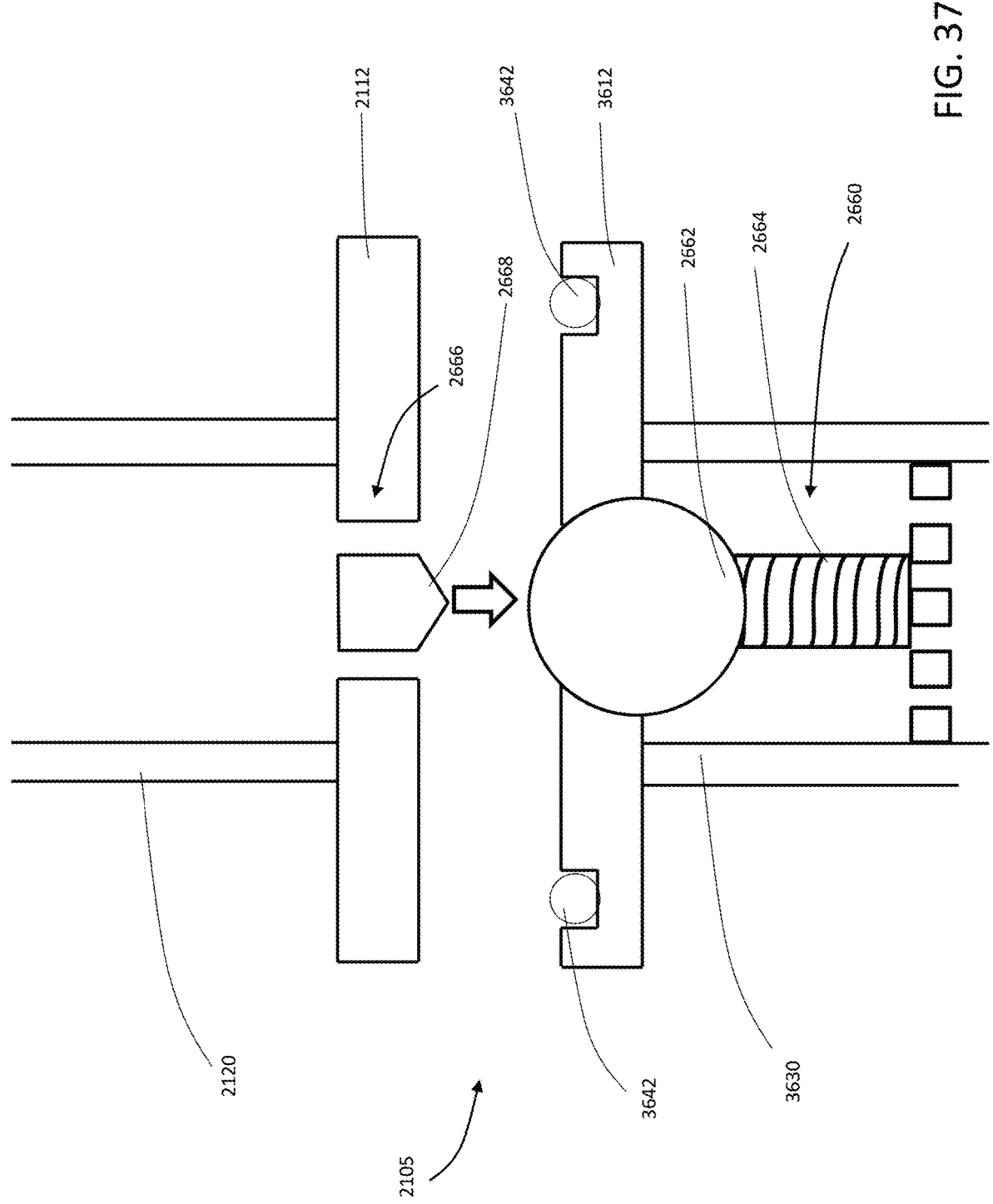
FIG. 37 shows a schematic cutaway side view of an autonomous refuelling connection mechanism with the fuel lines disconnected.
Figure 38:
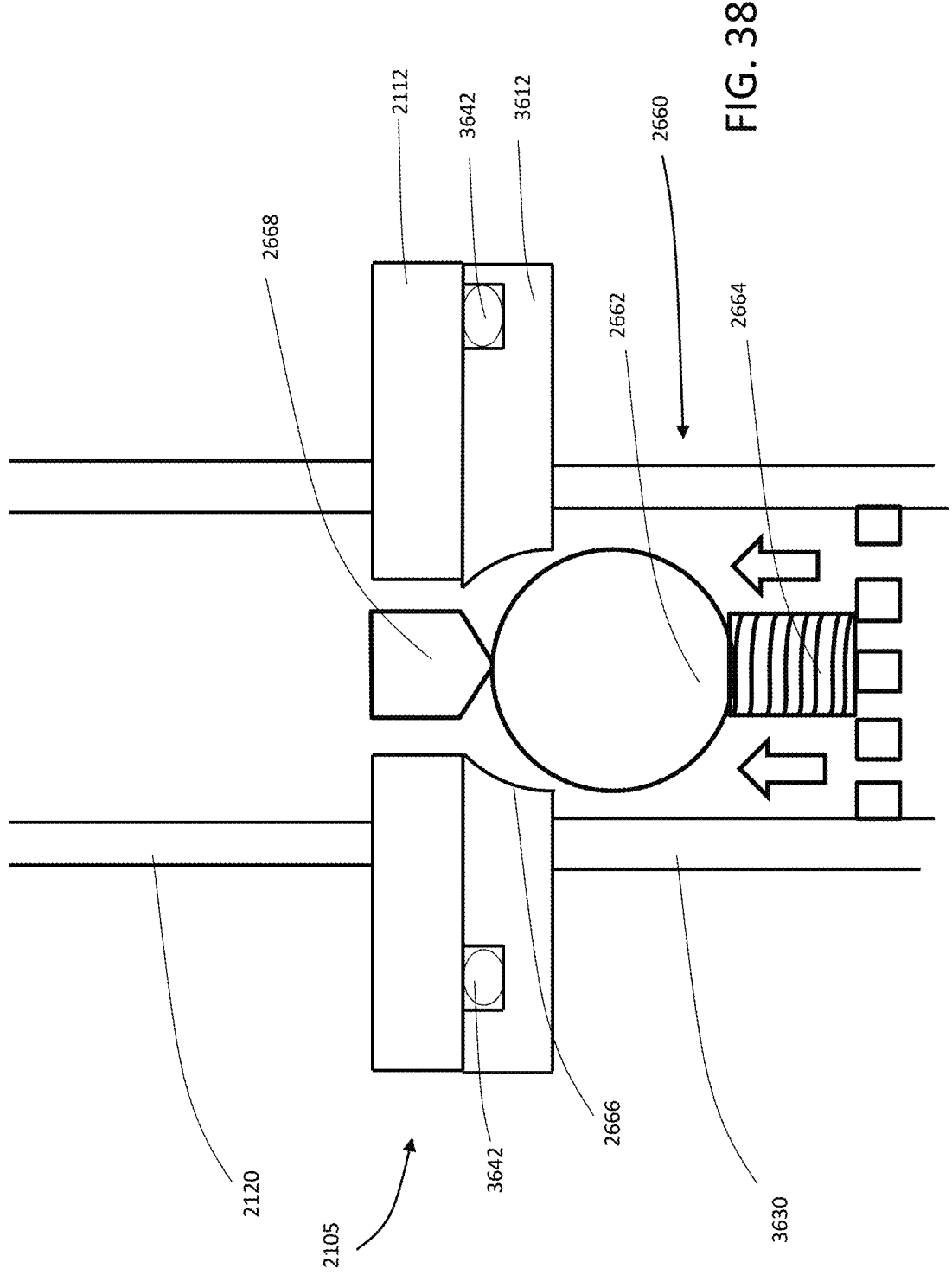
FIG. 38 shows a schematic cutaway side view of the autonomous refuelling connection mechanism of FIG. 37 with the fuel lines connected.

An embodiment of an engagement activated valve 2660 is shown in FIGS. 37 and 38, whereby the valve includes ball 2662 that is biased by a spring 2664 towards a valve seat 2666. The engagement activated valve 2660 is preferably located at an interface between the fuel lines 3630, 2120.

When the magnetic connector 2110 and complementary magnetic connector 3612 engage with each other as shown in FIG. 38, a protrusion 2668 on the magnetic connector 3612 disengages the ball 2662 from the valve seat 2666 to thereby allow fuel to flow from the base station fuel line 2120 to the hybrid drone fuel line 3630 or vice versa. In this way, the valve arrangement is adapted to allow the flow of fuel between the base station fuel line 2120 and the hybrid drone fuel line 3630 when the first magnetic connector 2110 is attached to the complementary magnetic connector 2612, and prevent the flow of fuel between the first fuel passage and the second fuel passage when magnetic connector 2110 is not attached to the complementary magnetic connector 2612 in a sealed fluid connection. The valve arrangement is also present to prevent ingress of dust, dirt, water, insects and the like.

It is further envisaged that the autonomous refuelling connection mechanism 2100 can include one or more electrical sensors (not shown) that is configured for sensing when magnetic connector 2110 and complementary magnetic connector 3612 have engaged. Preferably the sensors used include a magnetic sensor in the form of a Hall effect sensor, as well as a pair of fuel flow sensors to either side of the connector. Fuel flow signals from each of the fuel flow sensors may be compared by the controller 2200 to detect whether there are fuel leaks. The detection of a connection between the magnetic connector 2110 and complementary magnetic connector 3612 will indicate to the base station controller that it may commence pumping fuel from the base station 2000 to the hybrid drone 3000, or vice versa.

In another embodiment (not shown) the electrical sensor can include an electrical conductor (not shown) located on each of the magnetic connector 2110 and complementary magnetic connector 3612 that make contact with each other when these are suitably engaged.

It is further envisaged that either of the fuel lines could include a filter (not shown) for filtering fuel passing through.

Weather Station

The base station 2000 preferably also includes a weather station 2800 that is configured for retrieving ambient weather conditions from an online resource, and/or for detecting the ambient weather conditions locally of the base station 2000. The weather station can include sensors for sensing humidity, moisture, air pressure, and the like. Weather stations and such sensors are well known, and the operation of the weather station is considered beyond the scope of this specification.

Preferably the base station 2000 also includes a fire suppression system 2750. The fire suppression system 2750 preferably includes a pressurised tank for storing suitable fire extinguisher (not shown), a controller (not shown), an automatic release valve (not shown), as well as sensors (not shown) for sensing the presence of combustion within the base station 2000. Such sensors could include temperature sensors, smoke detectors, or any other suitable sensors. On receiving a signal from the sensors indicative of the presence of combustion within the base station 2000, the controller will actuate the automatic release valve to release the pressurised fire extinguisher within the housing 2020, thereby putting out any fire that may be present.

Drone Locking System

Figure 22:
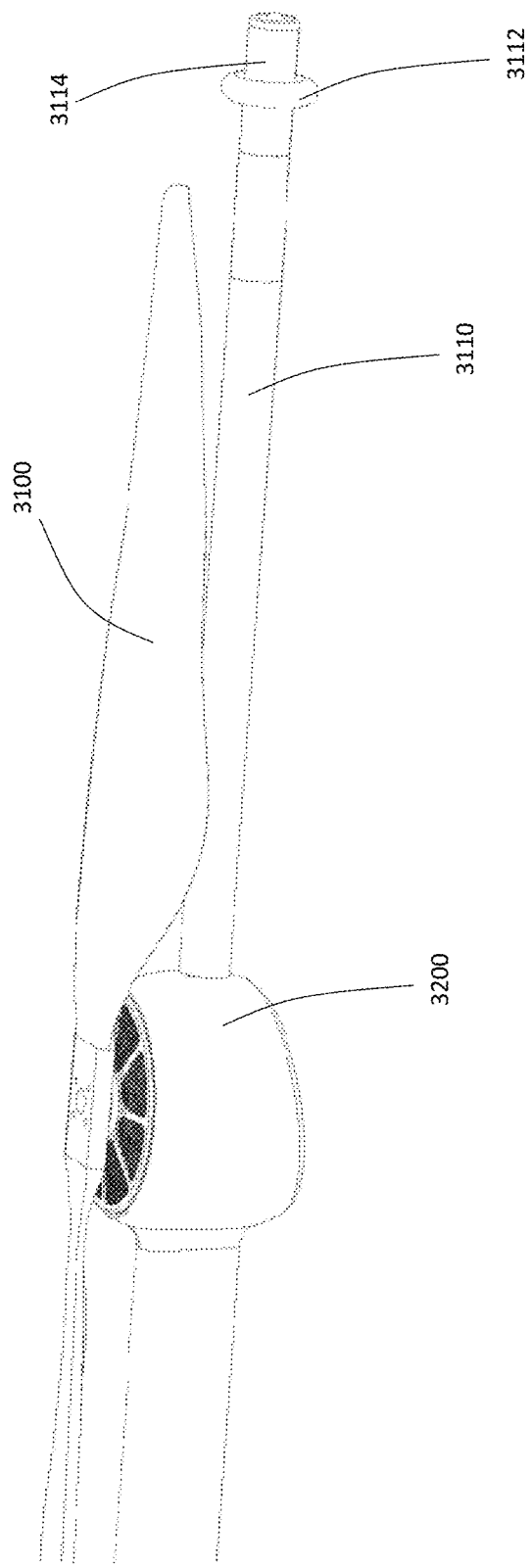
FIG. 22 shows a close-up cutaway view of a propeller and shaft of the hybrid drone.
Figure 23:
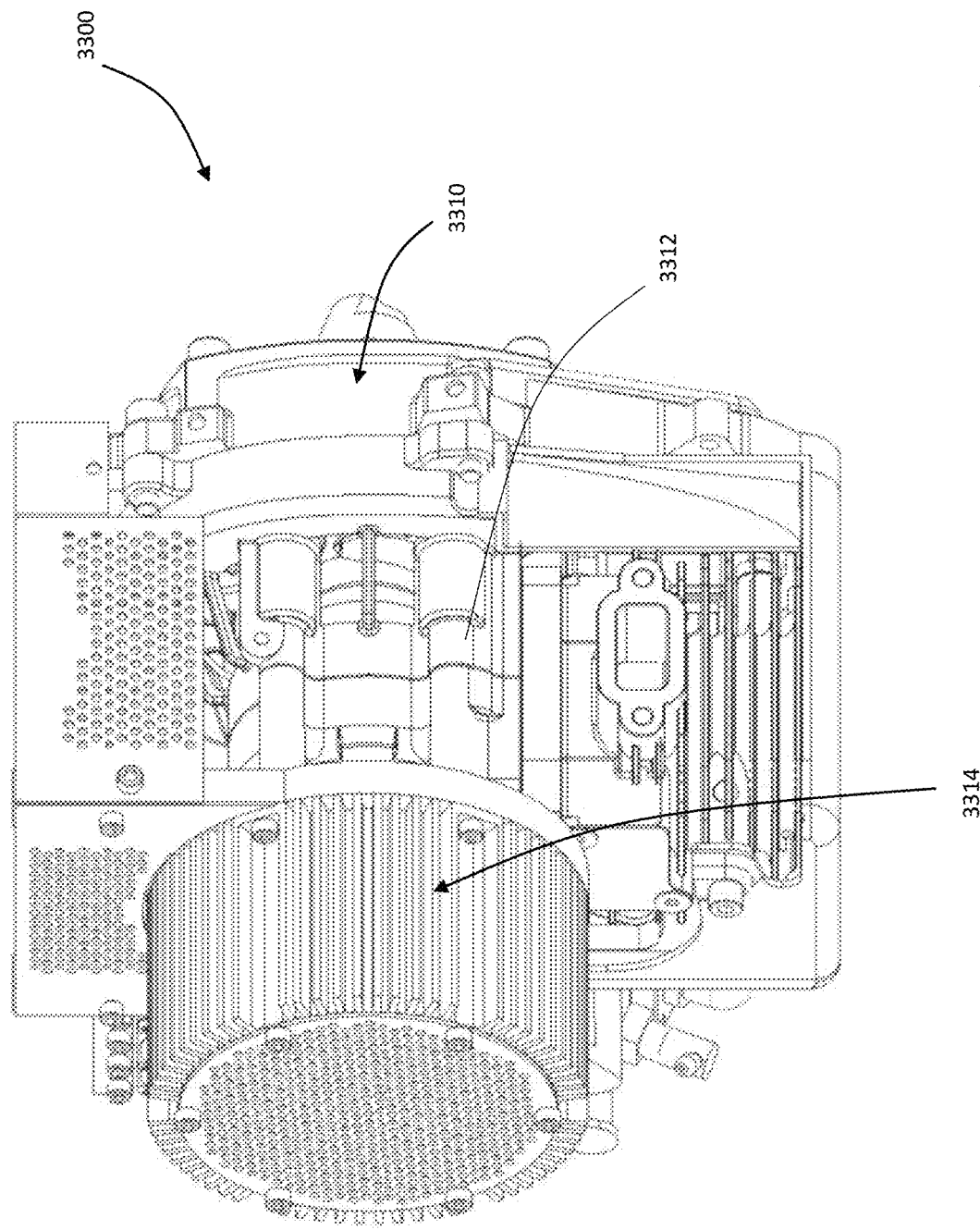
FIG. 23 shows a side elevation view of an on-board electrical power generation device of a hybrid drone, including an internal combustion engine and a generator.
Figure 24:
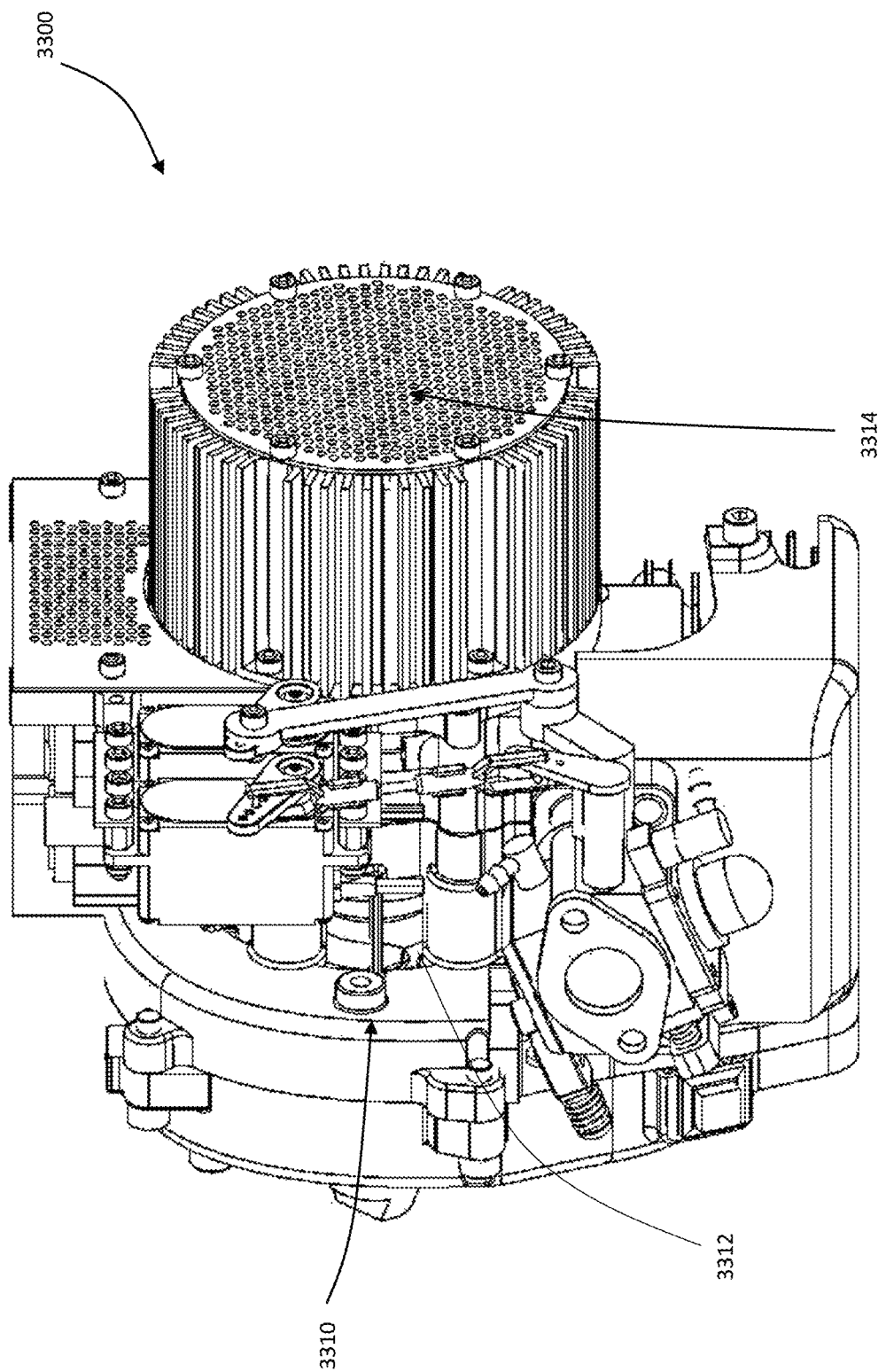
FIG. 24 shows on opposed side elevation view of FIG. 23.
Figure 25:
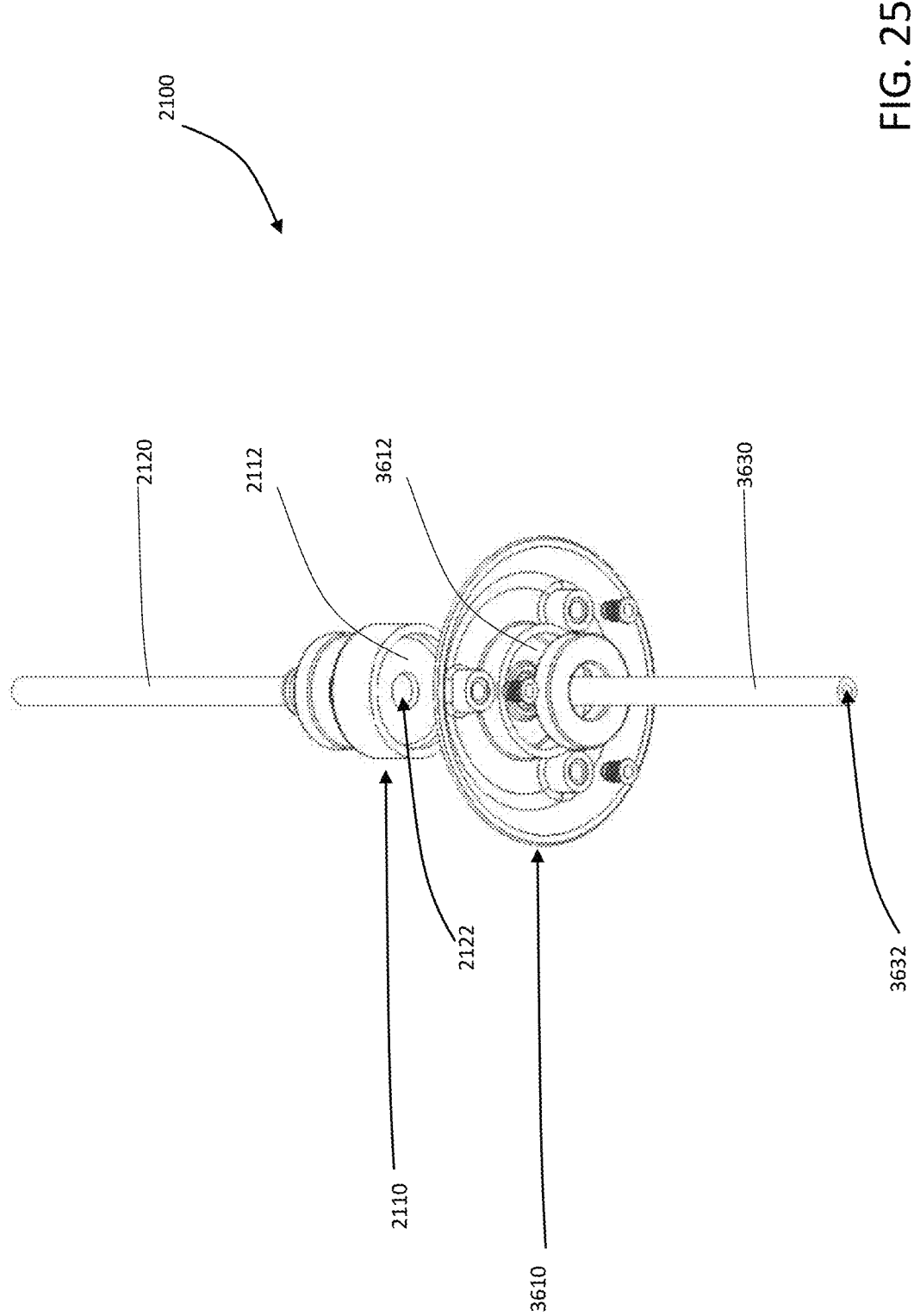
FIG. 25 shows a bottom perspective assembly view of an autonomous refuelling connection mechanism.
Figure 26:
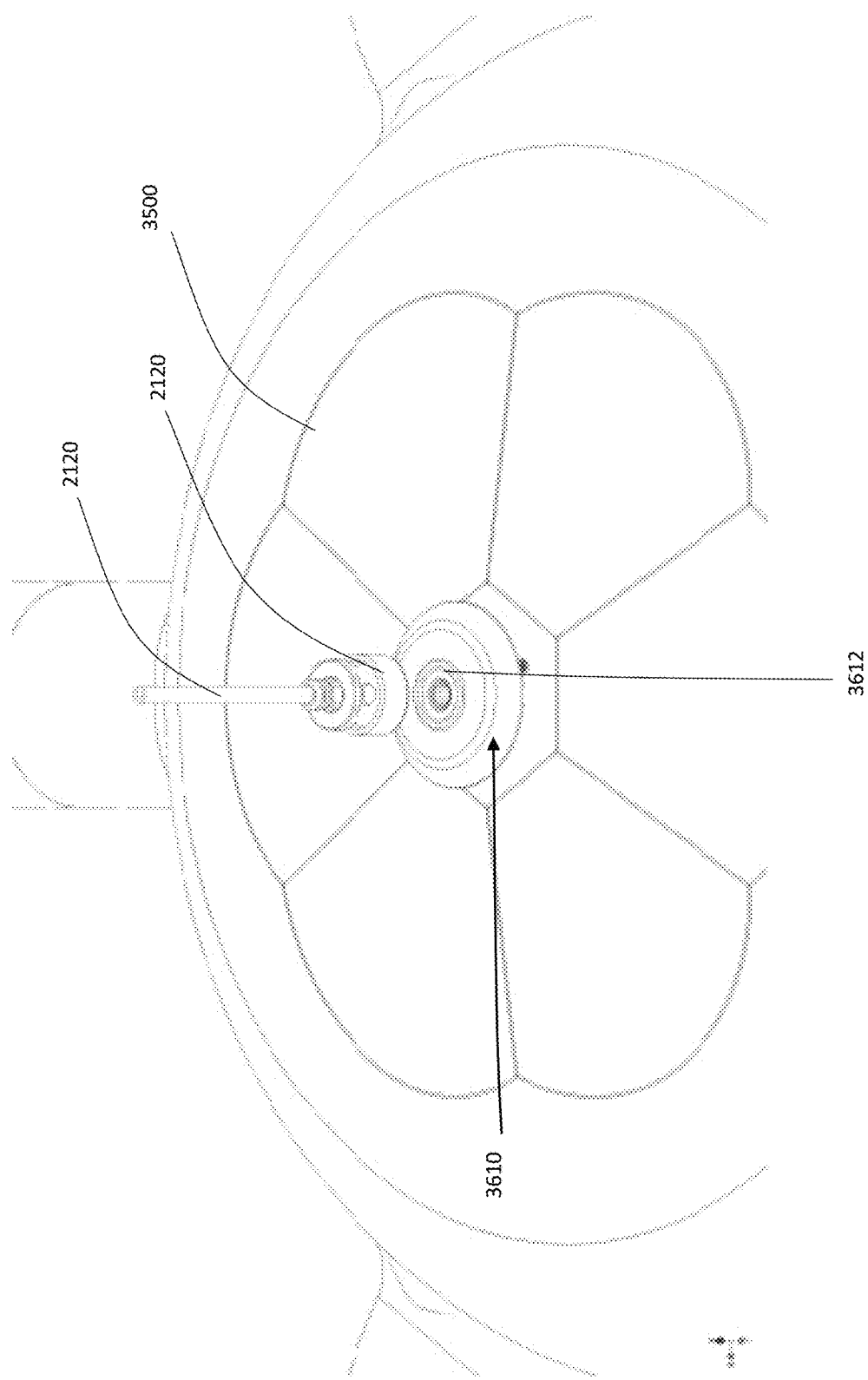
FIG. 26 shows a top perspective assembly view of an autonomous refuelling connection mechanism on top of the housing of a hybrid drone.
Figure 27:
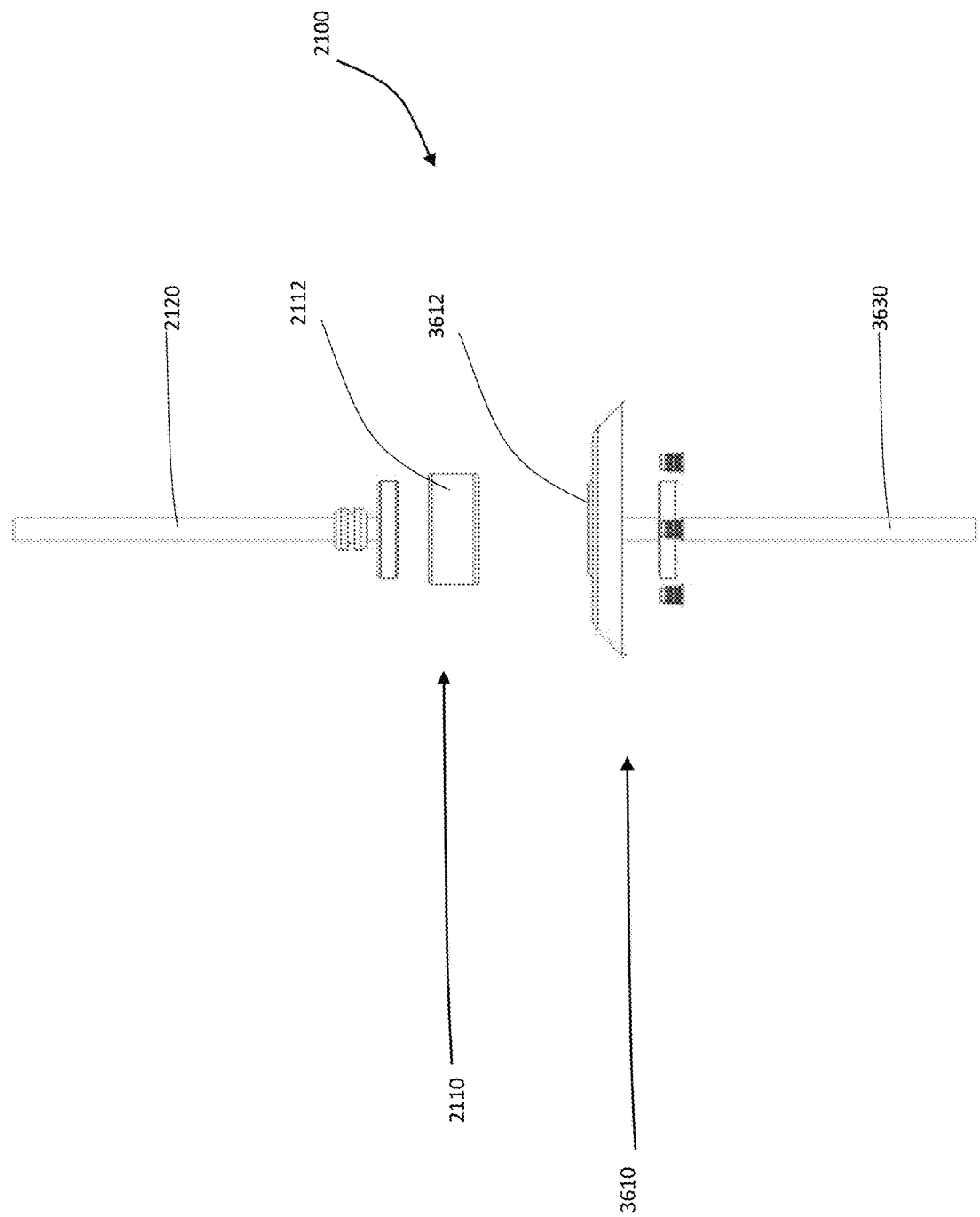
FIG. 27 shows a side elevation assembly view of an autonomous refuelling connection mechanism.
Figure 28:
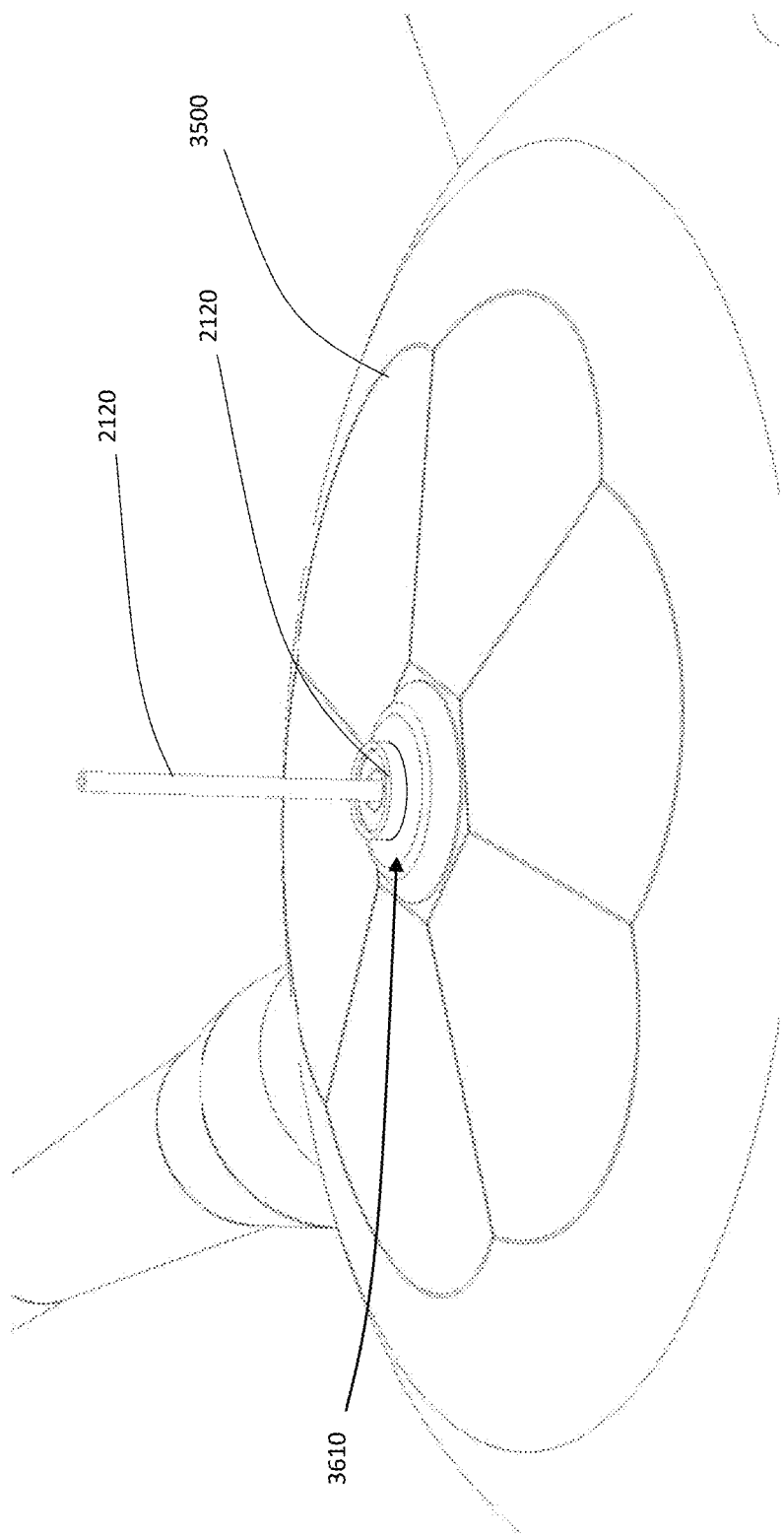
FIG. 28 shows a top perspective view of an autonomous refuelling connection mechanism on top of the housing of a hybrid drone, with the fuel lines of the base station and the hybrid drone connected.
Figure 29:
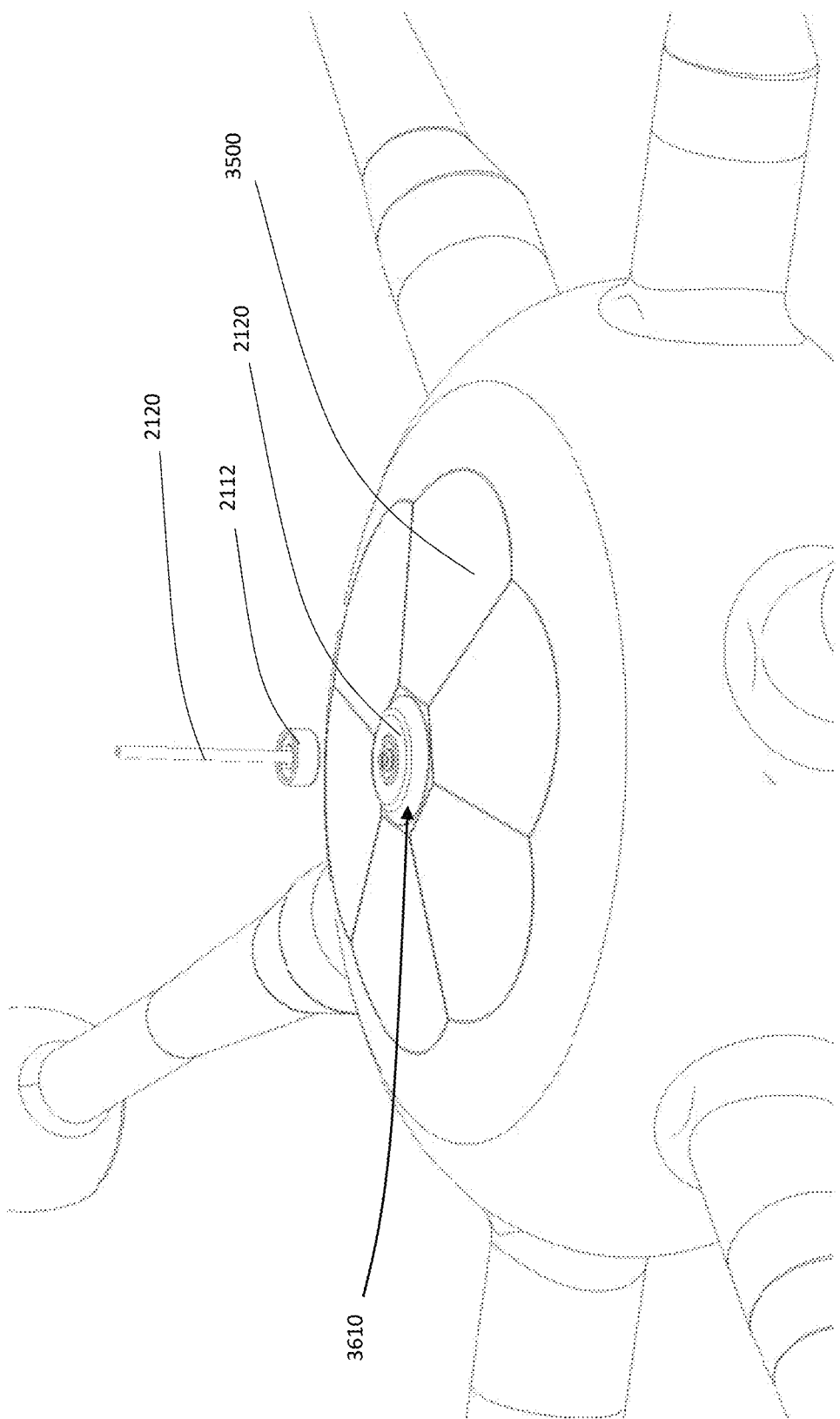
FIG. 29 shows a top perspective view of an autonomous refuelling connection mechanism on top of the housing of a hybrid drone, with the fuel lines of the base station and the hybrid drone disconnected.
Figure 30:
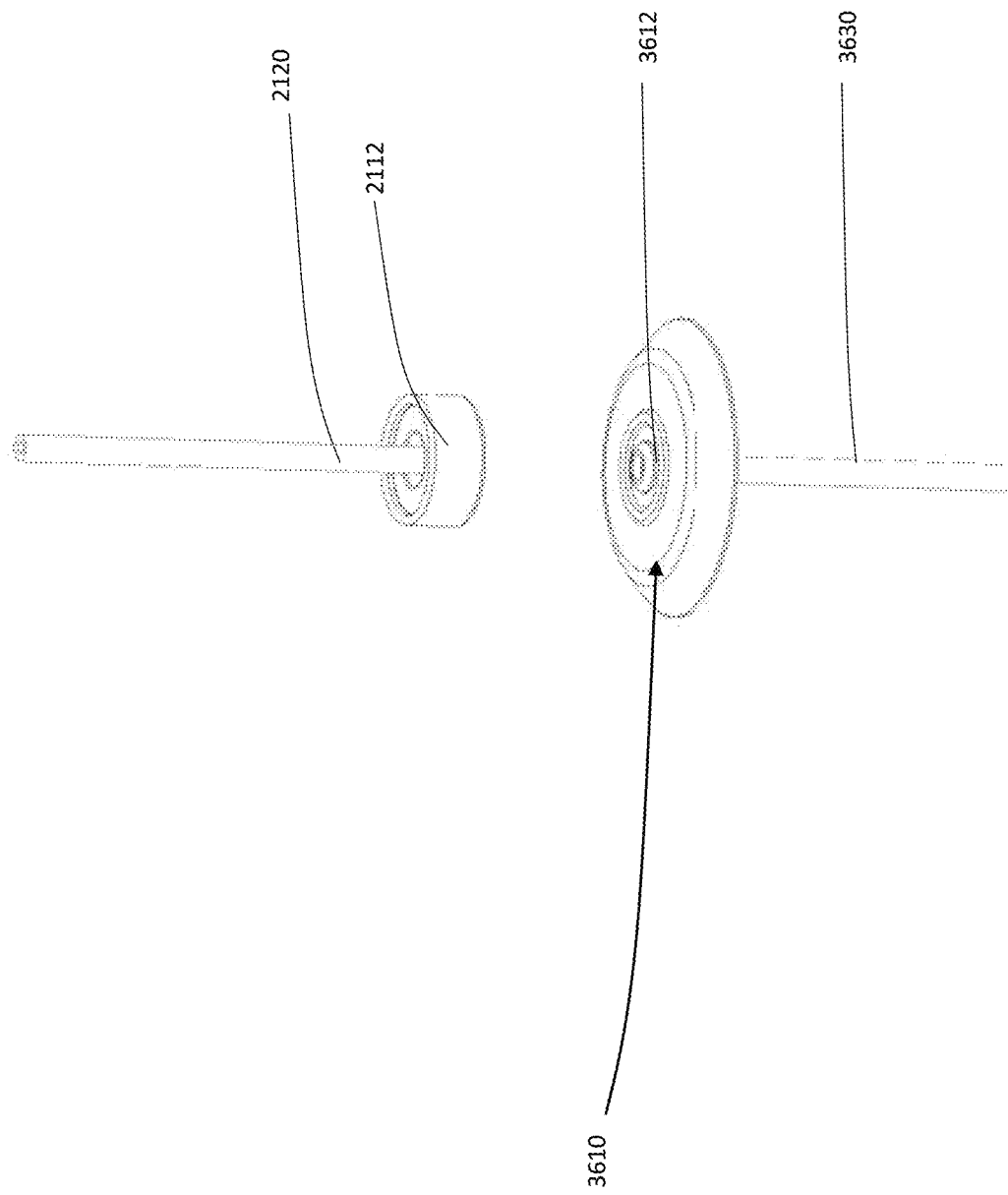
FIG. 30 shows a top perspective view of an autonomous refuelling connection mechanism with the fuel lines disconnected.
Figure 31:
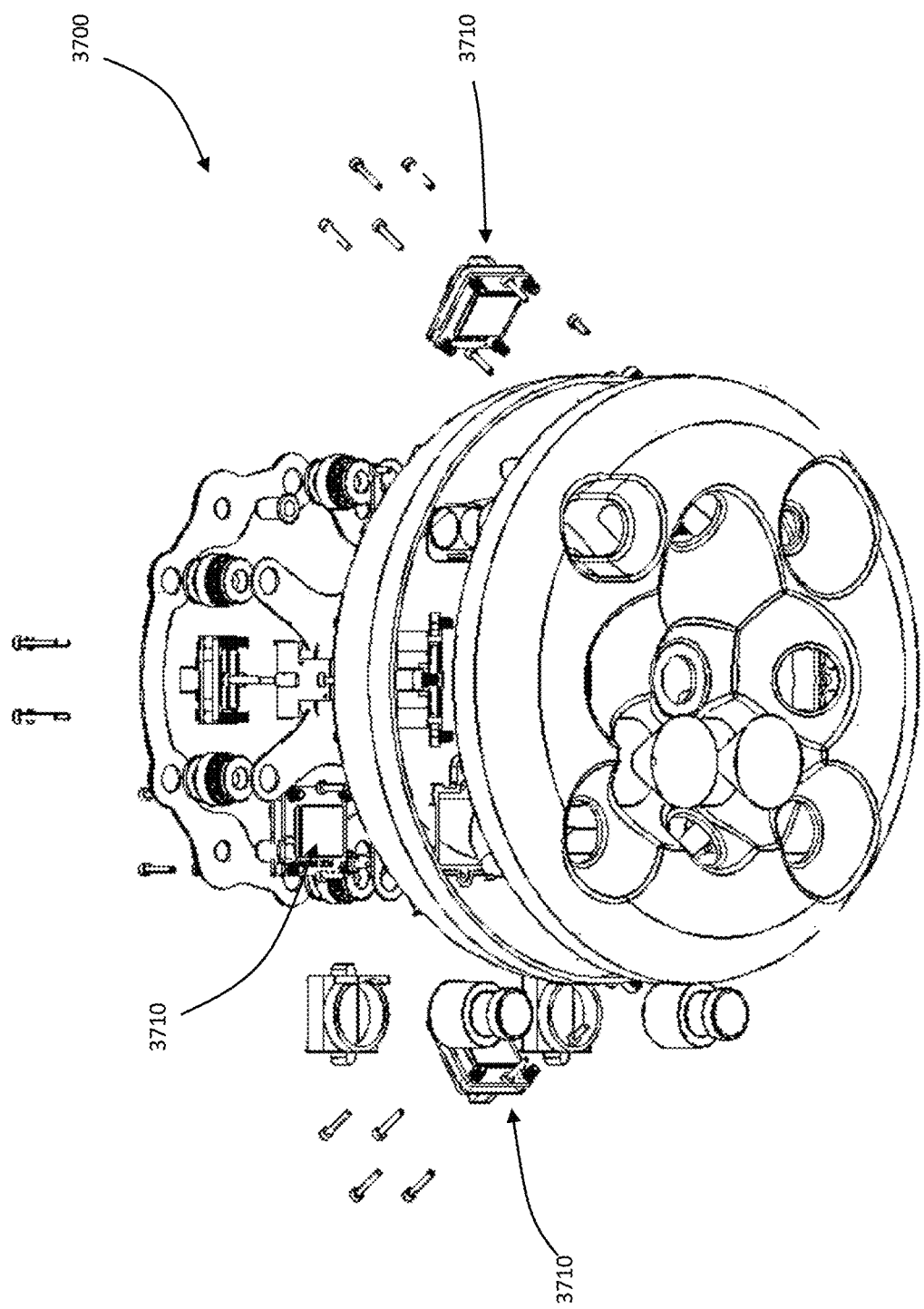
FIG. 31 shows a bottom perspective assembly view of a camera module.
Figure 32:
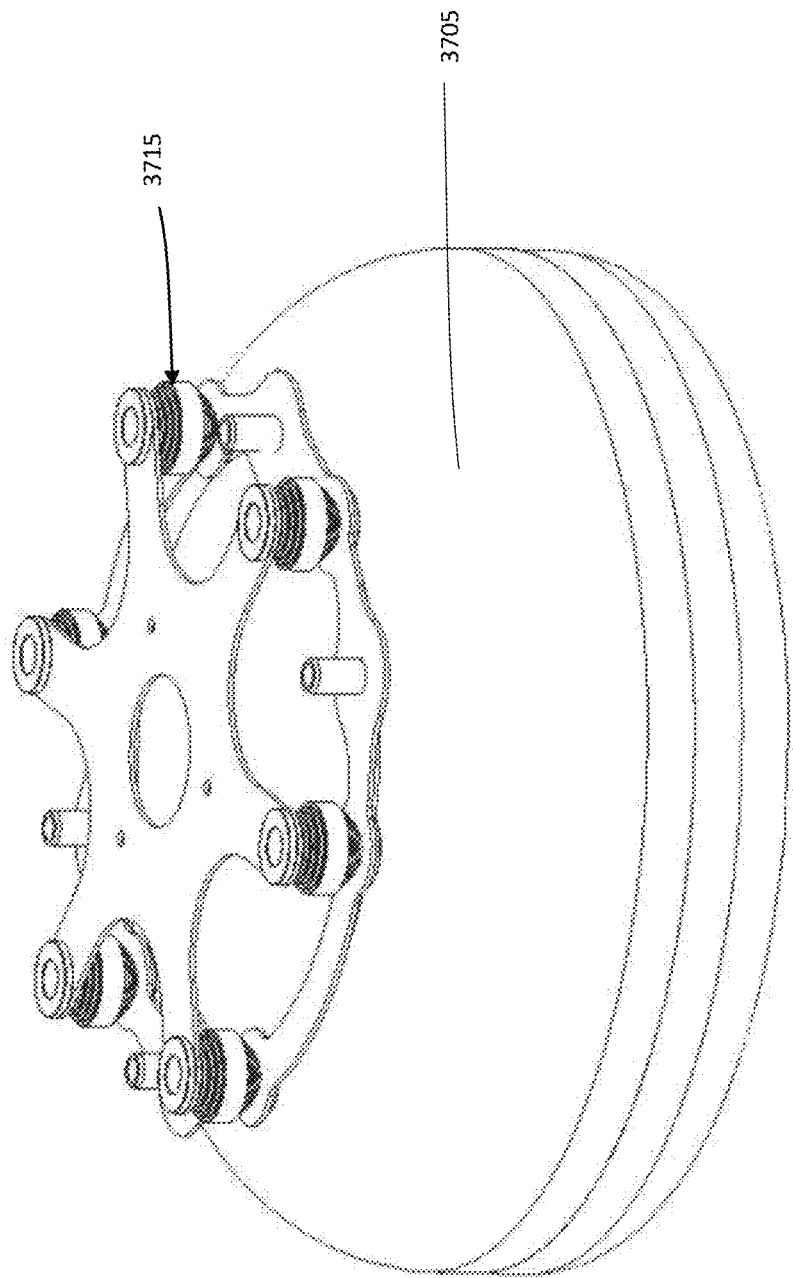
FIG. 32 shows a top perspective view of the camera module of FIG. 31.
Figure 33:
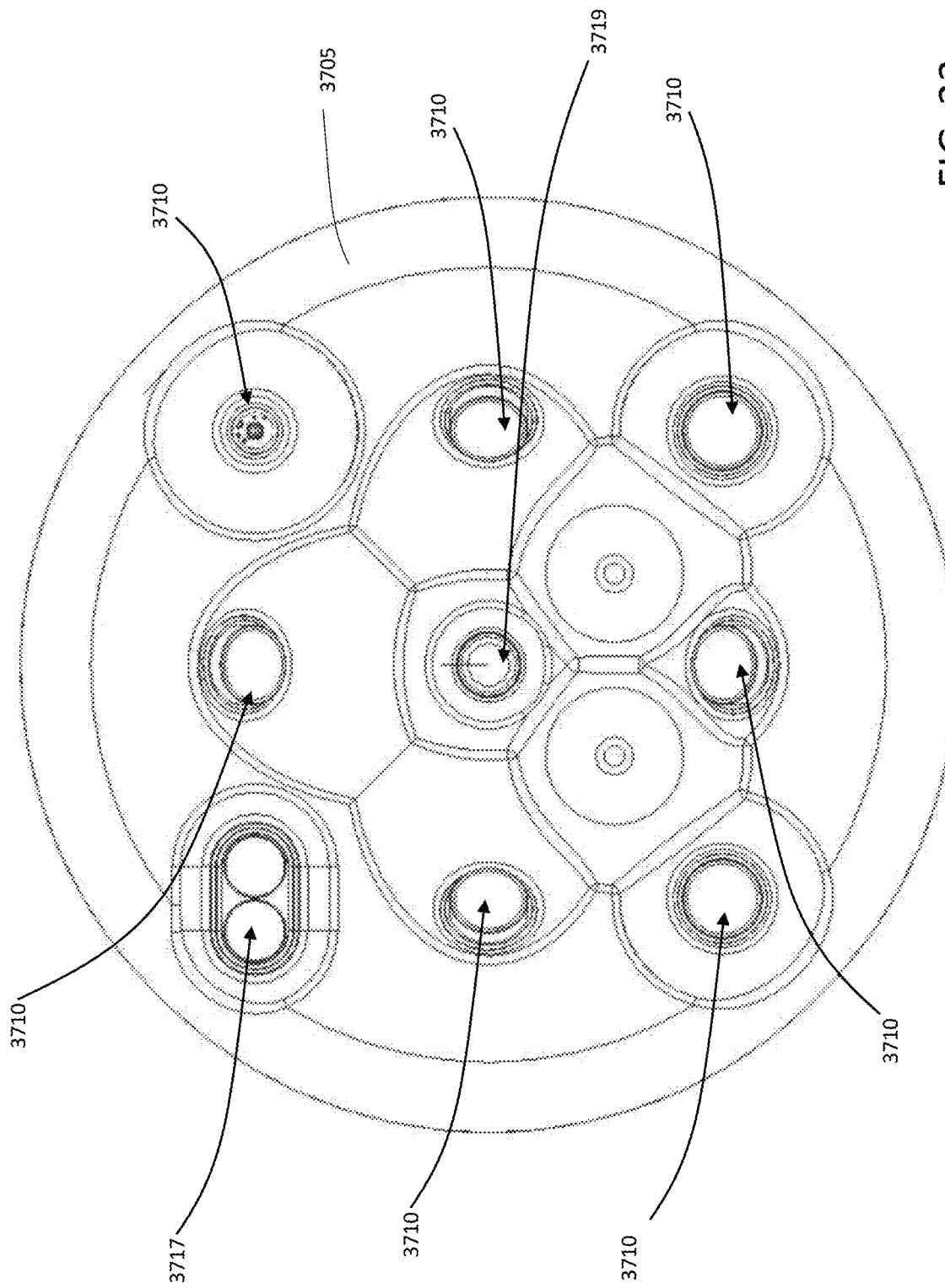
FIG. 33 shows a bottom view of the camera module of FIG. 31.
Figure 34:
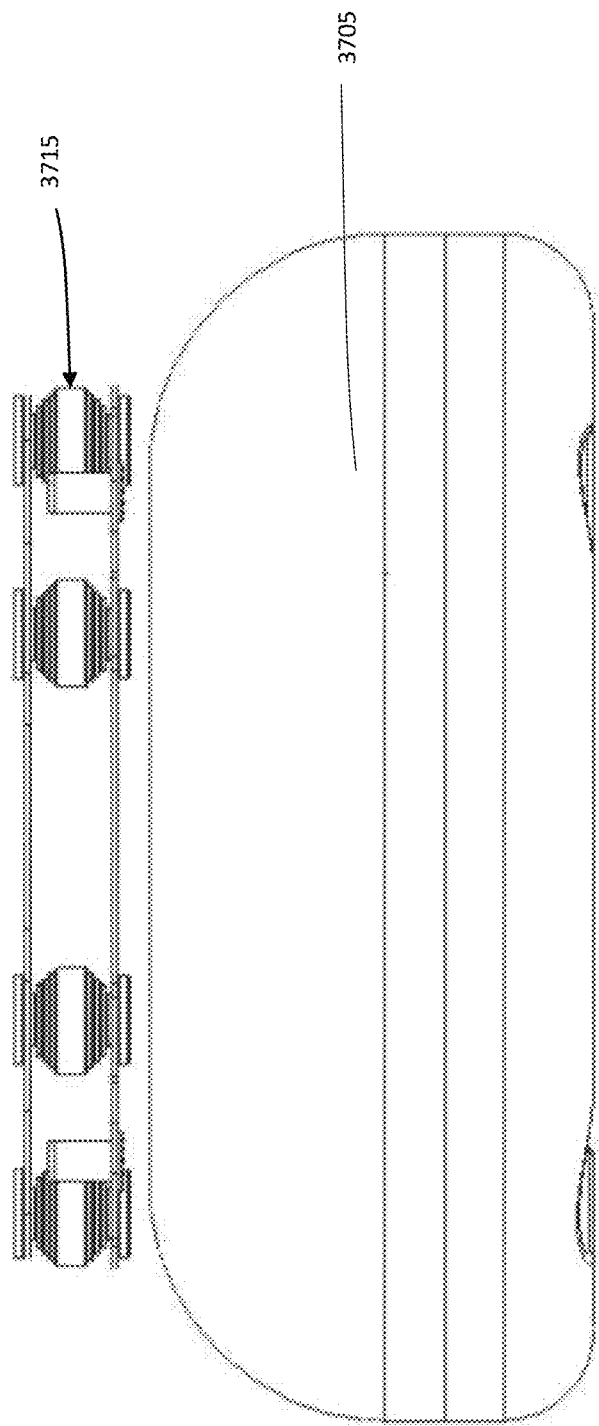
FIG. 34 shows a side elevation view of the camera module of FIG. 31.
Figure 35:
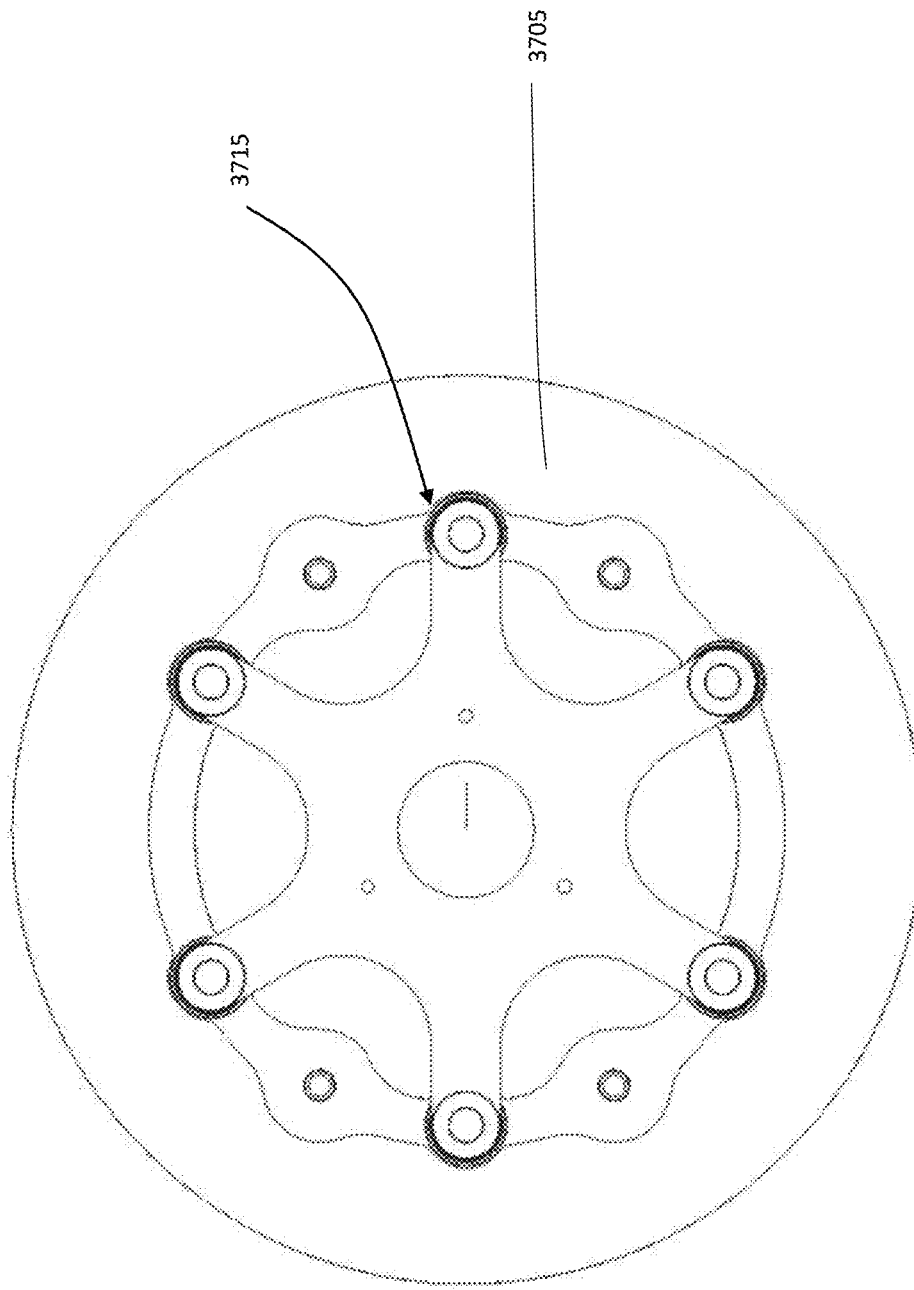
FIG. 35 shows a top view of the camera module of FIG. 31.
Figure 36:
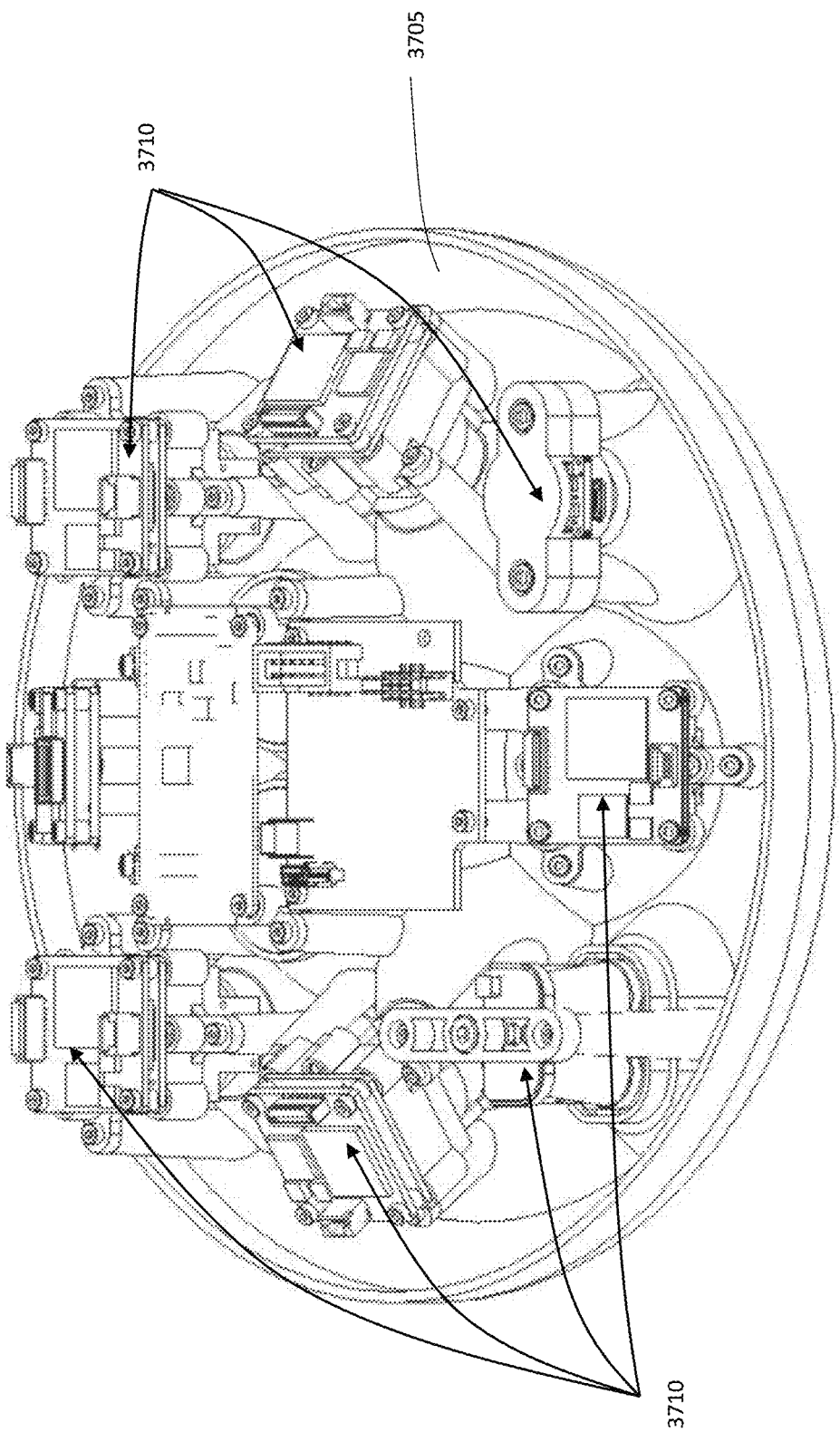
FIG. 36 shows a top perspective view of the camera module of FIG. 31 with the top cover removed.

It is envisaged that the cover arrangement need not lock the drone in place, and the base station 2000 can include an alternative drone locking system (not shown) for locking the drone in place for transport and/or storage. In this regard, as shown in FIG. 22, the ends of the shaft 3110 on which the drone propellers 3100 are located extend further than the length of the propeller blades. Resilient cushioning formations 3112 are provided at the end of each of the shafts 3110. Resilient cushioning formation 3112 preferably composed of a resilient material such as rubber, soft plastic and/or silicone. When the hybrid drone 3000 docks in the docking arrangement 2300, the resilient cushioning formations 3112 will rest on the planar platform 2310, and preferably on a friction surface 2326, such as rubber, soft plastic and/or silicone, that affords a high level of friction with the cushioning formations 3112 to prevent the hybrid drone 3000 moving around during transport. It is envisaged that an alternative drone locking system could lockdown the ends of the shafts 3110 for transport.

Figure 43:
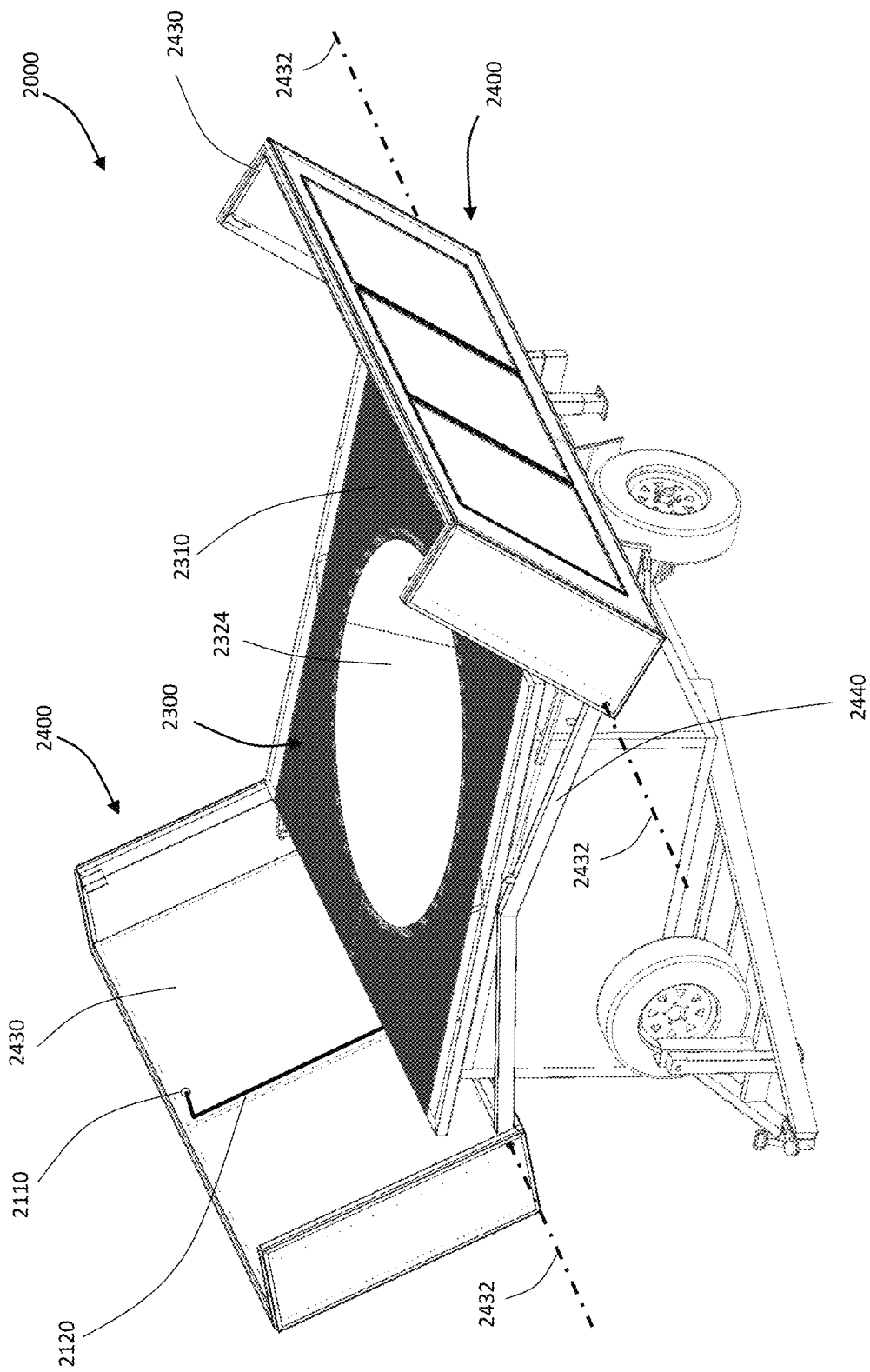
FIG. 43 shows a top front right perspective view of the base station of FIG. 42 with the cover arrangement in an open condition.
Figure 44:
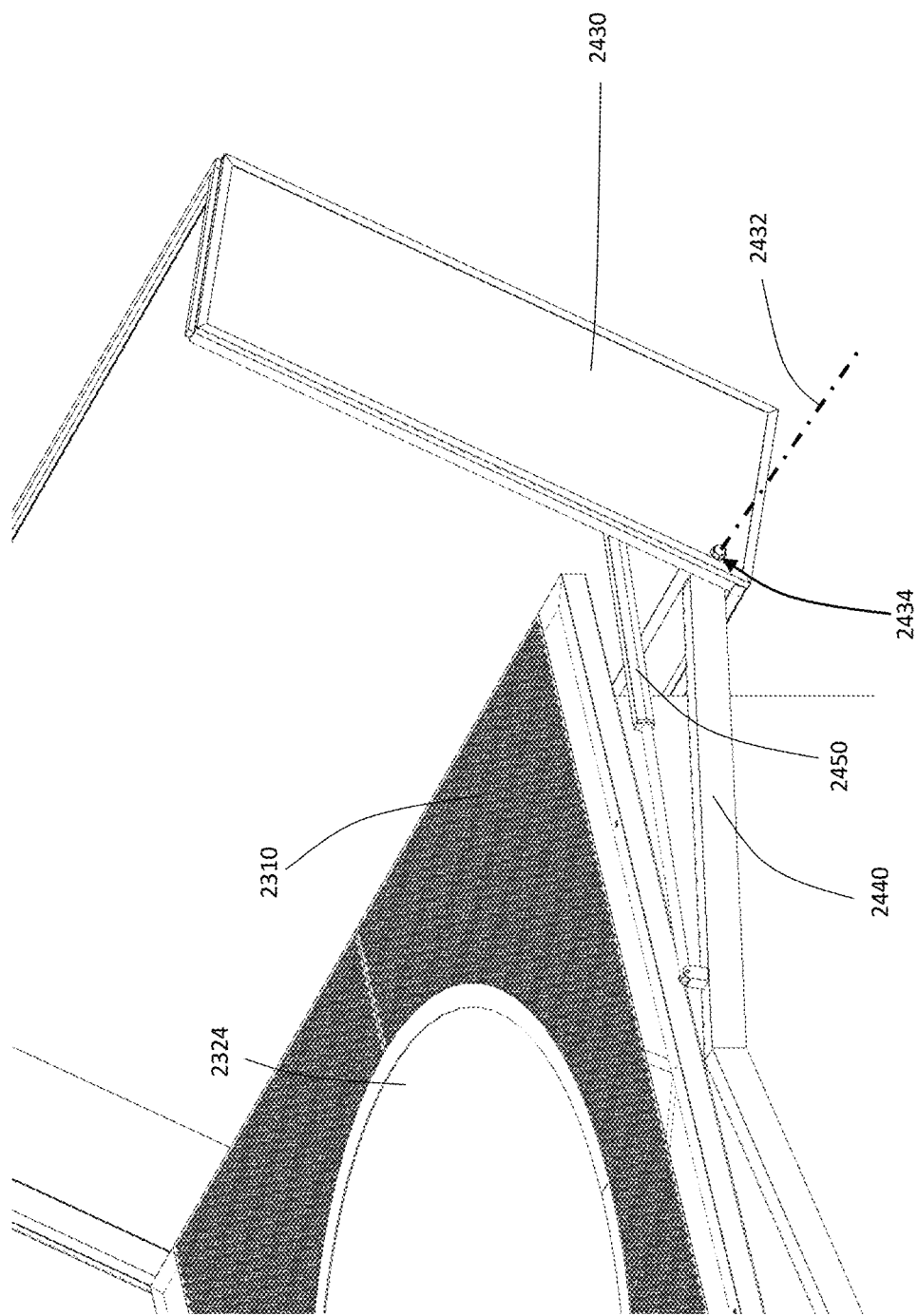
FIG. 44 shows a close-up view perspective view of the base station of FIG. 42 with the cover arrangement in an open condition.
Figure 45:
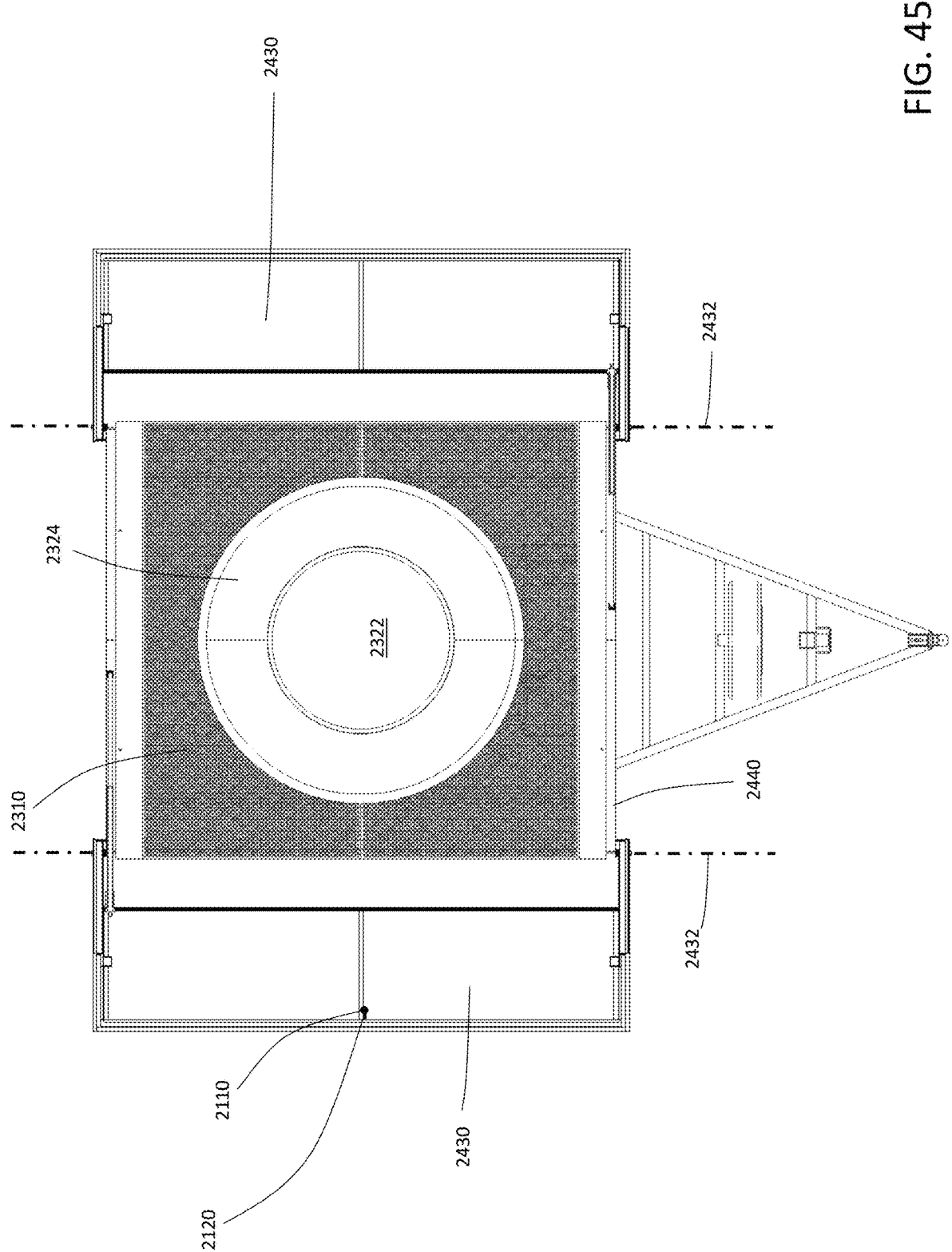
FIG. 45 shows a top view of the base station of FIG. 42 with the cover arrangement in an open condition.
Figure 46:
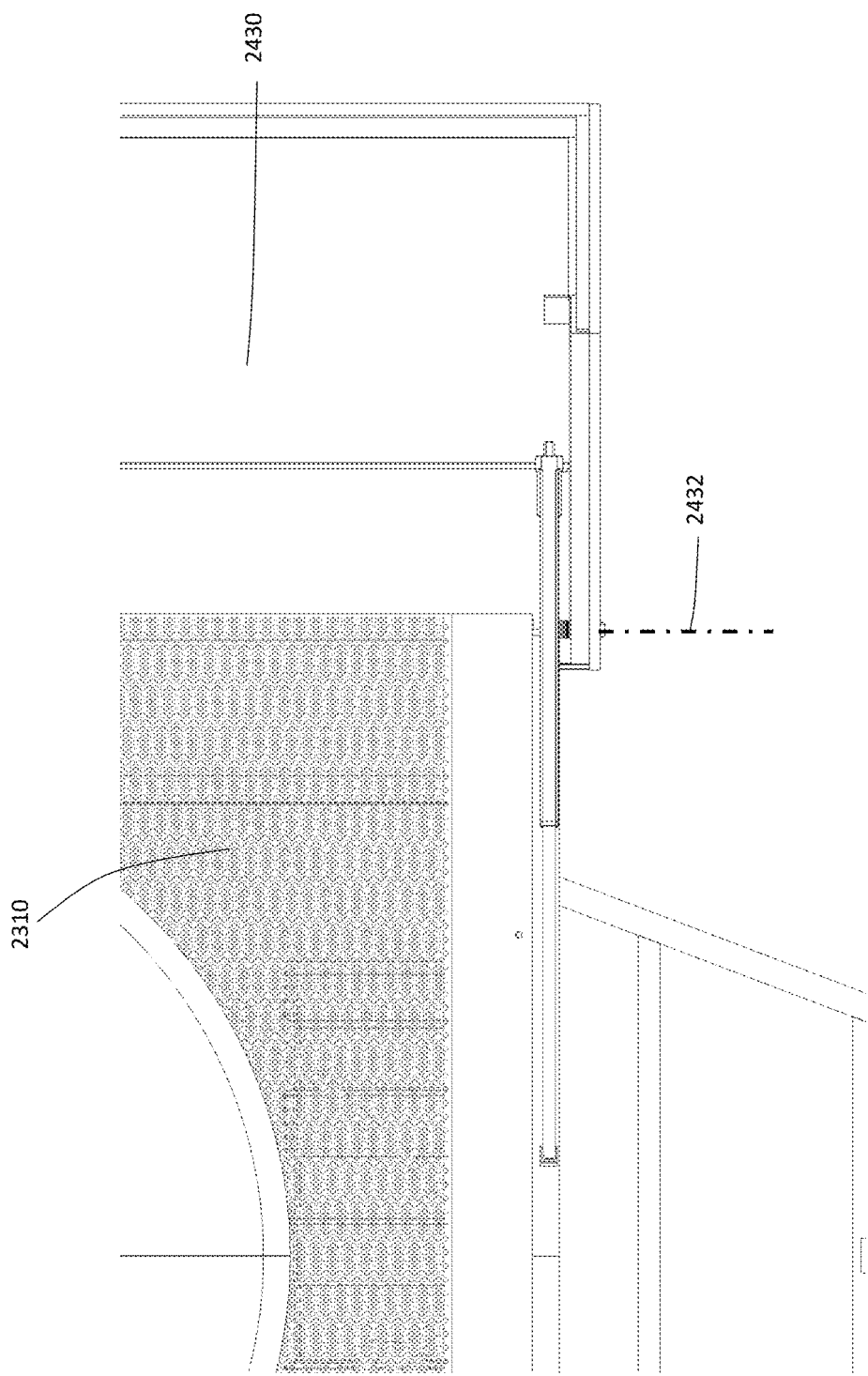
FIG. 46 shows a close-up view of FIG. 45.
Figure 47:
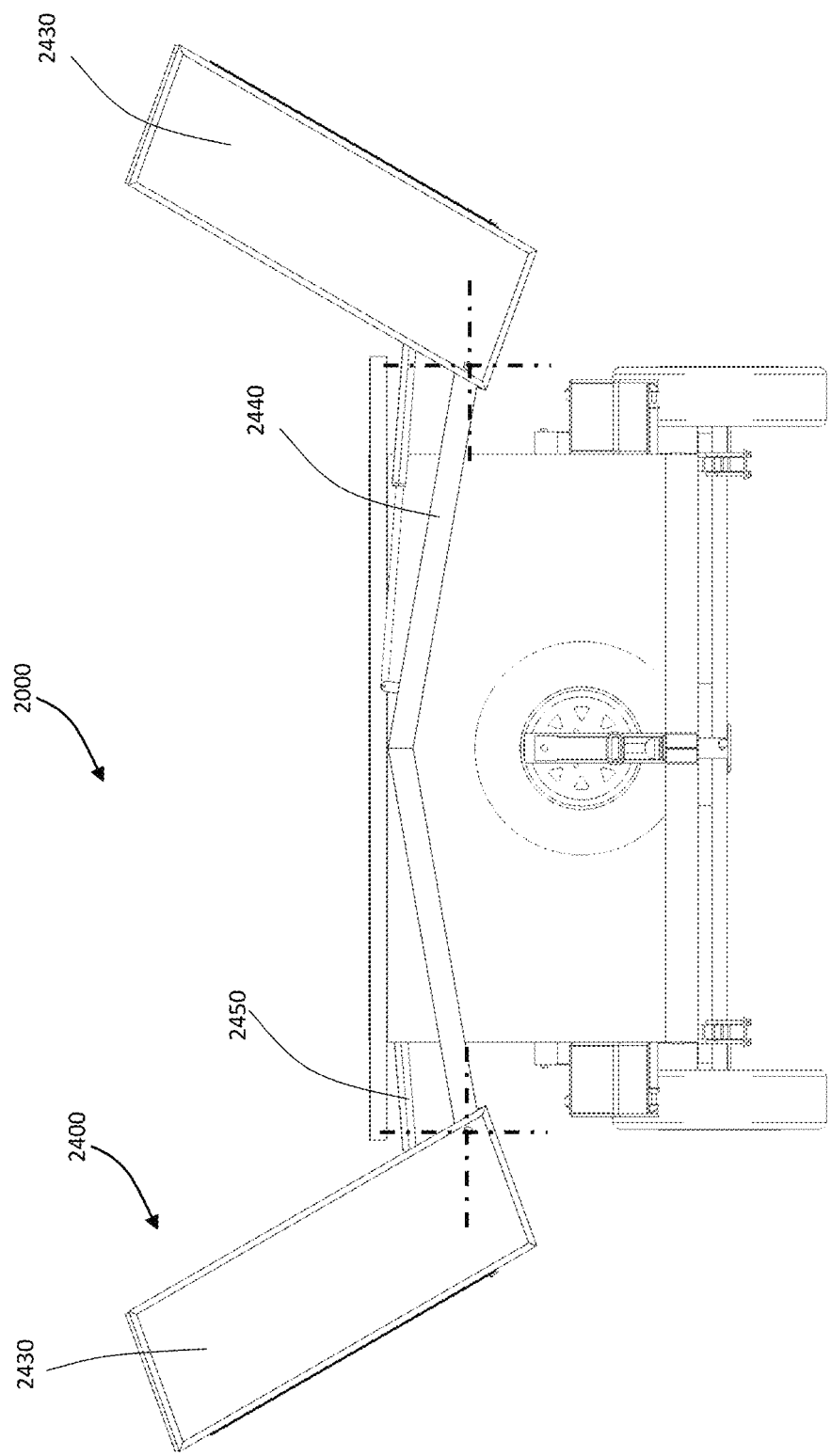
FIG. 47 shows a front elevation view of the base station of FIG. 42 with the cover arrangement in an open condition.
Figure 48:
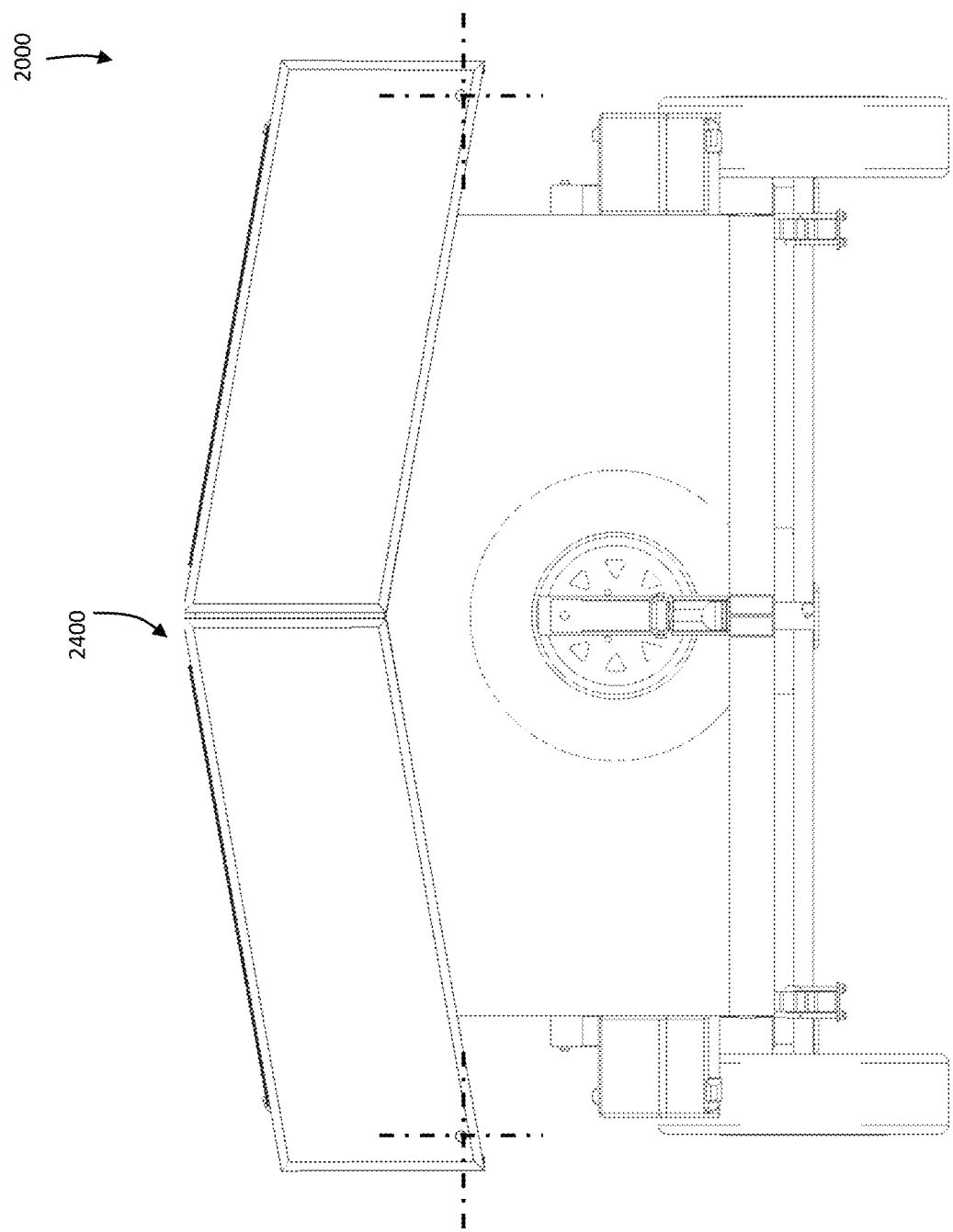
FIG. 48 shows a front elevation view of the base station of FIG. 42 with the cover arrangement in a closed condition.
Figure 49:
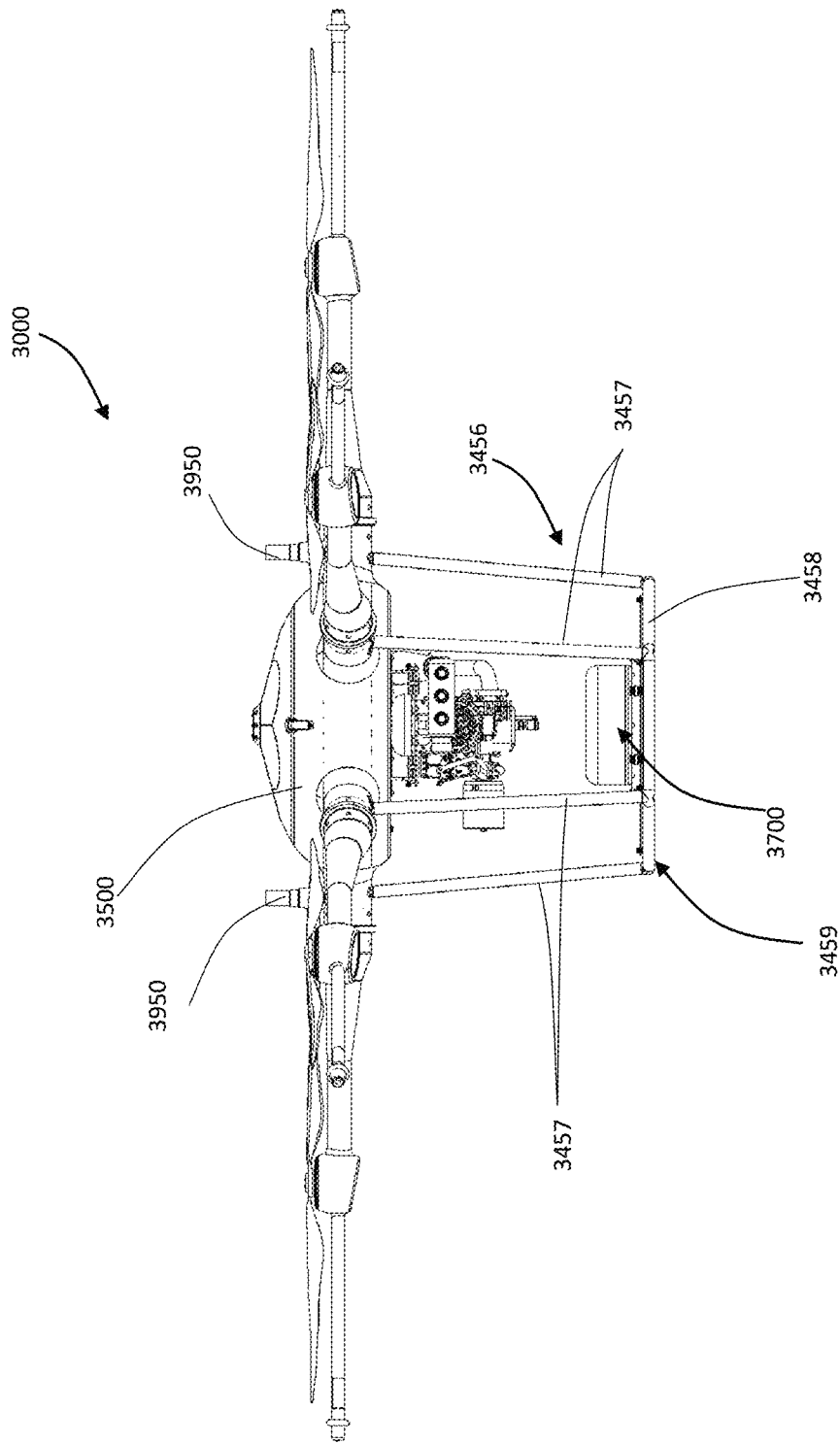
FIG. 49 shows a front elevation view of a second embodiment of a hybrid drone.
Figure 50:
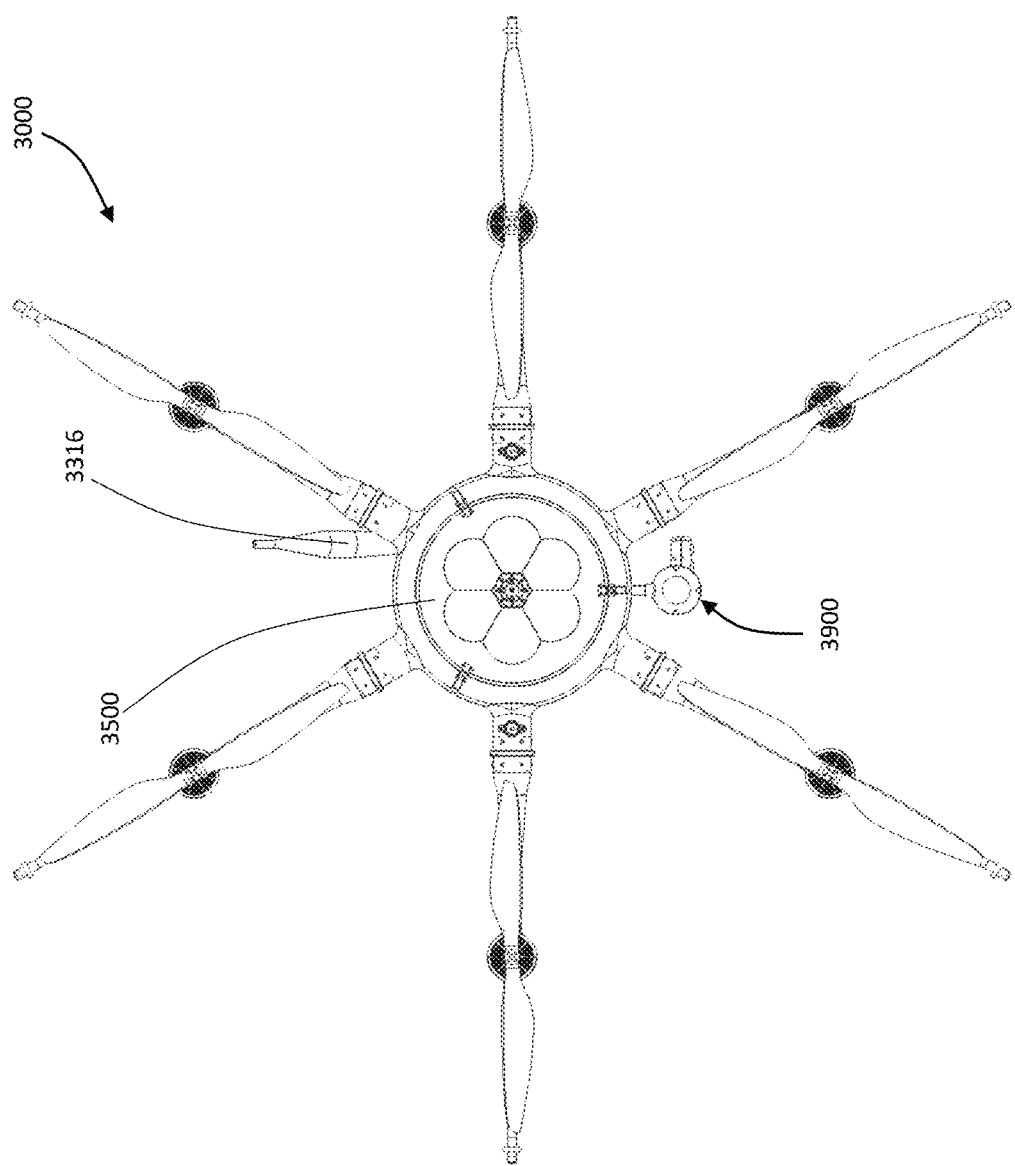
FIG. 50 shows a top view of the hybrid drone of FIG. 49.

In the embodiment of the base station shown in FIGS. 42-48, the pivoting cover panels will each be equipped with a semicircular cushion support that preferably hold down the drone on the propeller centre line. Additionally, as shown in FIG. 43, the fuel line 2120 runs from the fuel tank 2700 along one of the pivoting cover panels 2430 and ends at the magnetic connector 2110. The magnetic connector 2110 projects outwardly and away from the pivoting cover panel

2430. In use, when the pivoting cover panels move from their open position to the closed position, with the hybrid drone 3000 already landed in the base station 2000, the magnetic connector 2110 will be aligned with the complementary magnetic connector 3612 of the hybrid drone 3000.

Communications Interface

The base station 2000 further includes a communications interface 2210 preferably at least partially housed within the housing 2020, and configured for communicating with a drone communications interface 3860 on the hybrid drone, for examples in the form of a Wifi chip 3862 and antenna 3864, on the hybrid drone 3000. To this extent, it is envisaged that the base station 2000 can include a computing device 500 as described above that acts as a controller for the base station 2000. The computing device 500 can include a wireless transceiver interface, for example in the form of a chip, connected to a suitable antenna through which the transceiver is able to send and receive data to and from the hybrid drone 3000 in a local area network, preferably using one of the IEEE 802.11 Wi-Fi protocols. It is further envisaged that a wide area network protocol could be used to control the hybrid drone 3000, together with a suitable antenna and transceiver interface.

The communications interface 2210 of the base station 2000 is further configured for communication via a wide area network to the server 1100, client computing devices 1500 and/or drone controller 1600 as described above. The communications interface 2000 may be provided with a suitable wireless transceiver interface, for example in the form of a chip connected the controller, and a suitable antenna. Wide area network protocols that are envisaged as being used include cellular networks, for example utilising 3G/4G/5G antenna towers; satellite networks; or any other suitable wide area network. Utilising the communications interface 2210, data can be received from server 1100 and/or drone controller 1600 and sent to the hybrid drone 3000 when it is in flight, or when the hybrid drone 3000 is docked with the base station 2000.

Base Station Controller

As described previously, the base station controller 2200 is connected to variety of sensors that allow it to detect a wide variety of things. The base station 2000 may be provided with a plurality of sensors for allowing the base station controller 2200 to receive signals indicative of a wide variety of factors. Examples of sensors that may be provided on the base station 2000 include one or more:
  a. proximity sensors;
  b. temperature sensors;
  c. fuel level sensors;
  d. pressure sensors;
  e. moisture sensors;
  f. humidity sensors;
  g. geopositoning sensors;
  h. distance sensors;
  i. light sensors;
  j. a gyroscopes;
  k. an accelerometers;
  l. a magnetic sensors;
  m. a camera; and
  n. any other suitable sensor.

Preferably the controller is configured for detecting the docking on the hybrid drone 3000 in the docking arrangement 2300. A proximity sensor (not shown) is preferably provided in the docking arrangement 2300 for this purpose that is configured to detect the landing of the hybrid drone 3000.

Further, electrical connectors are preferably provided on each of the first magnetic connector 2112 and the complementary magnetic connector 3612, which are able to generate an electrical signal when they make contact with each other. Such an electrical signal will be received by the controller 2200 in order to detect when the first magnetic connector 2112 and complementary magnetic connector 3612 have connected with each other and an automated fashion, thereby connecting the fuel line 2120 from the fuel tank 2700 to the fuel line 3630 leading to the fuel tank 3620 of the hybrid drone 3000.

Alternative sensors are envisaged for detecting whether or not the fuel tank 2700 of the base station 2000 has been connected to the fuel tank 3620 of the hybrid drone 3000. These could include magnetic switches, proximity sensors, Hall effect sensors, fuel flow sensors as described above, or the like.

Preferably the base station 2000 includes a level sensor (not shown) associated with the fuel tank 2700 for allowing the controller to detect the fuel level of the base station fuel tank 2700, and to actuate a fuel pump (not shown) within the fuel tank to transfer fuel from the base station fuel tank 2700 to the fuel tank 3630 of the hybrid drone 3000, or alternatively from the fuel tank 3630 of the hybrid drone 3000 to the base station fuel tank 2700.

In an embodiment of the invention where the engine 3312 of the drone 3000 requires an oil and fuel mixture, the base station 2000 comprises a second fuel pump (not shown) and serves to circulate an oil and fuel mixture stored in the base station fuel tank 2700. The second fuel pump may be located within the base station fuel tank 2700 or outside of the base station fuel tank 2700, so long as an inlet and an outlet (not shown) of the second fuel pump are located at the bottom of the base station fuel tank 2700 to create a stirring action. The second fuel pump is run for about an hour after filling the tank with the oil and fuel mixture as well as on a daily basis to mix the oil and fuel.

It is further envisaged that the hybrid drone 3000 will include a level sensor associated with the drone fuel tank 3620, and when the hybrid drone controller detects that the fuel tank 3620 of the hybrid drone is sufficiently full, it will communicate with the controller on the base station to cause pumping of the fuel to the hybrid drone to stop.

It is further envisaged that the base station controller will be configured for receiving a weather signal indicative of localised weather patterns. Such a weather signal may be received from the weather station 2800 or, as described above, from an online resource. The base station controller may then be configured for determining whether conditions are safe for the flying of the hybrid drone from the weather signal. If the controller detects that conditions are not safe for the flying of the hybrid drone 3000, the base station controller may generate an alert signal for transmission to a remote operator of the hybrid drone, and/or prevent control of the hybrid drone 3000 by a remote operator to cause it to take flight. If weather conditions are determined as being unsuitable for flying, the controller may cause the actuation of the movable cover panels to move to their closed position, thereby protecting componentry housed within the housing of the base station, as well as the hybrid drone 3000 from the poor weather conditions.

In normal operation of the hybrid drone 3000 during flight, the base station controller will preferably be configured for receiving control signals from a remote operator via the base station communications interface for communicating over a local area network and/or wide area network, and transmitting these control signals over a wireless local area network to the hybrid drone 3000 to thereby control operation of the hybrid drone.

It is further envisaged that the base station controller may be configured for receiving a flight path signal including flight mission data, the flight path signal being indicative of a flight path or flight mission to be flown by the hybrid drone 3000. The flight path signal will preferably be received over a local area network and/or wide area network, the flight path signal being indicative of the flight path to be flown by the hybrid drone 3000. The base station controller can then send control signals to the hybrid drone 3000 to cause the hybrid drone to fly over the flight path indicated by the flight path signal. Alternately, the base station controller may communicate the flight path signal to the hybrid drone controller, which may independently control flight operation of the hybrid drone 3000 to fly over the flight path indicated by the flight path signal.

It is further envisaged that the base station controller will be configured for receiving area details of an area to be surveyed by the hybrid drone. Such area details may be included in the flight mission data. The base station controller may be configured for calculating a particular flight path for the hybrid drone 3000 from the flight mission data, and storing the calculated flight path for use during flight control of the hybrid drone 3000.

During flight, the hybrid drone controller may be configured for detecting when the fuel level in the drone fuel tank 3620 has reached a particular fuel threshold. The fuel threshold may be the amount of fuel required to return the hybrid drone to the base station in given ambient conditions.

The hybrid drone controller may be configured for transmitting details of the location of the hybrid drone to the base station controller at regular intervals. The base station controller and/or hybrid drone controller may be configured for calculating the fuel threshold from weather conditions and the distance of the hybrid drone 3000 from the base station 2000. In calculating the fuel threshold, the minimum level required to be attained by the hybrid drone 3000 in order to fly directly back to the base station may also be taken into account.

Alternatively, the fuel threshold may be set as a predetermined minimum level or minimum amount of fuel. When such a threshold has been reached, the base station controller and/or the hybrid drone controller may be configured for guiding the hybrid drone 3000 back to the base station 2000 for docking. Where the hybrid drone 3000 is being controlled during flight by a remote operator, the base station controller may be configured for generating an alert signal when the remaining fuel in the fuel tank 3620 is approaching the fuel threshold, and transmitting the alert signal to the remote operator.

In Use

Figure 39:
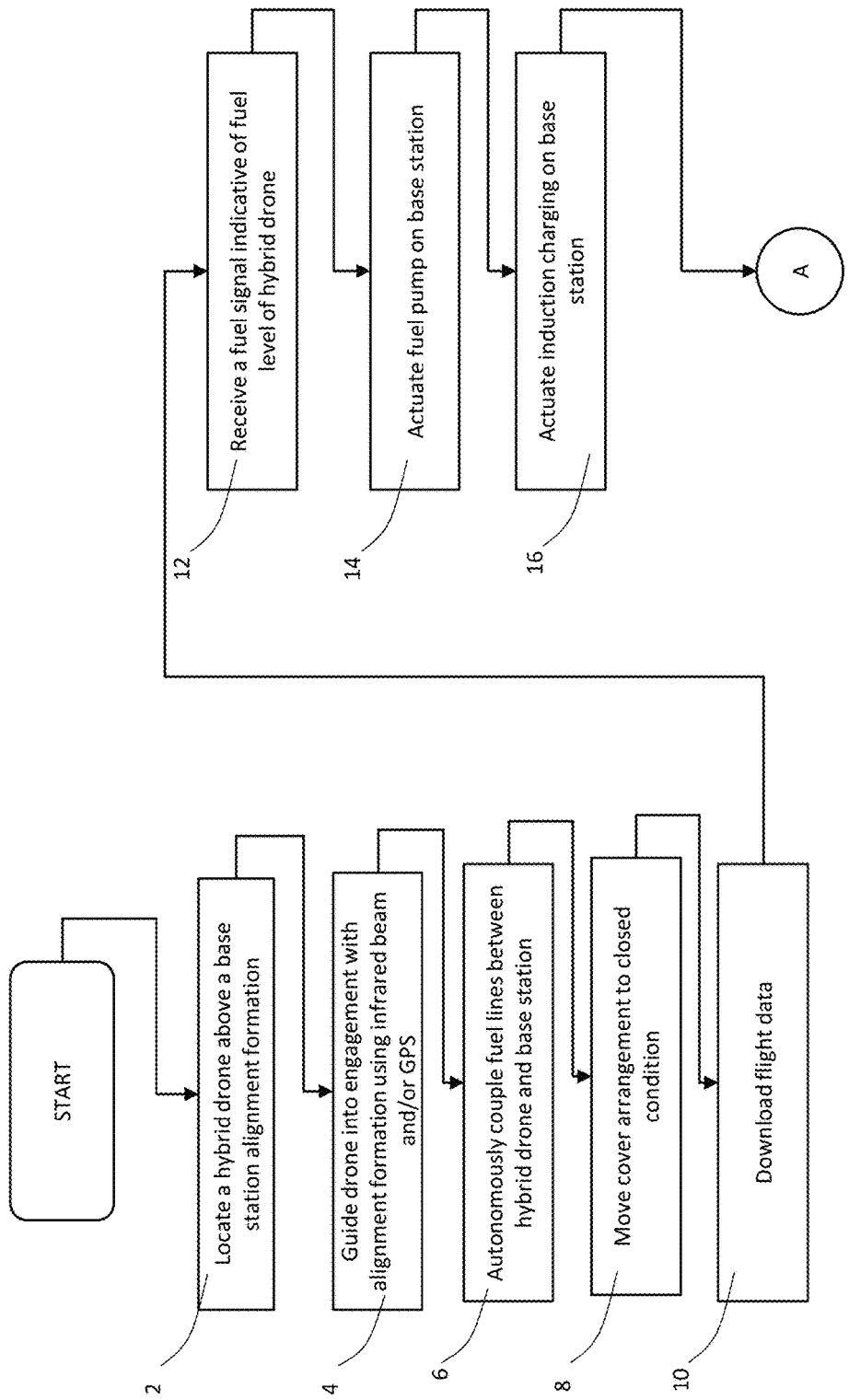
Figure 41:
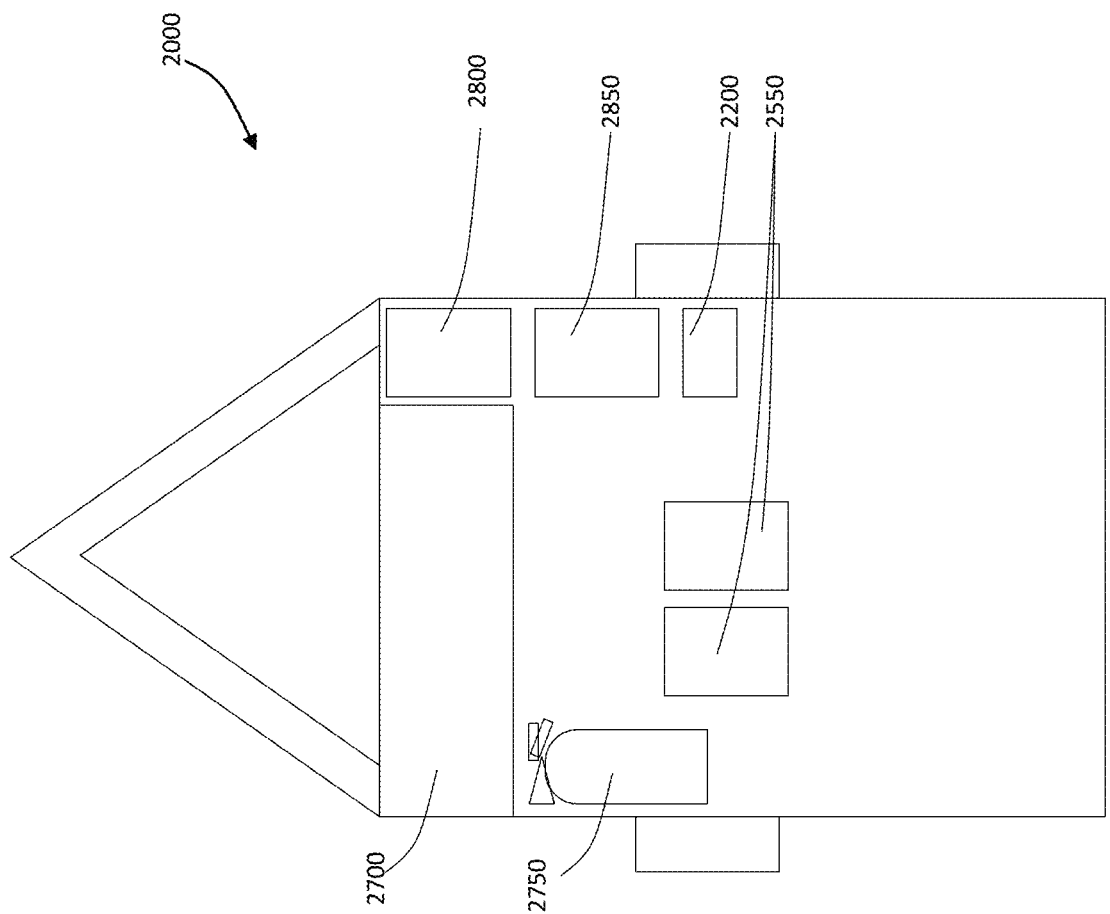
FIG. 41 shows a top schematic view of a base station with the cover arrangement removed.
Figure 42:
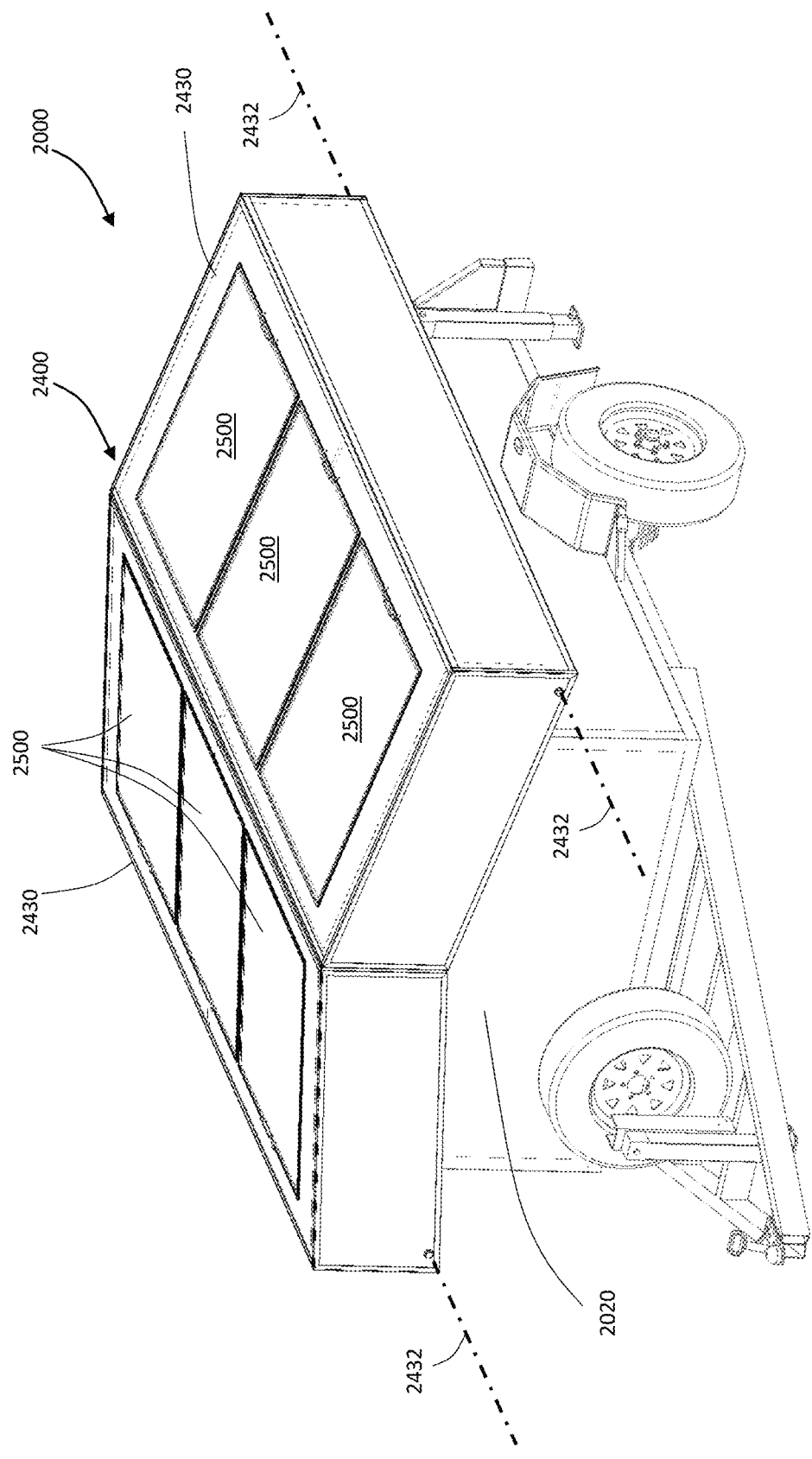
FIG. 42 shows a top front right perspective view of a second embodiment of a base station with the cover arrangement in a closed condition.

Use of the base station 2000 and hybrid drone 3000 is now described with reference to FIGS. 39 and 40. Initially, we start with the hybrid drone 3000 in flight and approaching base station 2000. It will be appreciated that the hybrid drone 3000 may be controlled in an automated fashion by the controller of the base station 2000, the controller in the hybrid drone 3000, or alternatively the hybrid drone 3000 may be controlled by a remote user, using the communications interface on the base station 2000 which receives and relays control signals to the hybrid drone 3000.

The hybrid drone 3000 will initially be located 2 above the base station docking arrangement 2300, and preferably with the locating formation 3800 (i.e. undercarriage 3450) directly above the alignment formation 2320.

The hybrid drone 3000 will then be guided 4 into engagement with the alignment formation, using the electromagnetic frequency sensor 3850 on the hybrid drone 3000 to align with the infrared beam transmitted by the electromagnetic frequency transmitter 2330. This process may also be replaced or supplemented by using high accuracy GPS positioning signals for controlling movement of the hybrid drone. The step of guiding 4 the drone into engagement with the alignment formation may be during landing and includes guiding the drone into the received position on the base station 2000. Using this guidance, the hybrid drone 3000 is landed on the alignment formation in a position so that the drone magnetic connector 3612 ends up in a position that is close enough to the base station magnetic connector 2112 to cause them to attract each other magnetically and autonomously couple 6 with each other to link the fuel lines 2120, 3630. Further, the inductive charging device 2900 of the hybrid drone 3000 will be in alignment with the inductive charging device 2650 of the base station. Preferably, the cushioning formations 3112 at the end of shafts 3110 will be resting on the edges of the platform 2312 alongside the alignment formation 2320.

In this configuration, the cover arrangement 2400 can be moved 8 to its closed condition, thereby protecting the hybrid drone 3000 from the elements.

Flight data from the flight of the hybrid drone can then be downloaded 10, including flight path, video and/or photos, ambient conditions, and the like. Alternatively, flight data can be downloaded directly from the hybrid drone 3000 while it is in flight.

The controller will then receive 12 a fuel signal from the hybrid drone 3000 that is indicative of the fuel level of the hybrid drone. The base station fuel pump can then be actuated 14 to fill the fuel tank 3620 of the hybrid drone from the fuel tank 2700 of the base station 2000 via the connected fuel lines. The controller may receive feedback from the fuel level sensor in the fuel tank 3620 of the hybrid drone to indicate when the fuel tank 3620 is full. At the end of the flight mission, the fuel tank 3620 could also be emptied.

The controller may further actuate 16 induction charging from the inductive charging device 2650 to thereby induce an electrical current in an inductive charging device 3870 (shown in FIG. 51) on the hybrid drone to cause the battery of the hybrid drone 3000 to be charged. The induction charging device 2650 can also be used to power the hybrid drone 3000 during docking.

In this configuration, flight mission data for the next flight may be received 18 by the communications interface of the base station 2000. The flight mission data may include the area to be covered, the type of mission (i.e. surveying, video, spotter, et cetera which will dictate the types of actions to be performed), and any other relevant data. The flight mission data may also include the particular flight path to be flown. Alternatively, the controller may at this stage calculates 20 a flight path that will be required in order to cover the area to be covered. The calculation of the flight path may take into account details of the area to be surveyed, details of the starting location of the drone, relevant terrain data and ambient conditions from the weather station.

The controllers on both the base station 2000 and the hybrid drone 3000 will then preferably perform 22 pre-flight checks to ensure that both the base station and hybrid drone 3000 are ready for the next flight mission.

The cover arrangement will then be moved 23 to its open condition, and the base station controller will communicate to the drone controller to actuate 24 the starter motor and internal combustion engine. The hybrid drone 3000 will then be launched 26 from the base station 2000.

It is envisaged that the base station controller may be configured for transmitting instructions to the drone controller to carry out each step described, alternatively, the drone controller may have a certain level of autonomy. For example, the base station controller may transmit a takeoff signal to the drone controller, which may carry out all steps required to lift off from the base station. The base station controller may transmit the flight mission data, as well as flight path to the drone controller, for use by the drone controller in controlling the drone to carry out the flight mission.

The hybrid drone 3000 will then be controlled to move along a particular flight path, either by the base station controller or the hybrid drone controller, or alternatively by the remote operator operating the drone controller 1600.

It is envisaged that, during flight, fuel in the fuel tank (not shown) of the hybrid drone will be used by the internal combustion engine 3312 to drive the generator 3314 to produce electrical power. This electrical power will preferably be used directly by the electric motors 3200 driving the propellers 3100. If the generator fails to produce the required amounts of power to drive the electrical motors 3200, the battery (not shown) will supplement the electrical power being fed to the electrical motors. An air filter 3313 is provided for filtering air moving to the internal combustion engine 3312.

It is envisaged in a preferred embodiment that the battery on the hybrid drone will not store sufficient electrical power to drive the electrical motors 3200 for the full flight, as this would require larger batteries with a corresponding increase in weight. Instead, the battery is envisaged as only providing sufficient power to make up for any inadequacies in power supplied by the generator, or if fuel runs out, to provide sufficient power to return the hybrid drone 3000 to the base station 2000. It is further envisaged that the generator may also be used to charge the battery, especially if too much electrical power is generated by the generator.

However, in an alternative embodiment, it is envisaged that sufficient batteries may be provided to power the hybrid drone 3000 for a larger part of the flight, if not the entire flight if, for example fuel runs out towards the beginning of the flight.

Further, in an alternative embodiment, it is envisaged that the generator may be used to charge the batteries, which may in turn be used to drive the electrical motors 3200.

During flight, either the base station controller or the drone controller may determine 28 the distance of the drone from the base station. The location of the drone may be calculated from a geo-positioning sensor 3955 and antenna 3950 on the drone and/or from accelerometers on the drone, or the like. The may be calculated directly by a geo-positioning sensor, or from calculating the distance and direction between the drone and the base station GPS positioning coordinates.

An indication of the fuel level of the drone fuel tank 3620 will also be received 30 as a fuel signal by either the drone controller and/or base station controller. Similarly, details of the ambient conditions may be received 31 by the drone controller and/or base station controller. Such ambient conditions could include wind speed and direction. Either the drone controller 1600 or the base station controller 2200 will then calculate the required amount of fuel for the hybrid drone 3000 to return to the base station, preferably with an additional amount to provide a factor of safety. The drone controller and/or base station controller will then determine 34 whether the amount of fuel left is on or approaching the calculated required amount. If the fuel that is left is over the required amount to return to the base station 2000, then the controller will continue monitoring the distance, fuel level and ambient conditions. If the fuel that has left is approaching or at the calculated fuel level required to return to the base station, then, if the hybrid drone 3000 is being controlled by a remote user, the base station controller will generate 36 and transmit an alert signal to the remote user.

If the hybrid drone is being controlled by the drone controller and/or base station controller, then these will directly control 38 flight of the hybrid drone 3000 to return to the base station 2000.

Interpretation

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

The terminology used herein is for the purpose of describing particular embodiments only and is not intended to be limiting of the invention. As used herein, the singular articles "a", "an" and "the" are intended to include the plural forms as well, unless the context clearly indicates otherwise and thus are used herein to refer to one or to more than one (i.e. to "at least one") of the grammatical object of the article. By way of example, the phrase "an element" refers to one element or more than one element.

The term "about" is used herein to refer to quantities that vary by as much as 30%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

The term "real-time" for example "displaying real-time data," refers to the display of the data without intentional delay, given the processing limitations of the system and the time required to accurately measure the data.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/of" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Bus

In the context of this document, the term "bus" and its derivatives, while being described in a preferred embodiment as being a communication bus subsystem for interconnecting various devices including by way of parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like, should be construed broadly herein as any system for communicating data.

In Accordance with:

As described herein, 'in accordance with' may also mean 'as a function of' and is not necessarily limited to the integers specified in relation thereto.

Composite Items

As described herein, 'a computer implemented method' should not necessarily be inferred as being performed by a single computing device such that the steps of the method may be performed by more than one cooperating computing devices.

Similarly objects as used herein such as 'web server', 'server', 'client computing device', 'computer readable medium' and the like should not necessarily be construed as being a single object, and may be implemented as a two or more objects in cooperation, such as, for example, a web server being construed as two or more web servers in a server farm cooperating to achieve a desired goal or a computer readable medium being distributed in a composite manner, such as program code being provided on a compact disk activatable by a license key downloadable from a computer network.

Database:

In the context of this document, the term "database" and its derivatives may be used to describe a single database, a set of databases, a system of databases or the like. The system of databases may comprise a set of databases wherein the set of databases may be stored on a single implementation or span across multiple implementations. The term "database" is also not limited to refer to a certain database format rather may refer to any database format. For example, database formats may include MySQL, MySQLi, XML or the like.

Wireless:

The invention may be embodied using devices conforming to other network standards and for other applications, including, for example other WLAN standards and other wireless standards. Applications that can be accommodated include IEEE 802.11 wireless LANs and links, satellite communications protocols, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments:

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments:

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

It will be appreciated that the methods/apparatus/devices/systems described/illustrated above at least substantially provide a base station, the hybrid drone and methods therefor.

The invention or inventions described herein, and/or shown in the drawings, are presented by way of example only and are not limiting as to the scope of the invention or inventions. Unless otherwise specifically stated, individual aspects and components of the invention is may be modified, or may have been substituted therefore known equivalents, or as yet unknown substitutes such as may be developed in the future or such as may be found to be acceptable substitutes in the future. The invention is may also be modified for a variety of applications while remaining within the scope and spirit of the claimed invention, since the range of potential applications is great, and since it is intended that the present inventions be adaptable to many such variations.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

Chronological Order

For the purpose of this specification, where method steps are described in sequence, the sequence does not necessarily mean that the steps are to be carried out in chronological order in that sequence, unless there is no other logical manner of interpreting the sequence.

Markush Groups

In addition, where features or aspects of the invention are described in terms of Markush groups, those skilled in the art will recognise that the invention is also thereby described in terms of any individual member or subgroup of members of the Markush group.

INDUSTRIAL APPLICABILITY

It is apparent from the above, that the arrangements described are applicable to the surveying and drone industries.

What is claimed is:

1. A portable base station for use with a hybrid drone, the base station comprising:
   a cover arrangement to at least partially shield the hybrid drone when the hybrid drone is in a received position, the cover arrangement including a pair of opposed pivotably moveable covers;
   an alignment formation configured for guiding the hybrid drone to the received position; and
   an autonomous refueling mechanism connected to one of the opposed pivotably moveable covers, the autonomous refueling mechanism adapted to align with a refuelling port on the hybrid drone for autonomously refuelling the hybrid drone in use,
   wherein the pair of opposed moveable covers are configured to move to an open condition in which the pair of opposed moveable covers are positioned outwardly and upwardly relative to the alignment formation to provide a windshield to aid the hybrid drone during take-off and landing, and
   wherein the pair of opposed pivotably moveable covers are configured to move to a closed condition in which the pair of opposed pivotably moveable covers shield the alignment formation to align the autonomous refueling mechanism with the refueling port on the hybrid drone, when the hybrid drone is in the received position.

2. The portable base station of claim 1, including a communications interface for communicating with the hybrid drone in one or more selected from:
   a. a local area network; and
   b. a wide area network.

3. The portable base station of claim 1, wherein the alignment formation is a recess defining tapered internal walls and a base, the alignment formation being configured for engaging with an engaging formation on the hybrid drone when in the received position.

4. The portable base station of claim 3, wherein the alignment formation is at least partly surrounded by a platform, the platform including apertures adapted to reduce wash from propeller blades of the hybrid drone.

5. The portable base station of claim 4, wherein the cover arrangement is adapted to cover the platform.

6. The portable base station of claim 1, wherein the pair of opposed pivotably movable covers pivot upwardly and outwardly from a closed condition to the open condition.

7. The portable base station of claim 1, further including an electrical power storage device and a generator to maintain the charge of the electrical power storage device.

8. The portable base station of claim 1, further including a controller and one or more sensors electrically connected to a controller, wherein the sensors include one or more selected from:
   a. a proximity sensor;
   b. a temperature sensor;
   c. fuel level sensor;
   d. pressure sensor;
   e. moisture sensor;
   f. humidity sensor;
   g. geo-positioning sensor;
   h. distance sensor;
   i. light sensor;
   j. a camera; and
   k. any other suitable sensor,
to provide one or more signals to the controller.

9. The portable base station of claim 8, wherein the controller is configured for actuating movement of the cover arrangement between the open condition and the closed condition.

10. The portable base station of claim 1, wherein the autonomous refuelling mechanism is only connectable to the hybrid drone when the cover arrangement is in its closed condition.

11. The portable base station of claim 1, wherein when the cover arrangement is in the closed condition, the hybrid drone is covered from the elements.

12. The portable base station of claim 1, wherein the cover arrangement prevents access by the hybrid drone to the docking arrangement when the cover arrangement is in its closed condition.

13. The portable base station of claim 1, wherein the pair of opposed pivotably moveable covers are angled to the horizontal when the cover arrangement is in the closed condition.

14. The portable base station of claim 1, wherein the cover arrangement is configured to secure a hybrid drone in a position for travelling when the cover arrangement is in its closed condition.

15. The portable base station of claim 1, wherein the portable base station includes solar panels mounted to the pair of opposed pivotably movable covers.

16. The portable base station of claim 10, wherein autonomous refueling mechanism includes a first magnetic connector that extends toward a complementary magnetic connector of the hybrid drone from the opposed pivotably movable covers, when the cover arrangement is in the closed position.

17. The portable base station of claim 16, wherein the first magnetic connector is connected to a flexible fuel line to allow the first magnetic connector to connect to the complementary magnetic connector of the hybrid drone, even if the docking position of the drone is aligned incorrectly.

18. The portable base station of claim 17, wherein in the closed position, the first magnetic connector and the complementary magnetic connector connect, thereby allowing fuel to flow from a fuel tank of the base station through the refuelling mechanism and into a fuel tank of the drone, during refuelling.

19. A system for drone operation comprising:
   a portable base station according to claim 1; and
   a drone operable with the portable base station.

* * * * *